United States Patent
Smith

(10) Patent No.: US 11,988,297 B2
(45) Date of Patent: *May 21, 2024

(54) MULTI-POSITION VALVE

(71) Applicant: Hayward Industries, Inc., Berkeley Heights, NJ (US)

(72) Inventor: Jacob Cody Smith, Lexington, NC (US)

(73) Assignee: Hayward Industries, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/141,714

(22) Filed: Jan. 5, 2021

(65) Prior Publication Data

US 2021/0231227 A1 Jul. 29, 2021

Related U.S. Application Data

(63) Continuation of application No. 15/634,462, filed on Jun. 27, 2017, now Pat. No. 10,883,619.

(51) Int. Cl.
*F16K 27/06* (2006.01)
*B01D 29/66* (2006.01)
(Continued)

(52) U.S. Cl.
CPC .......... *F16K 27/065* (2013.01); *B01D 29/668* (2013.01); *F16K 5/0471* (2013.01);
(Continued)

(58) Field of Classification Search
CPC .. F16K 5/0471; F16K 11/076; F16K 11/0853; F16K 11/0856; F16K 11/18;
(Continued)

(56) References Cited

U.S. PATENT DOCUMENTS 3,061,267 A ‡ 10/1962 Hamer .................. F16K 5/0471
137/246.22
3,195,726 A ‡ 7/1965 Saurenman ............... E04H 4/12
137/597

(Continued)

OTHER PUBLICATIONS

Jandy Pro Series Never Lube 2"-2-1/2" Three Way CPVC Valve Installation Instructions, Zodiac Pool Systems, Inc. (copyright 2012) (2 pages).‡

(Continued)

*Primary Examiner* — Kevin F Murphy
*Assistant Examiner* — Jonathan J Waddy
(74) *Attorney, Agent, or Firm* — McCarter & English, LLP

(57) ABSTRACT

Improved valve assemblies (e.g., multi-position valve assemblies) are provided. More particularly, the present disclosure provides for high efficiency multi-position rotary backwash valve assemblies. In exemplary embodiments, the present disclosure provides for a four-position rotary high efficiency valve assembly for a swimming pool or spa filter. The present disclosure provides multi-position valve assemblies having infrequent maintenance and allowing for user-friendly service. The present disclosure provides for improved multi-position valve assemblies and related features, systems and methods of use. Improved, convenient and effective systems and methods for utilizing improved multi-position valve assemblies (e.g., high efficiency multi-position rotary backwash valve assemblies) are provided. The valve assembly can be utilized in fluid systems as a flow control assembly (e.g., as a backwash valve associated with a pool or spa filter).

13 Claims, 60 Drawing Sheets

(51) Int. Cl.
*E04H 4/12* (2006.01)
*F16K 5/04* (2006.01)
*F16K 11/085* (2006.01)
*F16K 31/60* (2006.01)
*F16K 35/02* (2006.01)

(52) U.S. Cl.
CPC ...... *F16K 11/0853* (2013.01); *F16K 11/0856* (2013.01); *F16K 31/602* (2013.01); *F16K 35/025* (2013.01); *E04H 4/12* (2013.01); *Y10T 137/87249* (2015.04)

(58) Field of Classification Search
CPC .......... F16K 11/04; F16K 27/065; F16K 5/04; F16K 11/08; F16K 11/085; F16K 31/602; F16K 35/025; B01D 29/668; E04H 4/12; E04H 4/16; E04H 4/1245; Y10T 137/87249
USPC ...................... 137/597; 210/137.14, 425, 278
See application file for complete search history.

(56) References Cited

U.S. PATENT DOCUMENTS

| | | | | |
|---|---|---|---|---|
| 3,245,430 A ‡ | 4/1966 | Enterante | ............. | F16K 11/202 137/454.2 |
| 4,250,920 A * | 2/1981 | Traylor | ................ | F16K 11/044 137/269 |
| 4,469,131 A ‡ | 9/1984 | Traylor | .................. | F16K 11/04 137/599.14 |
| 4,530,469 A * | 7/1985 | Muck | .................... | F16K 11/085 239/569 |
| 4,574,840 A ‡ | 3/1986 | Schumann | .......... | F16K 11/0856 137/625.15 |
| 4,579,143 A ‡ | 4/1986 | Rollins | ................... | F23K 5/147 137/238 |
| 5,107,896 A * | 4/1992 | Otto | ..................... | F16K 11/085 210/418 |
| 5,301,712 A ‡ | 4/1994 | Treichel | ............... | F16K 3/0263 137/315.32 |
| 5,431,189 A * | 7/1995 | Jones | ...................... | F25B 45/00 137/625.42 |
| 5,452,744 A * | 9/1995 | Otto | ..................... | B01D 35/043 137/625.29 |
| 5,931,196 A * | 8/1999 | Bernardi | ............. | F16K 11/0856 137/625.46 |
| 5,937,903 A ‡ | 8/1999 | Afshar | ................ | F16K 11/0856 137/597 |
| 6,568,428 B2 ‡ | 5/2003 | Pecci | .................... | F16K 27/003 137/595 |
| 6,575,195 B2 ‡ | 6/2003 | Wichmann | ............ | F16K 11/076 137/625.17 |
| 7,017,886 B1 ‡ | 3/2006 | Ngene-Igwe | ......... | F16K 3/0227 251/326 |
| 7,261,127 B1 ‡ | 8/2007 | Oundjian | ............... | B01D 24/14 137/625.5 |
| 7,610,931 B2 ‡ | 11/2009 | Wittig | ..................... | F16K 11/20 137/551 |
| 8,356,627 B2 ‡ | 1/2013 | Hoshi | ....................... | G01F 1/36 137/557 |
| 9,707,499 B2 ‡ | 7/2017 | Willis | .................. | B01D 29/668 |
| 10,883,619 B2 | 1/2021 | Smith | | |
| 2006/0048828 A1 ‡ | 3/2006 | Moreno | ............. | F16K 11/0655 137/625.43 |
| 2008/0063465 A1 ‡ | 3/2008 | Lang | ....................... | F16C 33/20 403/52 |
| 2013/0105322 A1 ‡ | 5/2013 | Averbeck | ............... | C02F 1/008 204/554 |
| 2014/0263003 A1 ‡ | 9/2014 | Willis | .................. | B01D 29/668 210/167.14 |

OTHER PUBLICATIONS

Jandy Pro Series Slide Valve and Backwash Valve Installation and Operation Manual, Zodiac Pool Systems, Inc. (copyright 2012) (12 pages).‡
Jandy Backwash Valves, Zodiac 2010 Catalog, pp. 48-49 (1 page).‡
Pentair Push Pull Valves, Printout of webpage: https://web.archive.org/web/20100725073444/http://www.inyopools.com/parts_pentair_push_pull_valves.aspx (webpage dated Jul. 25, 2010 via the Internet Archive) (4 pages).‡
Top-Mount Sand Filter Valves, Printout of webpage: https://web.archive.org/web/20120309235426/http://www.waterwayplastics.com/products/pool-products/valves/top-mount-sand-filter-valves (webpage dated Mar. 9, 2012 via the Internet Archive) (2 pages).‡
Meteor High Rate Sand Filter Owner's Manual, Pentair Pool Products (Rev. D Apr. 20, 2012) (10 pages).‡
FullFlow Valves Replacement Parts, Printout of webpage: https://web.archive.org/web/20100115141758/http://www.pentairpool.com/partslists/valves-fullflow-valves-264.htm (webpage dated Jan. 15, 2010 via the Internet Archive) (2 pages).‡
Hayward 2013 Buyer's Guide and Parts Price List, Hayward Industries, Inc., cover, inner cover, pp. 264-267, and back cover (copyright 2012) (7 pages).‡
FullFloXF Backwash Valve Installation and User's Guide, Pentair Water Pool and Spa, Inc. (dated Apr. 19, 2012) (12 pages).‡
2-1/2" Slide Valve Installation Guide, Waterway Plastics (copyright 2008) (2 pages).‡
Filter Control Slide Valve Owner's Guide, Hayward Pool Products, Inc. (copyright 1995) (2 pages).‡
International Search Report and Written Opinion of the International Searching Authority, dated Jul. 7, 2014, issued in connection with International Application No. PCT/US2014/024426 (corresponding to U.S. Appl. No. 14/206,374) (10 pages).‡
Office Action dated May 7, 2019, issued in connection with U.S. Appl. No. 15/634,462 (12 pages).
Office Action dated May 21, 2020, issued in connection with U.S. Appl. No. 15/634,462 (15 pages).
Notice of Allowance dated Aug. 27, 2020, issued in connection with U.S. Appl. No. 15/634,462 (10 pages).

\* cited by examiner
‡ imported from a related application

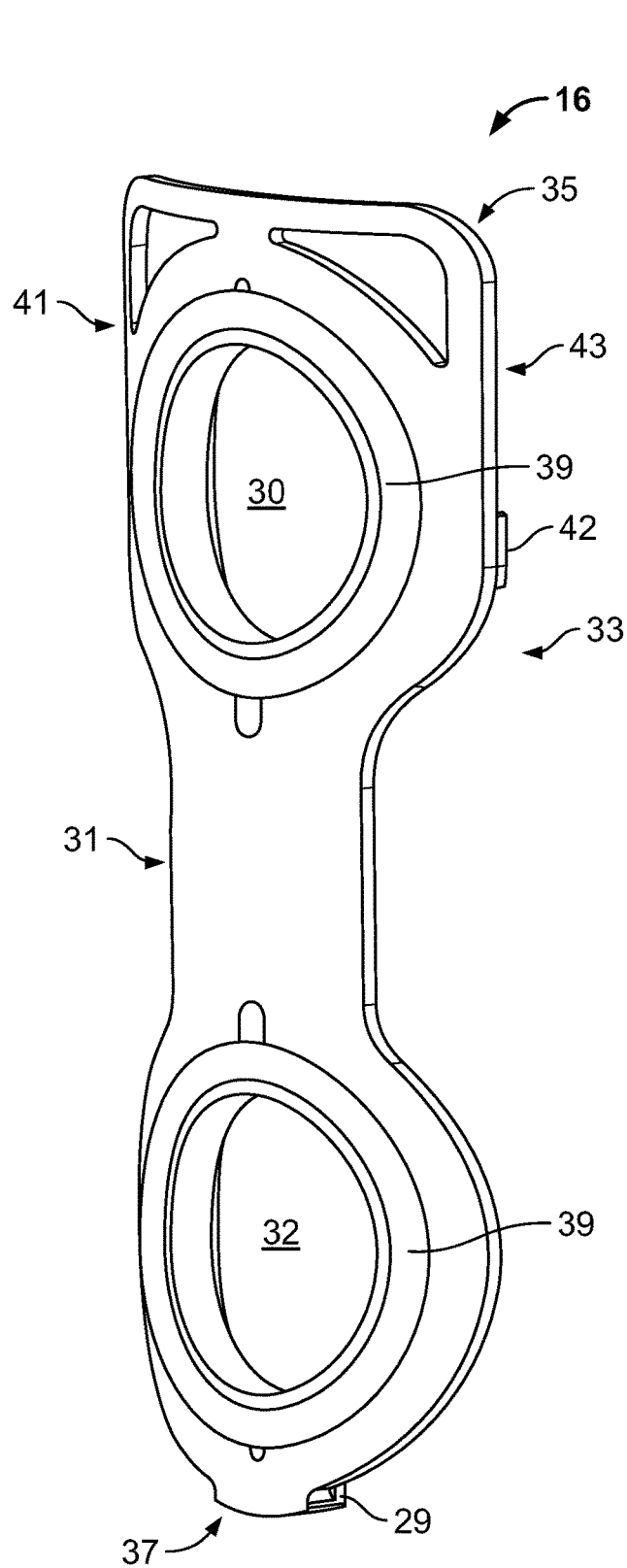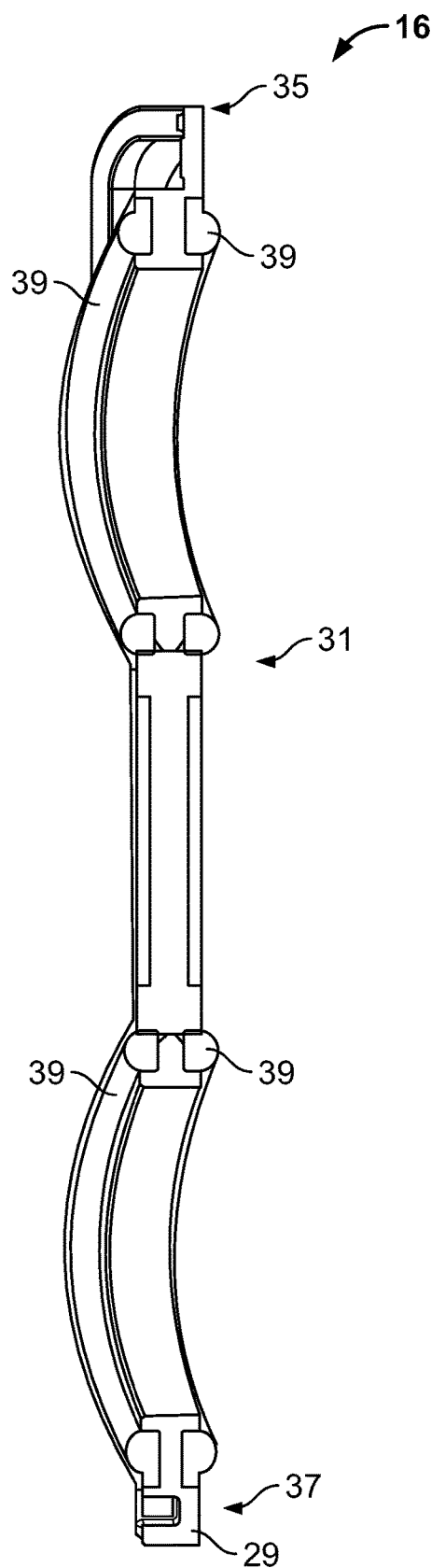
FIG. 22
FIG. 23

MULTI-POSITION VALVE

CROSS-REFERENCE TO RELATED APPLICATIONS

This application is a continuation of U.S. patent application Ser. No. 15/634,462, filed on Jun. 27, 2017, now U.S. Pat. No. 10,883,619, the entire disclosure of which is expressly incorporated by reference herein.

FIELD OF THE DISCLOSURE

The present disclosure generally relates to valve assemblies, and more particularly, to high efficiency multi-position rotary backwash valve assemblies.

BACKGROUND OF THE DISCLOSURE

Swimming pools and spas can include filters for cleaning the pool or spa fluid during circulation. These water filters can include a filter body containing a filter media (e.g., sand or diatomaceous earth).

A user may periodically reverse the fluid flow through the filter to clean or flush the media to a waste location where the flushed water is expelled to, an activity that can be referred to as backwashing. A backwash valve can be associated with the filter that alters the flow path of water based on the desired mode (e.g., to switch the filter between a filter mode to a backwash mode). Some conventional assemblies/systems in this general field are described and disclosed in U.S. Patent Pub. No. 2014/0263003.

Some conventional backwash valves are sliding valves, and some are rotating valves. Commercial sliding valves might not be hydraulically efficient, and some rotating valves can have an increased size and/or cost. It is also noted that some backwash valves can experience undesired wear of the waste port seals.

An interest exists for improved valve assemblies and related methods of use. These and other inefficiencies and opportunities for improvement are addressed and/or overcome by the assemblies, systems and methods of the present disclosure.

SUMMARY OF THE DISCLOSURE

The present disclosure provides for improved valve assemblies (e.g., multi-position valve assemblies). More particularly, the present disclosure provides for advantageous multi-position rotary backwash valve assemblies.

In exemplary embodiments, the present disclosure provides for a four-position rotary high efficiency valve assembly for a swimming pool or spa filter (e.g., a backwash valve associated with a pool/spa filter). The present disclosure provides multi-position valve assemblies having infrequent maintenance and allowing for user-friendly service.

Additional advantageous features, functions and applications of the disclosed assemblies, systems and methods of the present disclosure will be apparent from the description which follows, particularly when read in conjunction with the appended figures. References listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein:

FIGS. 21-22 are side perspective views of an exemplary seal carrier of the valve assembly of FIG. 1;

FIG. 23 is a cross-sectional side view of a seal carrier;

DETAILED DESCRIPTION

Figure 1:
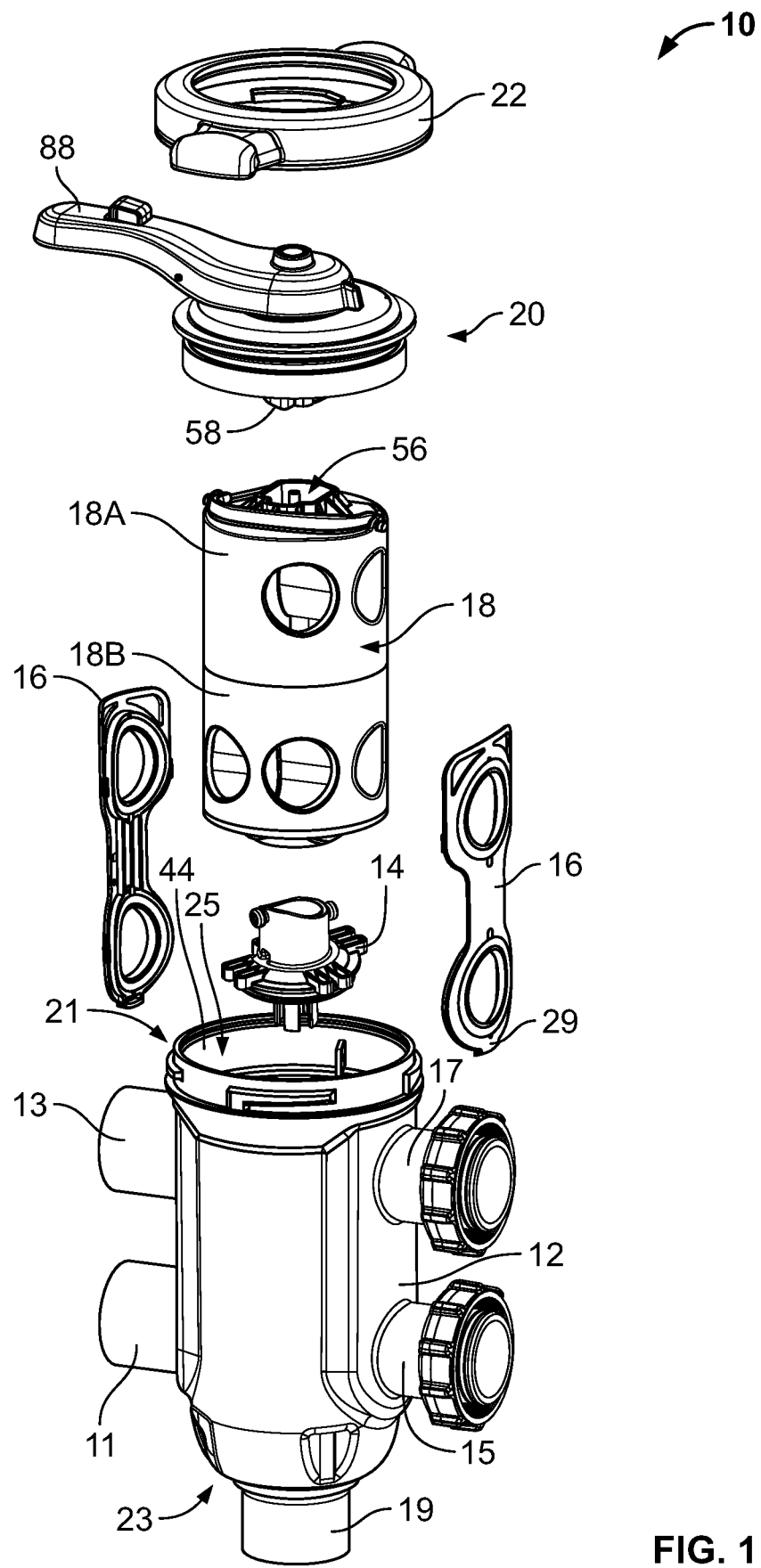
FIG. 1 is an exploded side perspective view of a valve assembly according to an exemplary embodiment of the present disclosure, prior to assembly.
Figure 2:
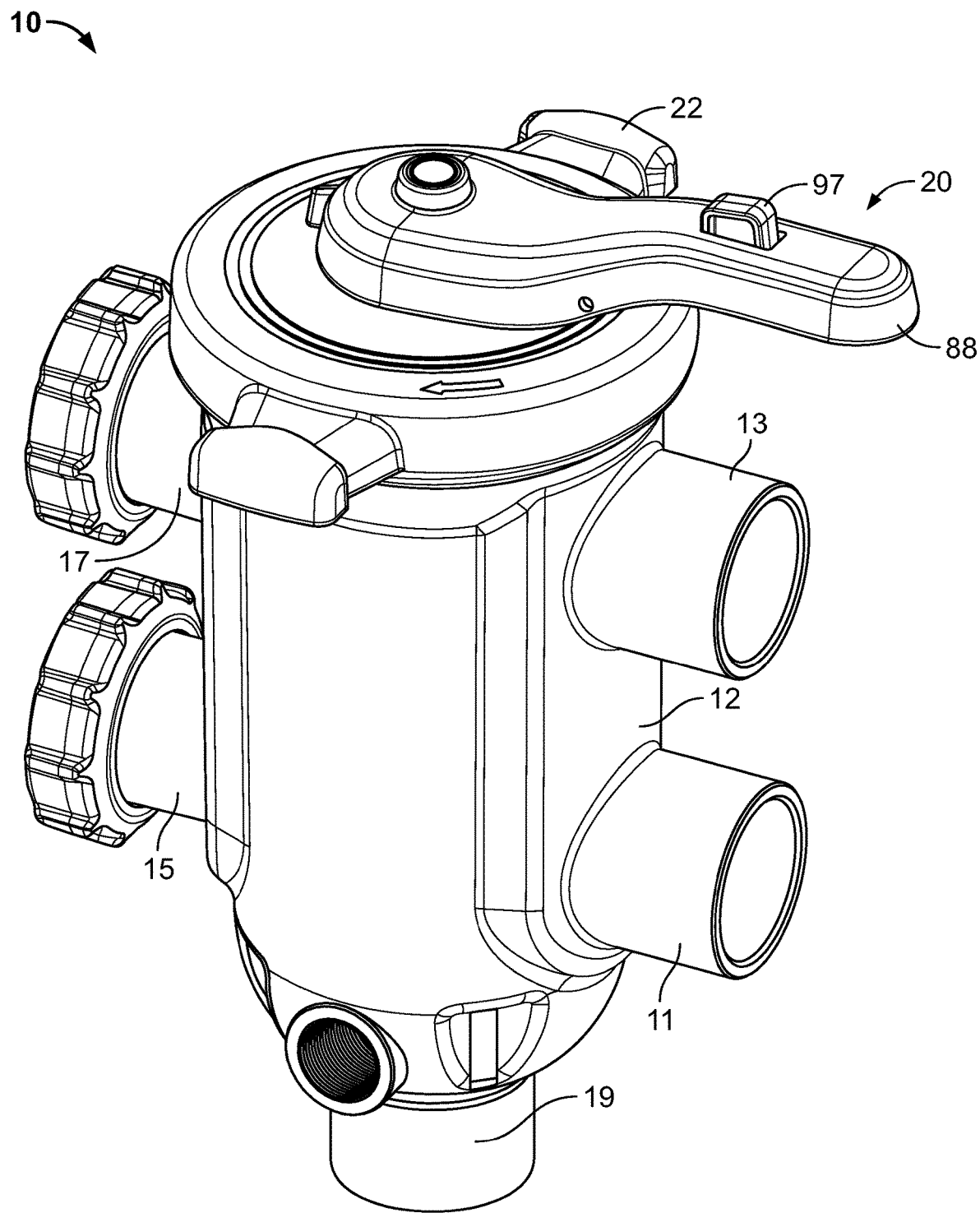
FIGS. 2-3 are side perspective views of the valve assembly of FIG. 1.
Figure 3:
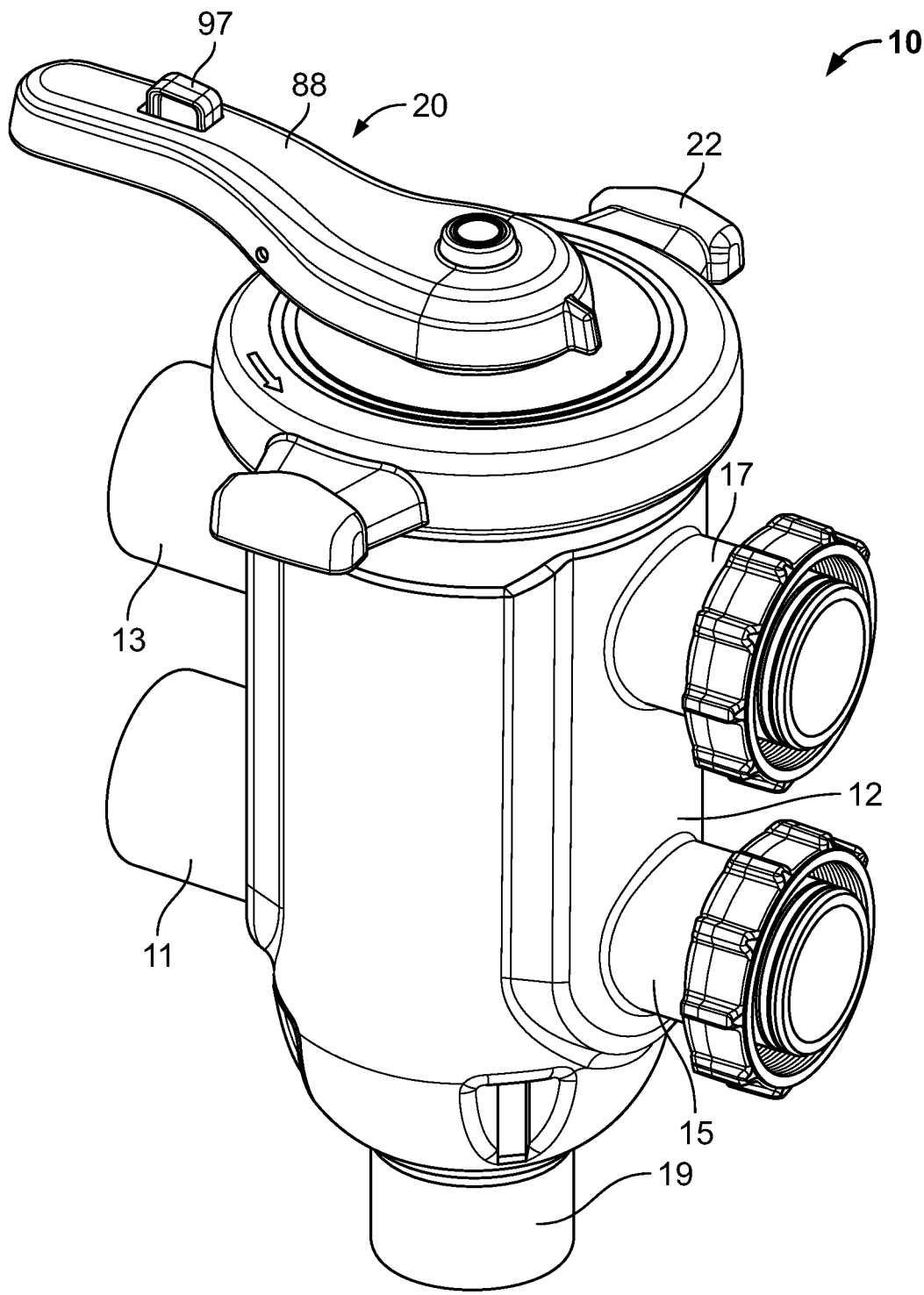
Figure 4:
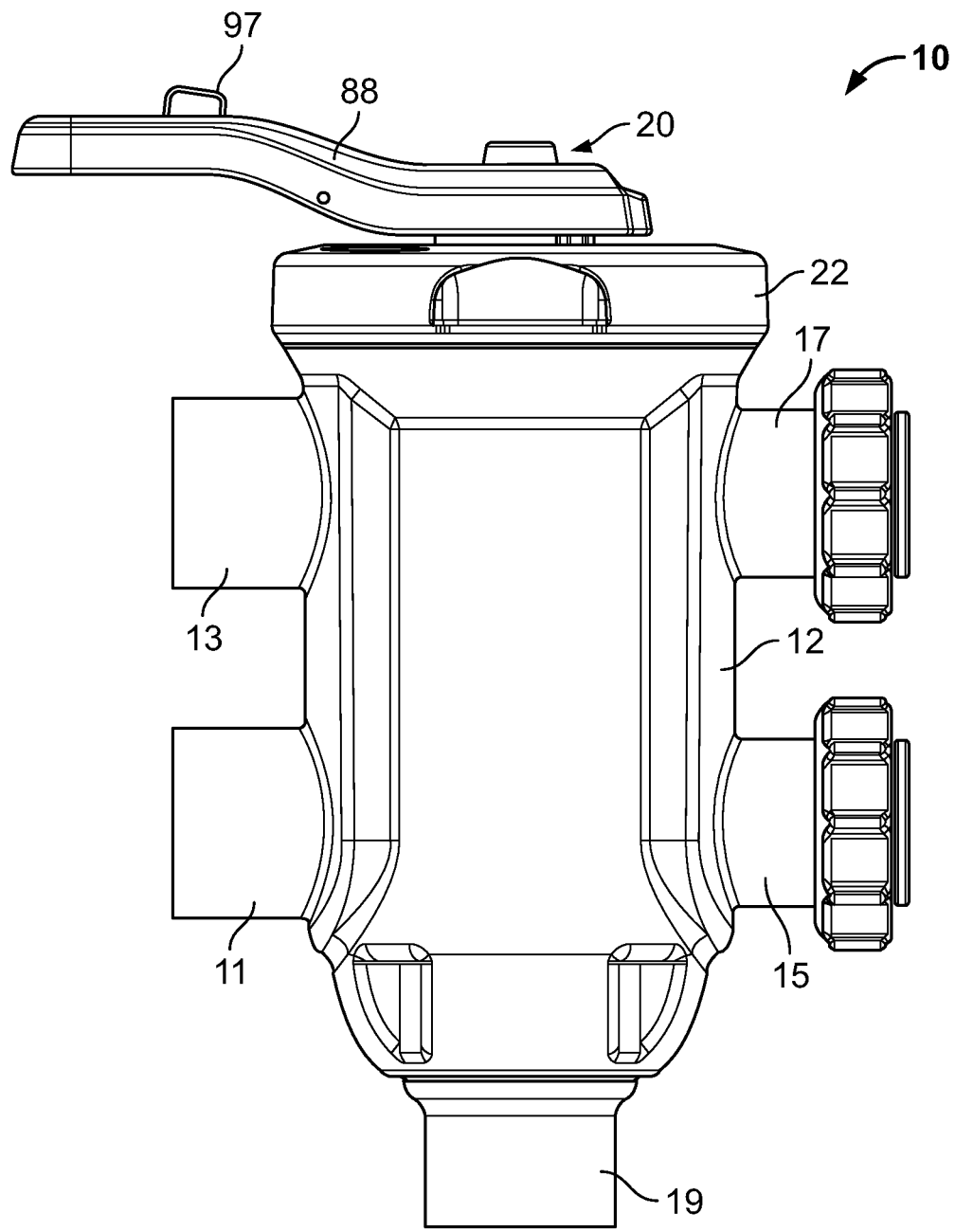
FIGS. 4-5 are side views of the valve assembly of FIG. 1.
Figure 5:
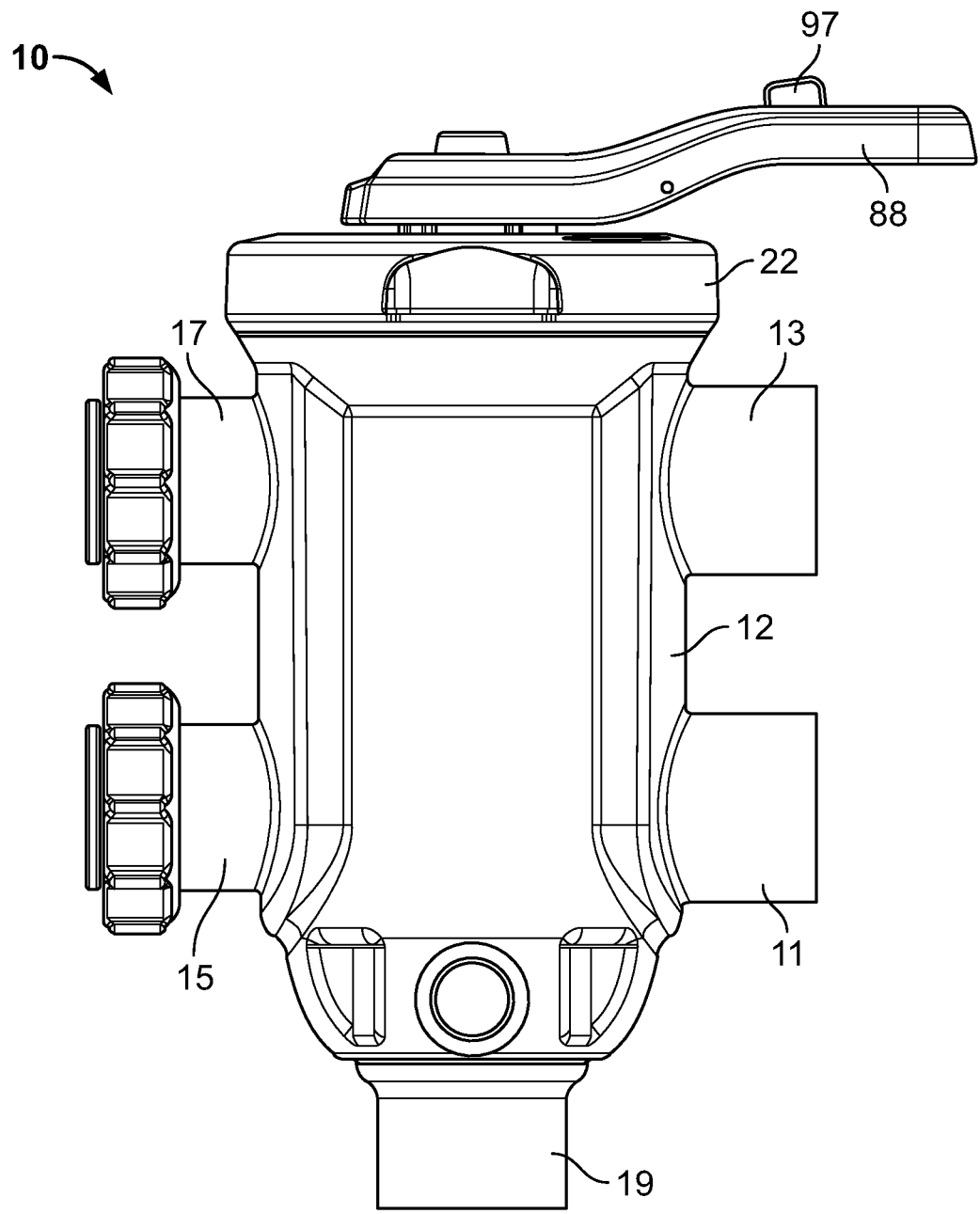

The exemplary embodiments disclosed herein are illustrative of advantageous valve assemblies, and systems of the present disclosure and methods/techniques thereof. It should be understood, however, that the disclosed embodiments are merely exemplary of the present disclosure, which may be embodied in various forms. Therefore, details disclosed herein with reference to exemplary valve assemblies/fabrication methods and associated processes/techniques of assembly and use are not to be interpreted as limiting, but merely as the basis for teaching one skilled in the art how to make and use the advantageous valve assemblies/systems of the present disclosure.

The present disclosure provides for improved valve assemblies (e.g., multi-position valve assemblies). More particularly, the present disclosure provides for advantageous multi-position rotary backwash valve assemblies.

In certain embodiments, the present disclosure provides for a four-position rotary high efficiency valve assembly for a swimming pool or spa filter. As discussed further below, the present disclosure provides multi-position valve assemblies having infrequent maintenance and allowing for user-friendly service.

Referring now to the drawings, like parts are marked throughout the specification and drawings with the same reference numerals, respectively. Drawing figures are not necessarily to scale and in certain views, parts may have been exaggerated for purposes of clarity.

Referring now to FIGS. 1-5, there is illustrated a valve assembly 10 according to exemplary embodiments of the present disclosure. Exemplary valve assembly 10 can include housing 12, waste port seal carrier 14, seal carriers 16 (e.g., two seal carriers 16), hub member 18, cover assembly 20 and lock ring 22. In general, assembled valve assembly 10 can be utilized in fluid systems as a flow control assembly (e.g., as a backwash valve assembly 10 associated with a swimming pool or spa filter).

Housing 12 can include first source port 11, second source port 13, first filter port 15, second filter port 17 and waste port 19. Exemplary housing 12 is substantially cylindrical and extends from a first open end 21 to a second open end 23, and defines a receiving cavity 25 therebetween. The ports 11, 13, 15 and 17 are in communication with the receiving cavity 25, and the waste port 19 is in communication with the second open end 23 of the housing 12.

In exemplary embodiments and as shown in FIGS. 15 and 17-20, the interior of cavity 25 of housing 12 includes first pocket 24 and second pocket 26. In general and as discussed further below, each pocket 24, 26 is configured and dimensioned to releasably house and secure a seal carrier 16 disposed within housing 12.

In some embodiments, each pocket 24, 26 extends from a position proximal the first open end 21 of the housing 12 to a position proximal the second open end 23 of housing 12. Moreover, exemplary first pocket 24 extends around and is in communication with ports 11 and 13, and second pocket 26 extends around and is in communication with ports 15 and 17.

Figure 15:
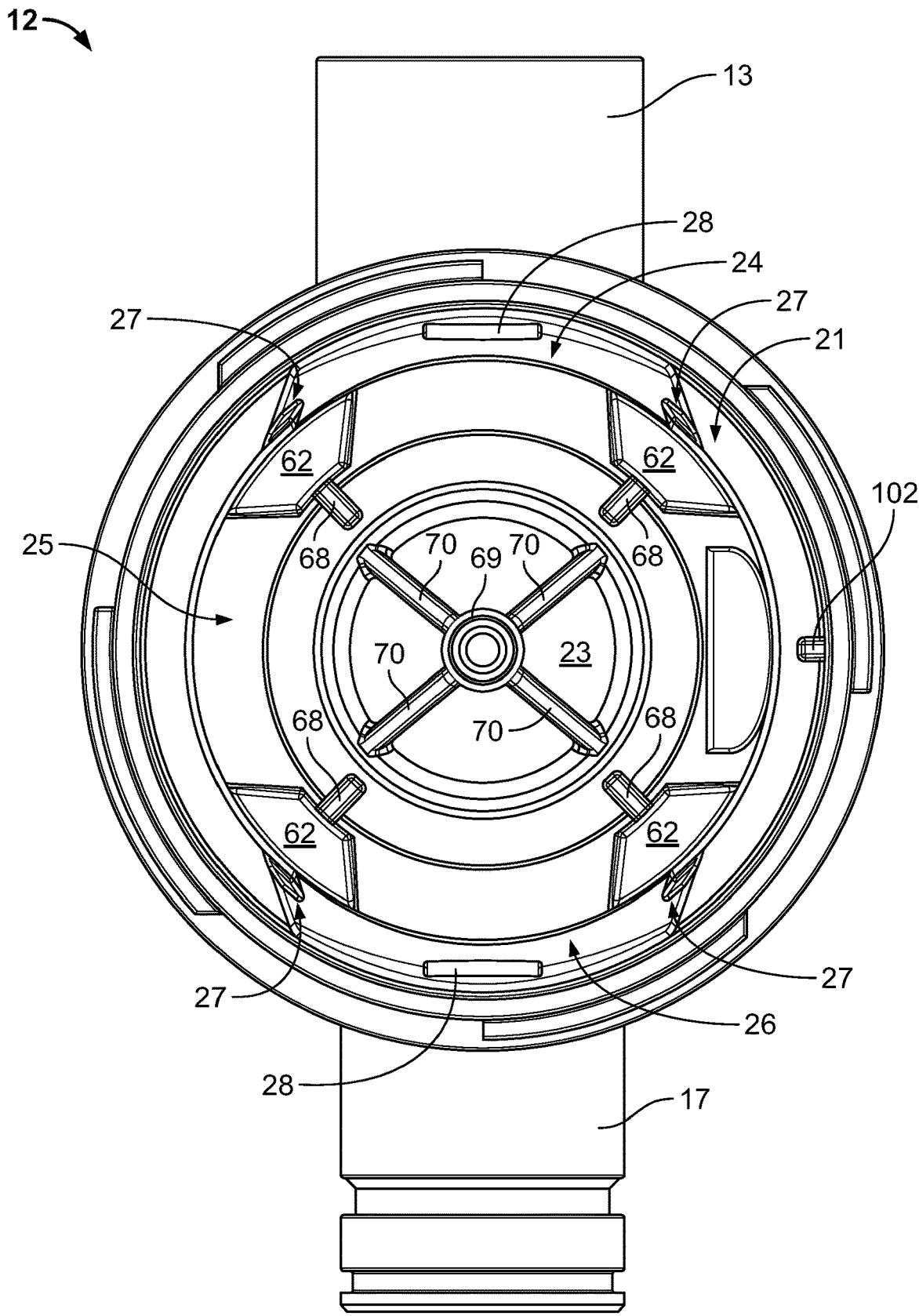
FIG. 15 is a top view of the housing of the valve assembly of FIG. 1.
Figure 16:
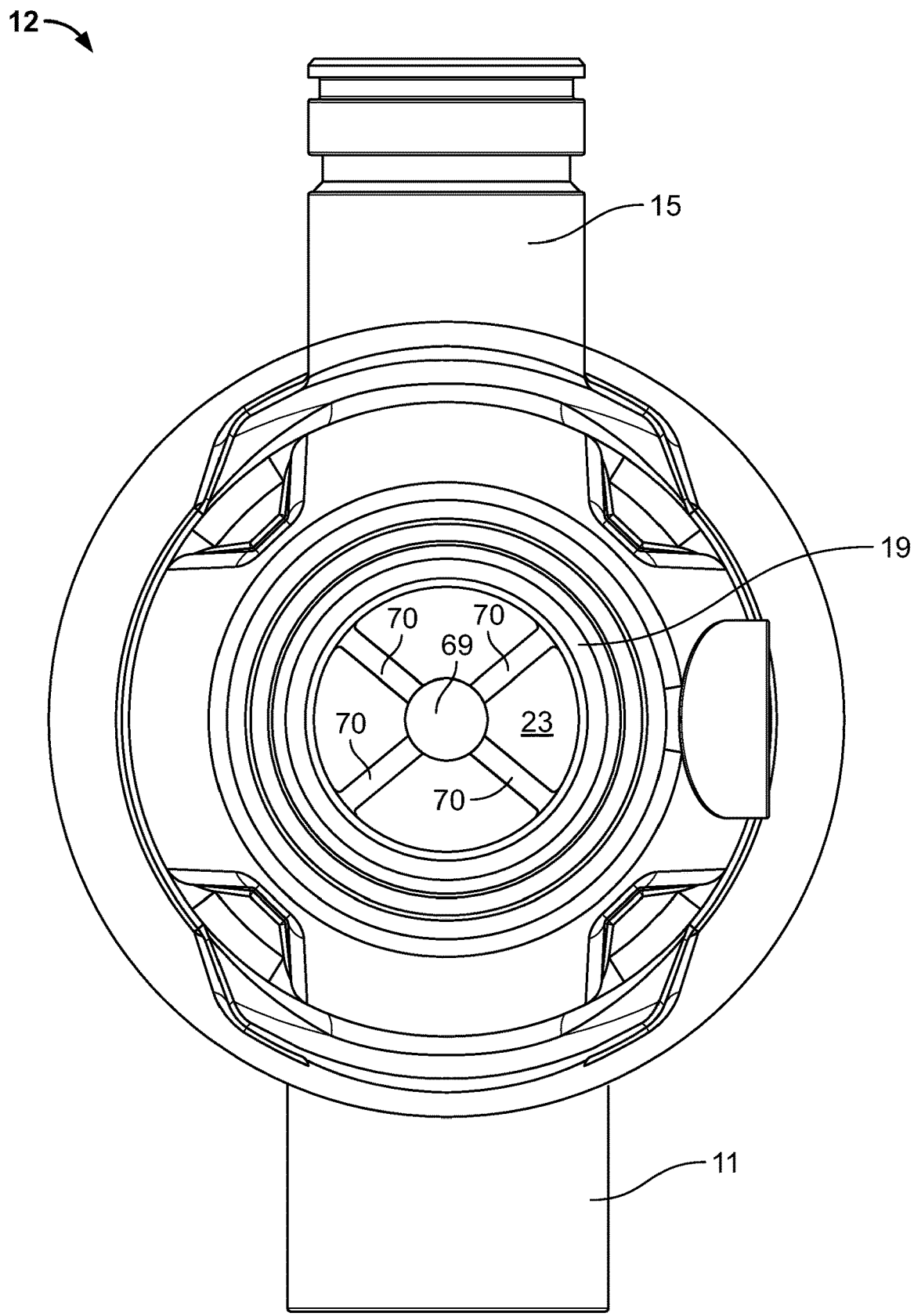
FIG. 16 is a bottom view of the housing of the valve assembly of FIG. 1.
Figure 17:
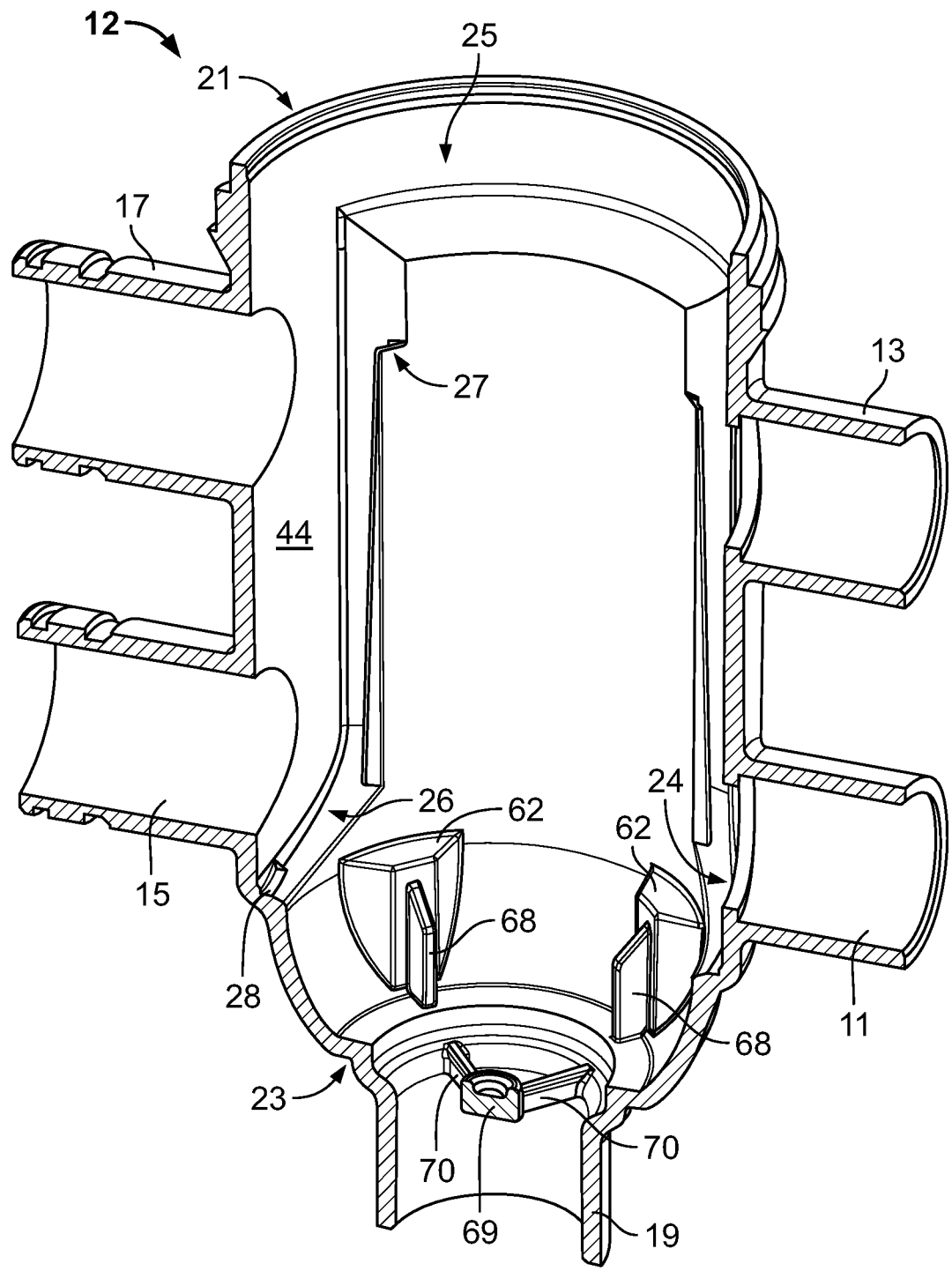
FIGS. 17-18 are cross-sectional side perspective views of the housing.
Figure 18:
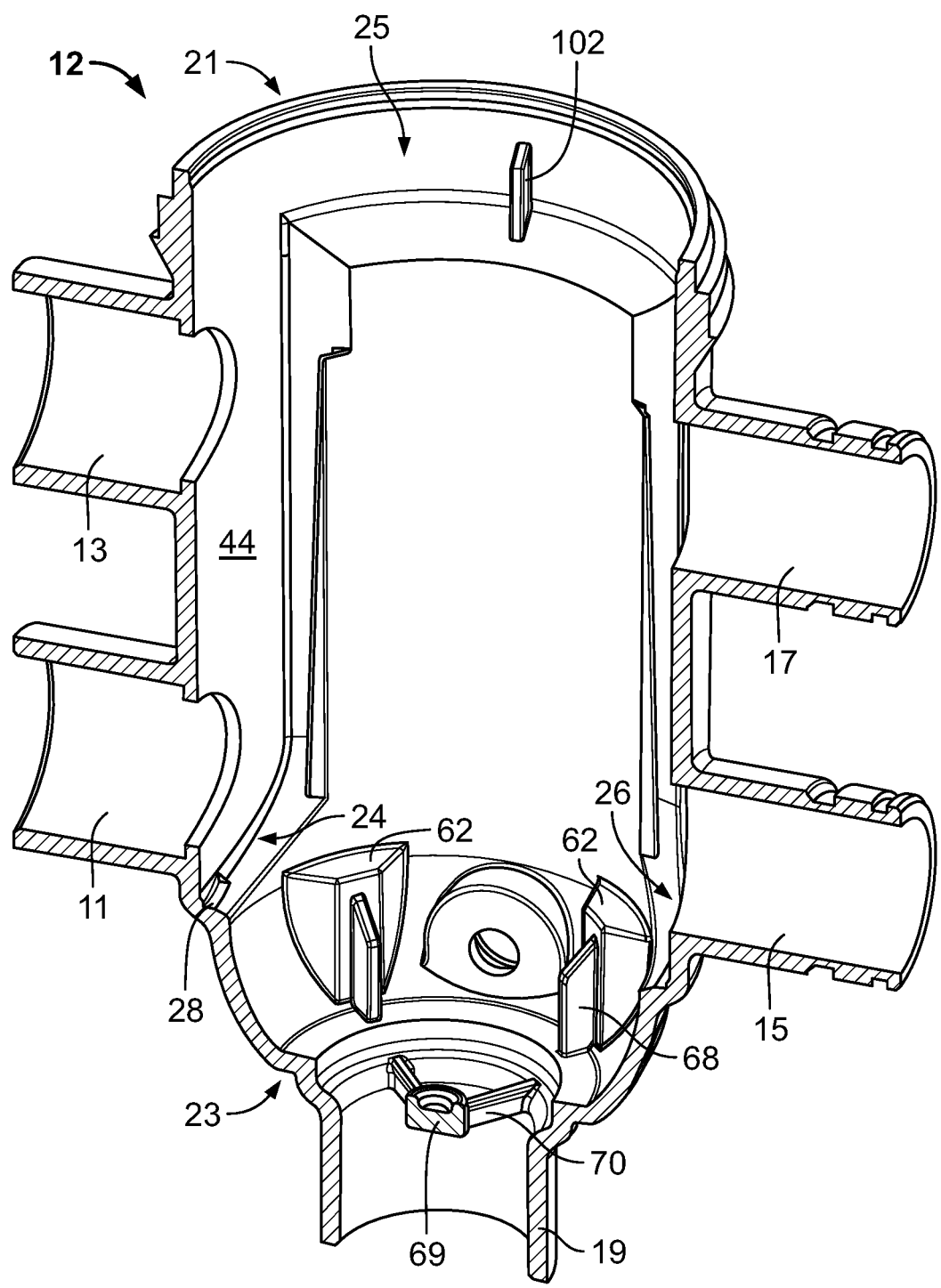
Figure 19:
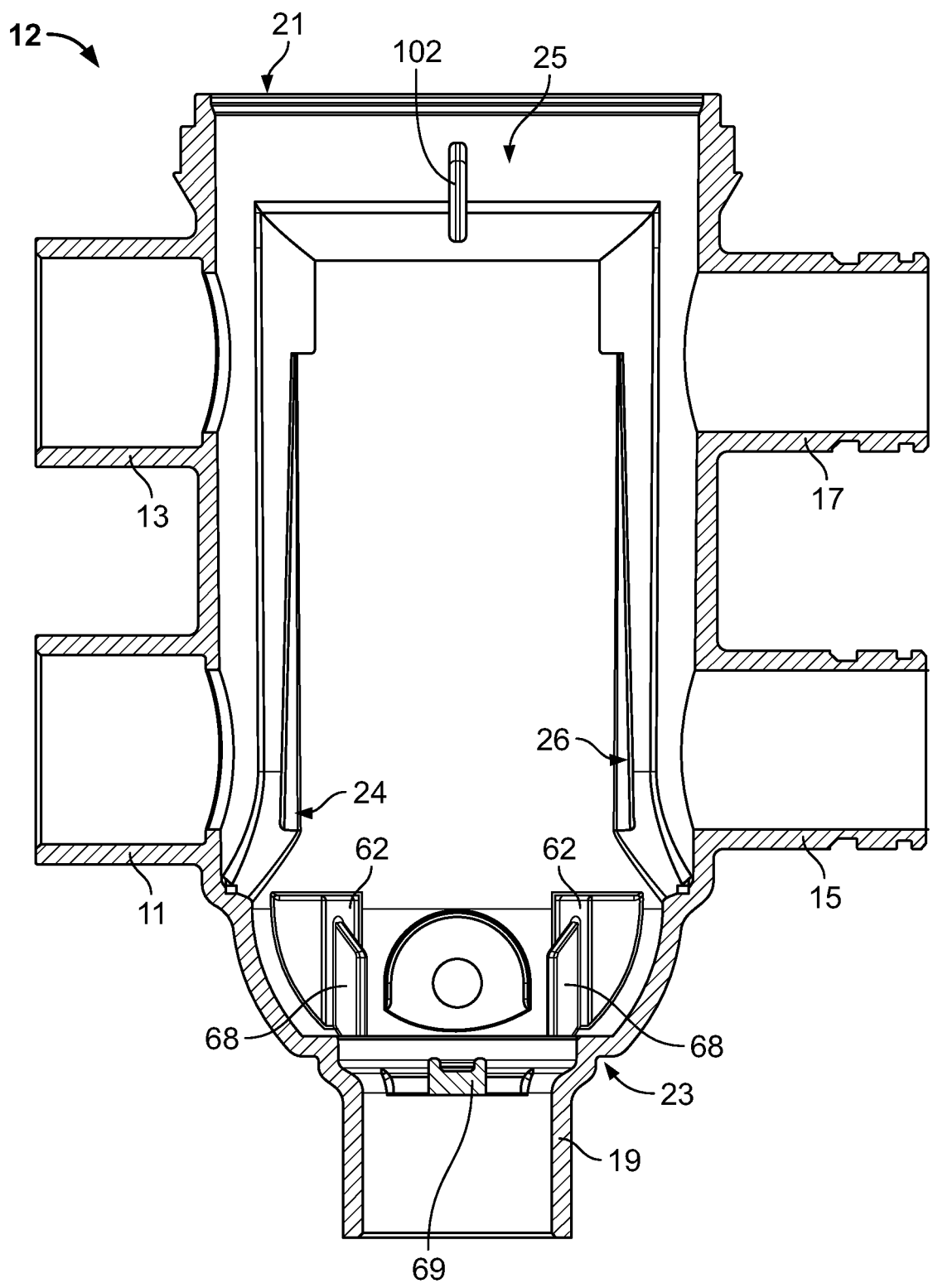
FIGS. 19-20 are cross-sectional side views of the housing.
Figure 20:
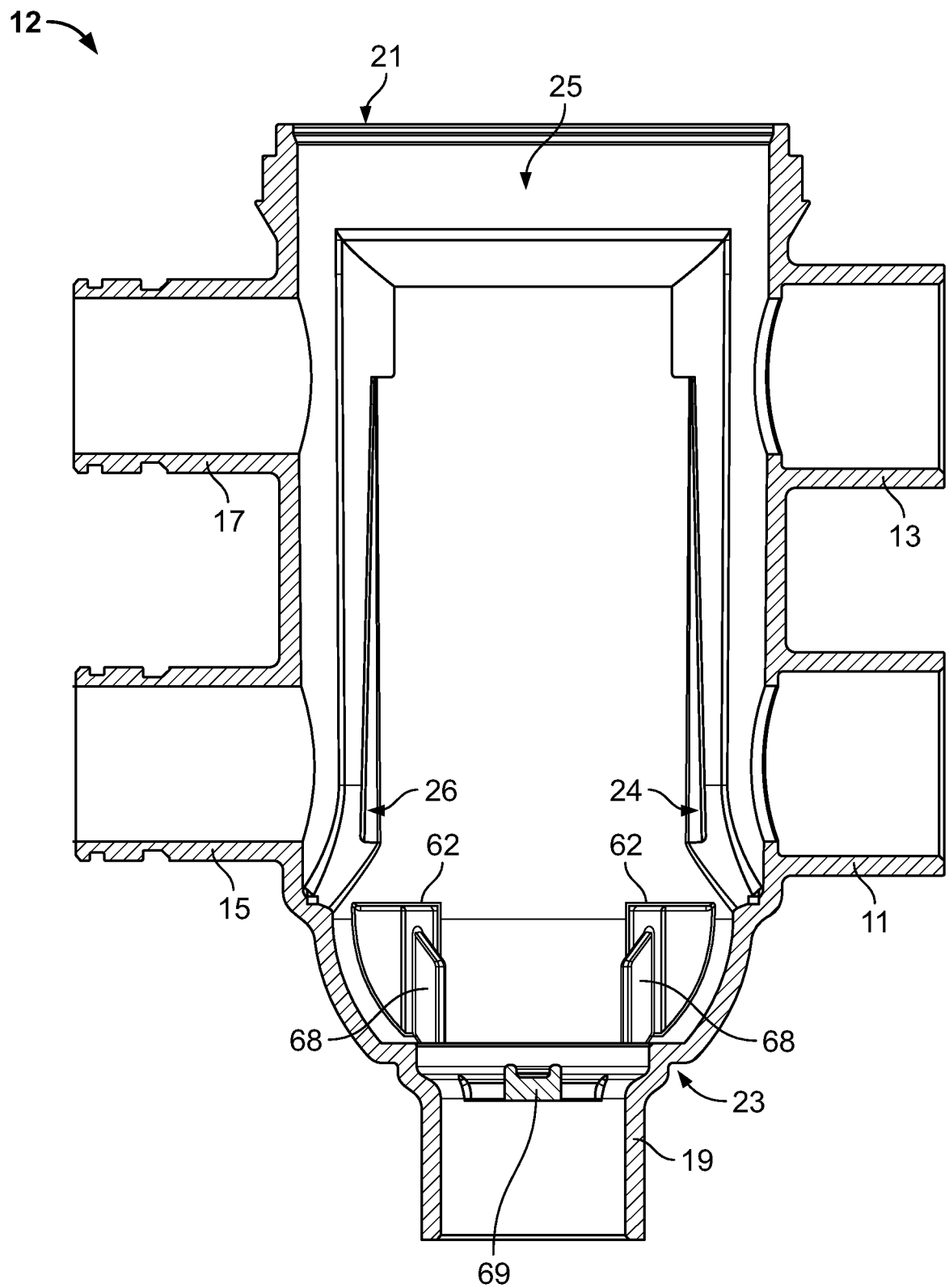
Figure 21:
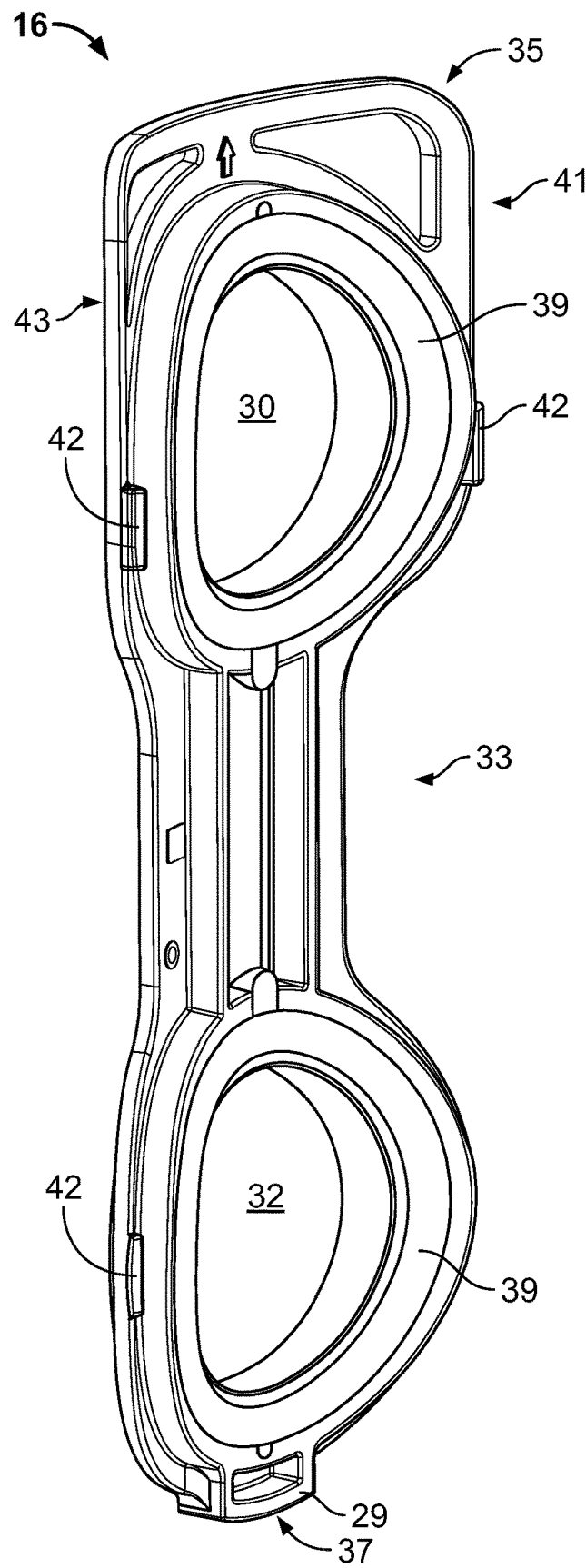
Figure 24:
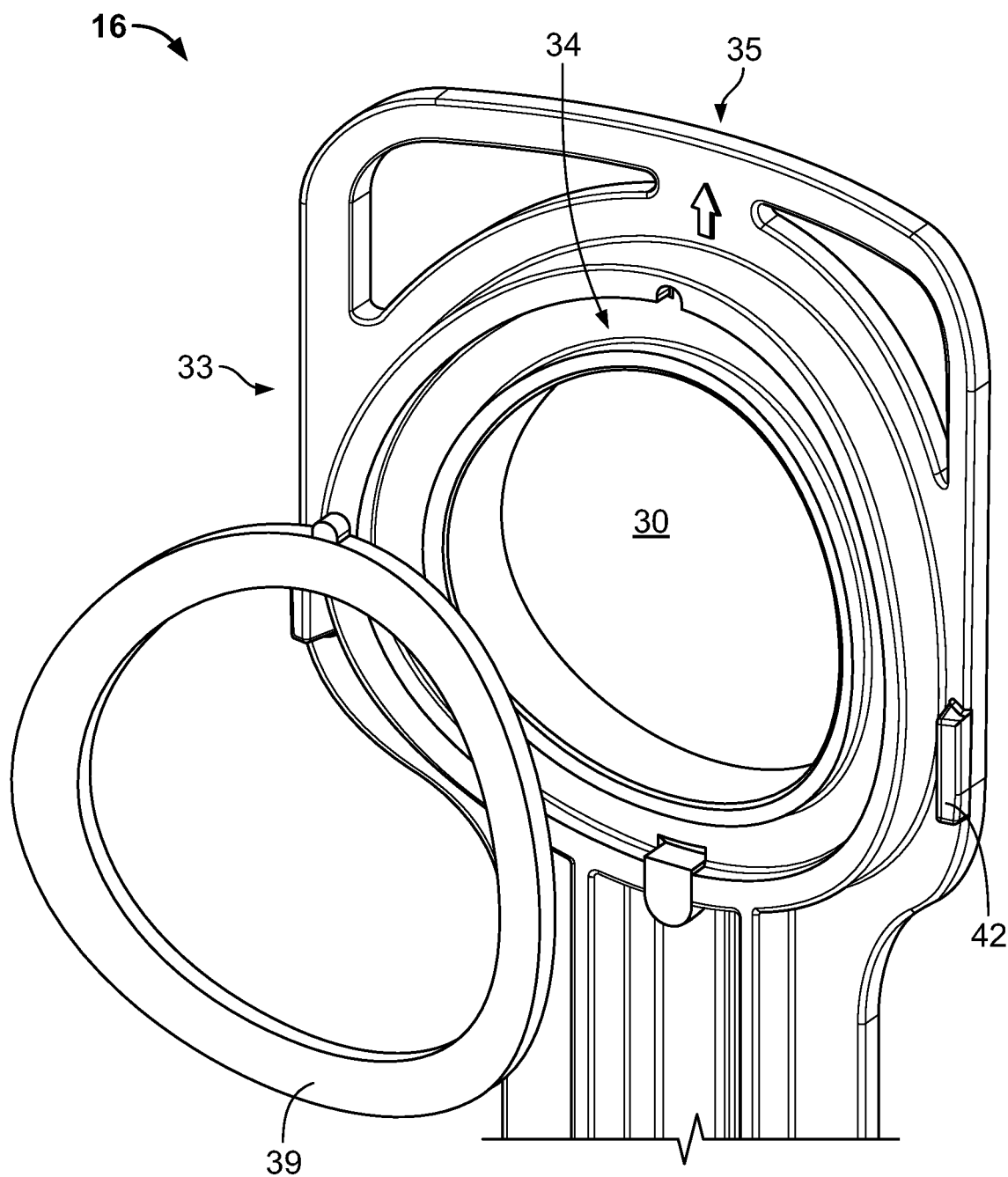
FIGS. 24-27 are partial side perspective views of a seal carrier.
Figure 25:
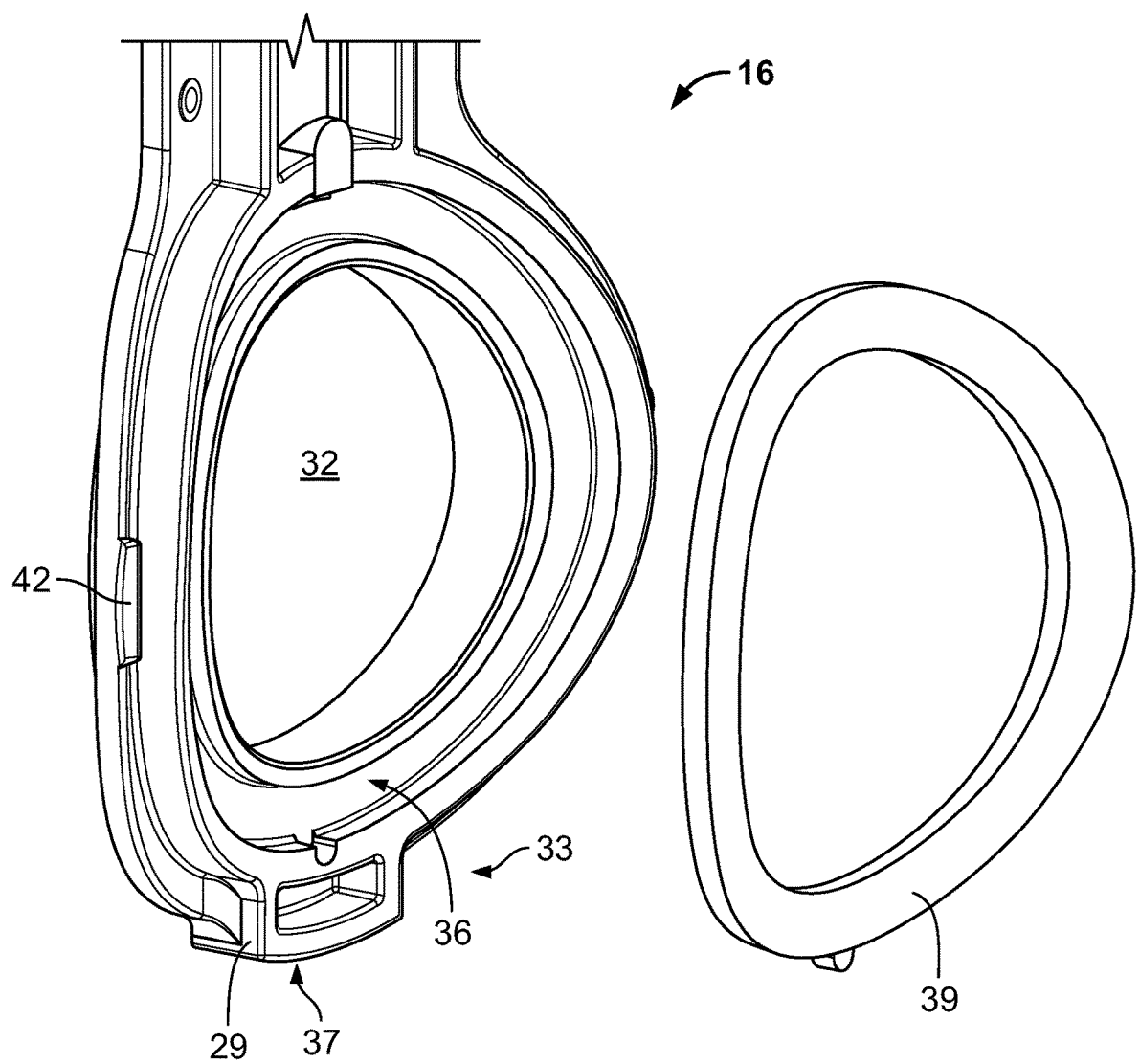
Figure 26:
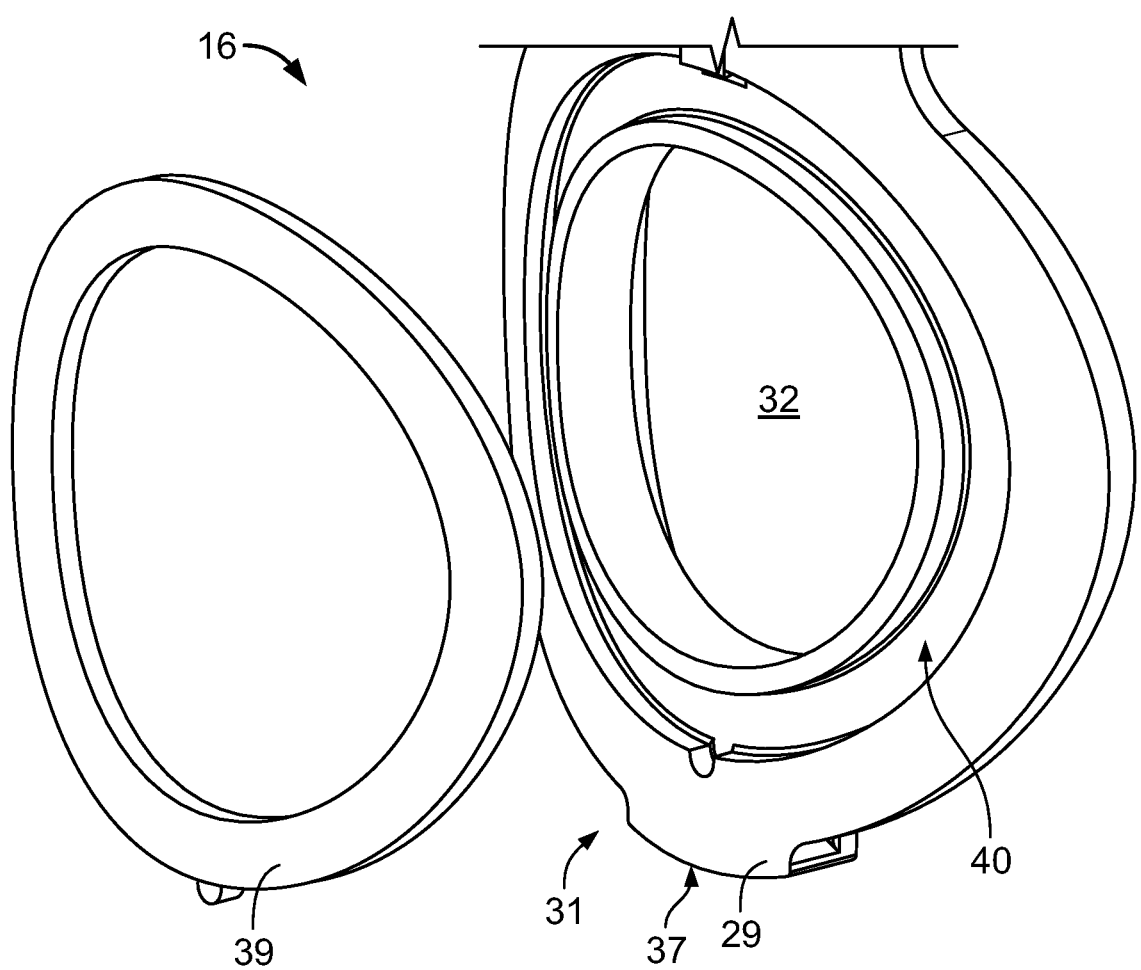
Figure 27:
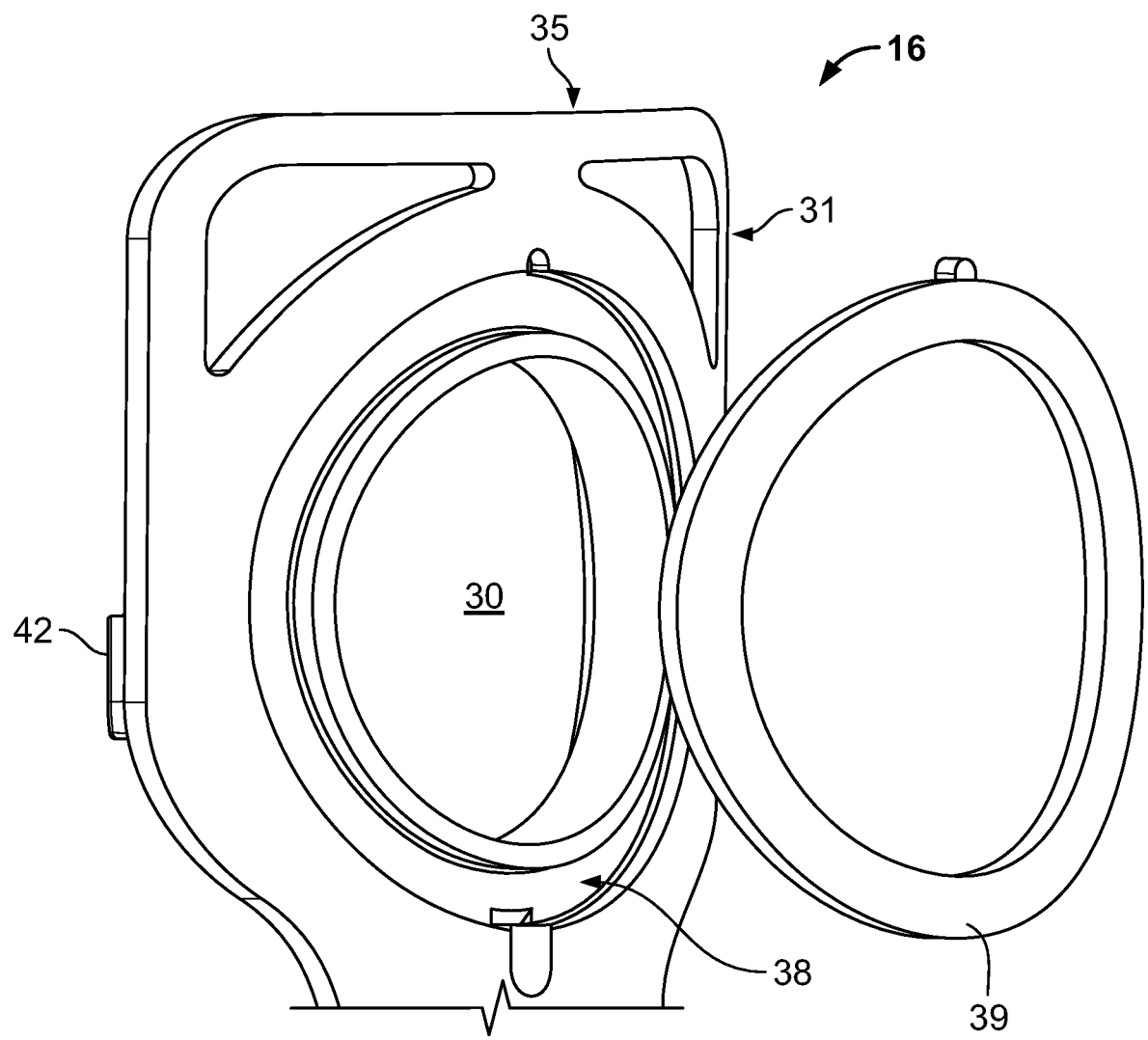
Figure 28:
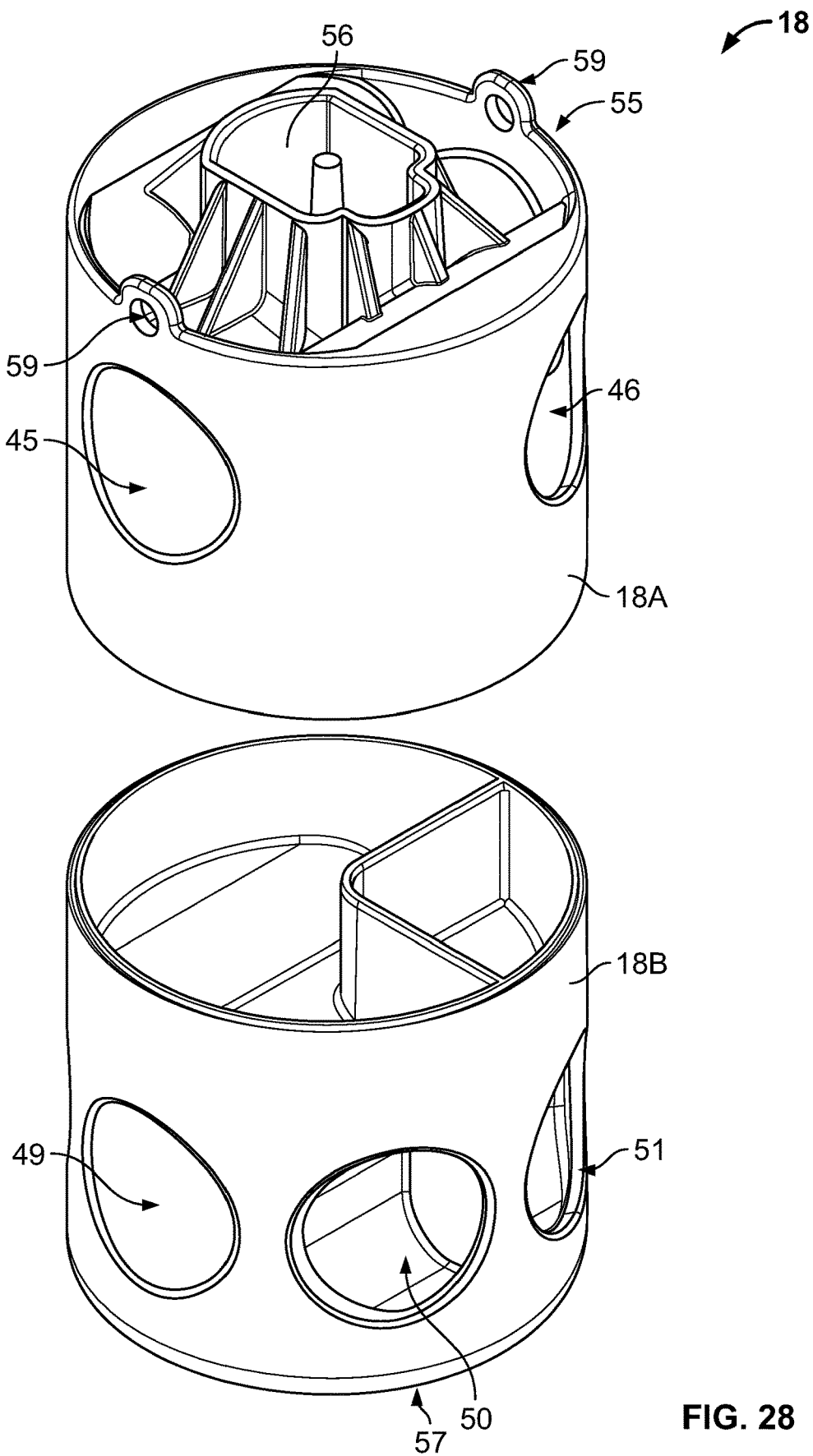
FIGS. 28-29 are side perspective views of an exemplary hub member of the valve assembly of FIG. 1, prior to assembly of the hub member.
Figure 29:
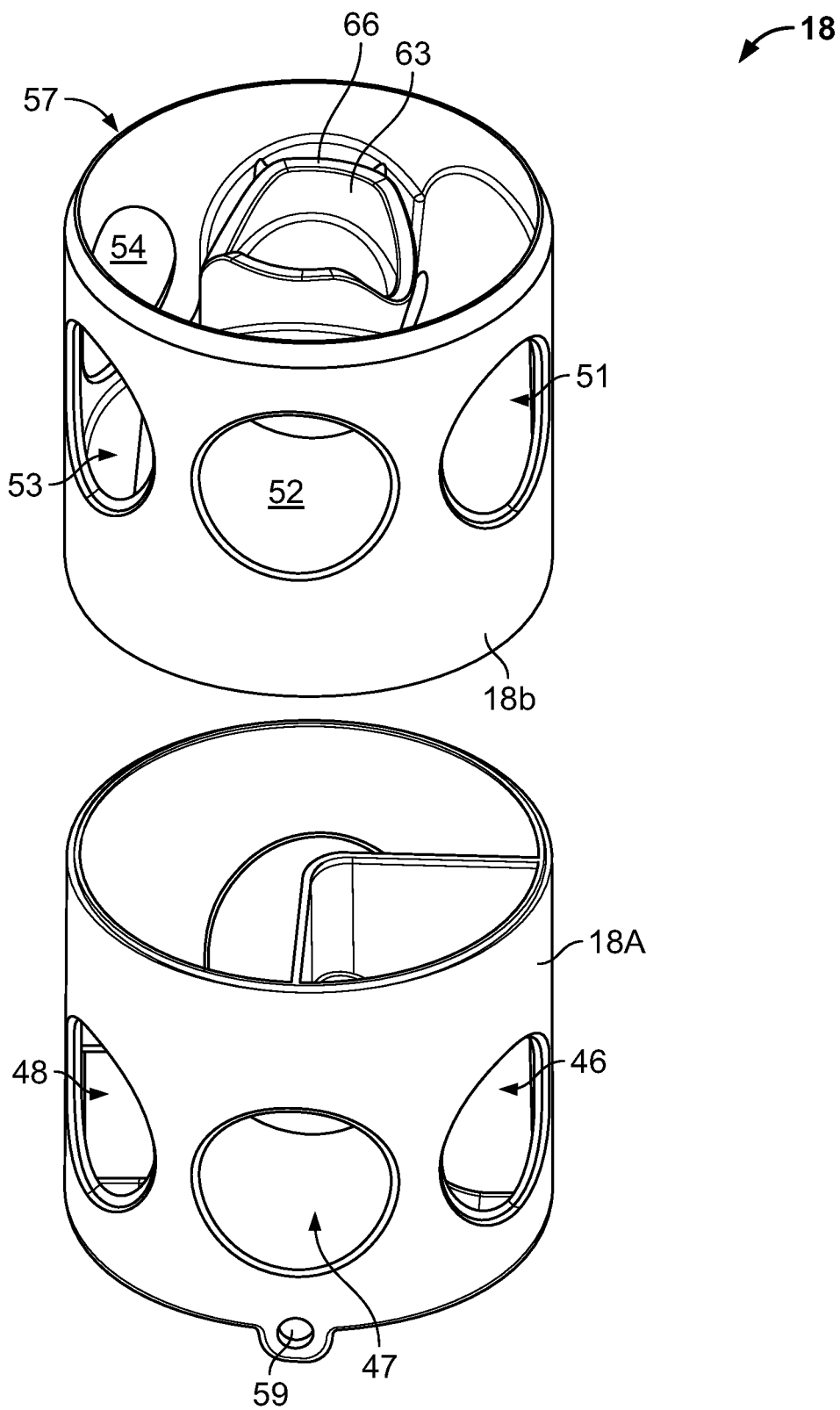
Figure 30:
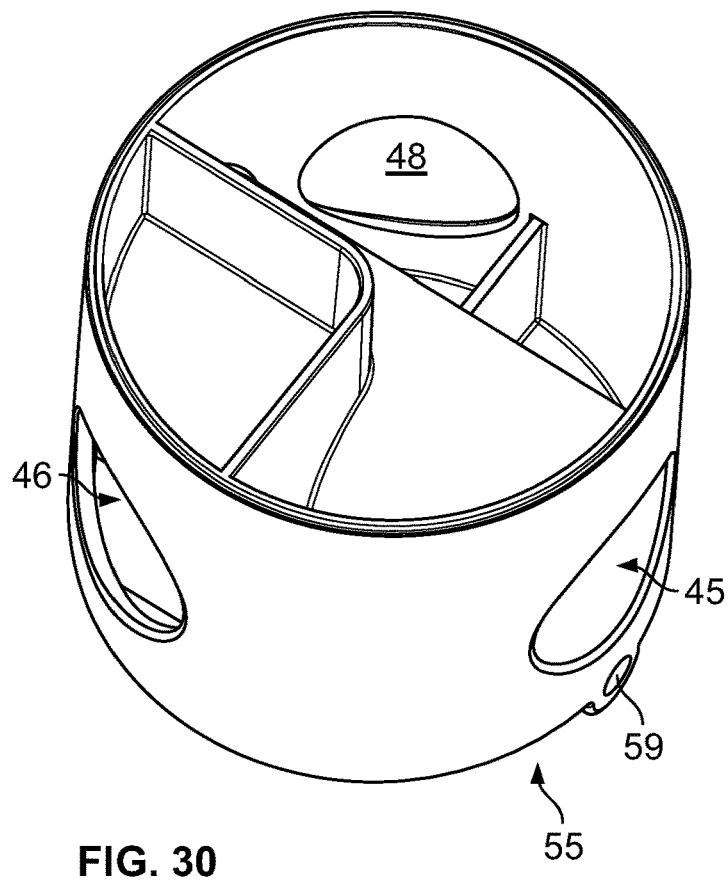
FIG. 30 is a side perspective view of an exemplary first hub portion.
Figure 31:
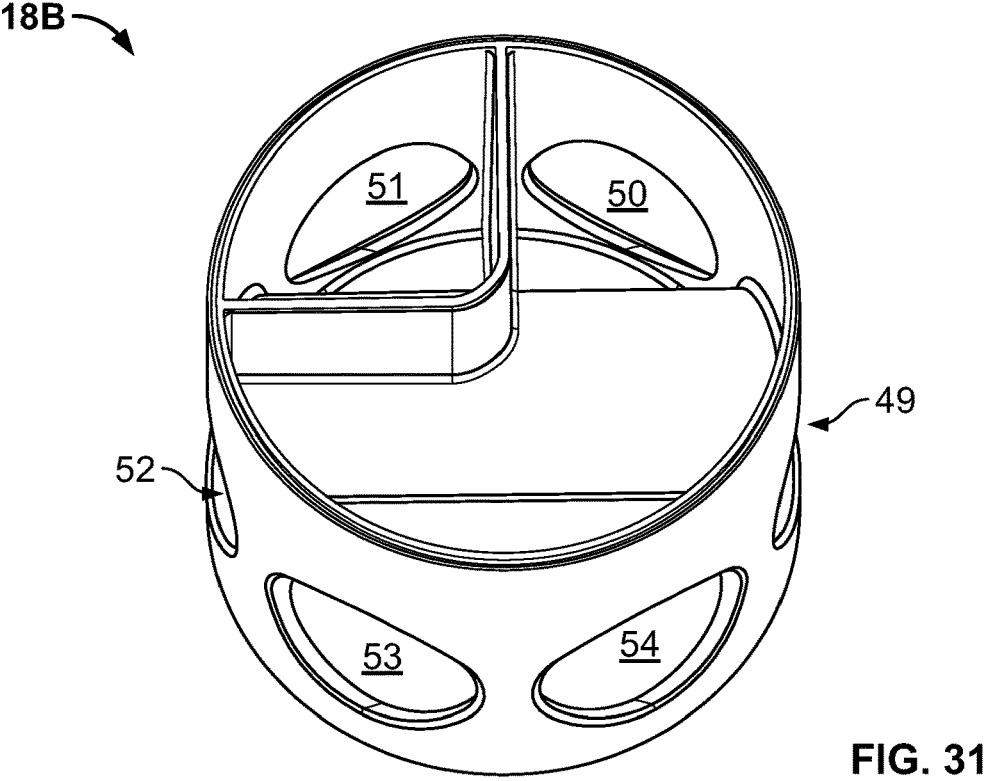
FIG. 31 is a side perspective view of an exemplary second hub portion.
Figure 32:
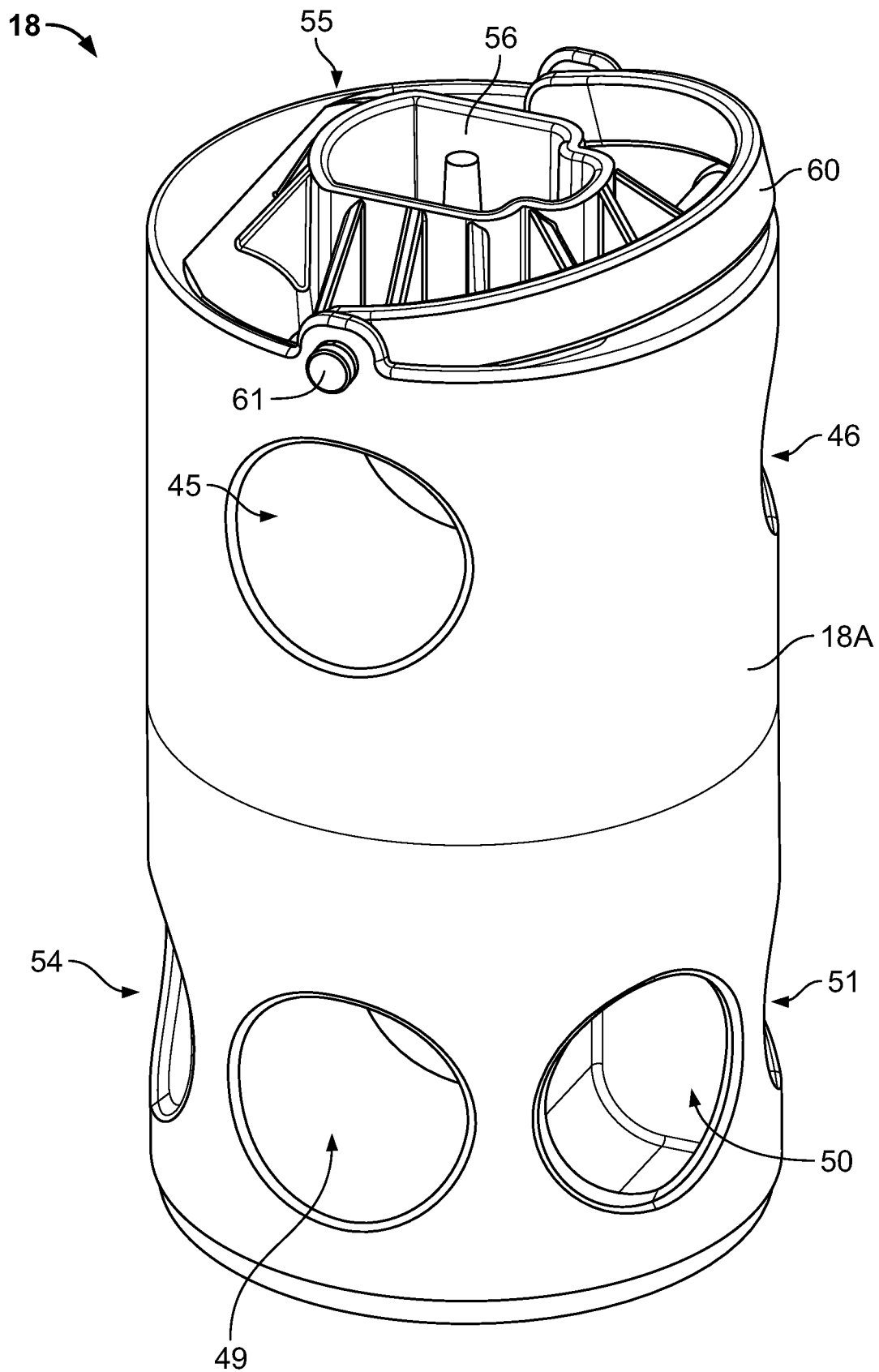
FIG. 32-38 are side perspective views of the hub member.
Figure 33:
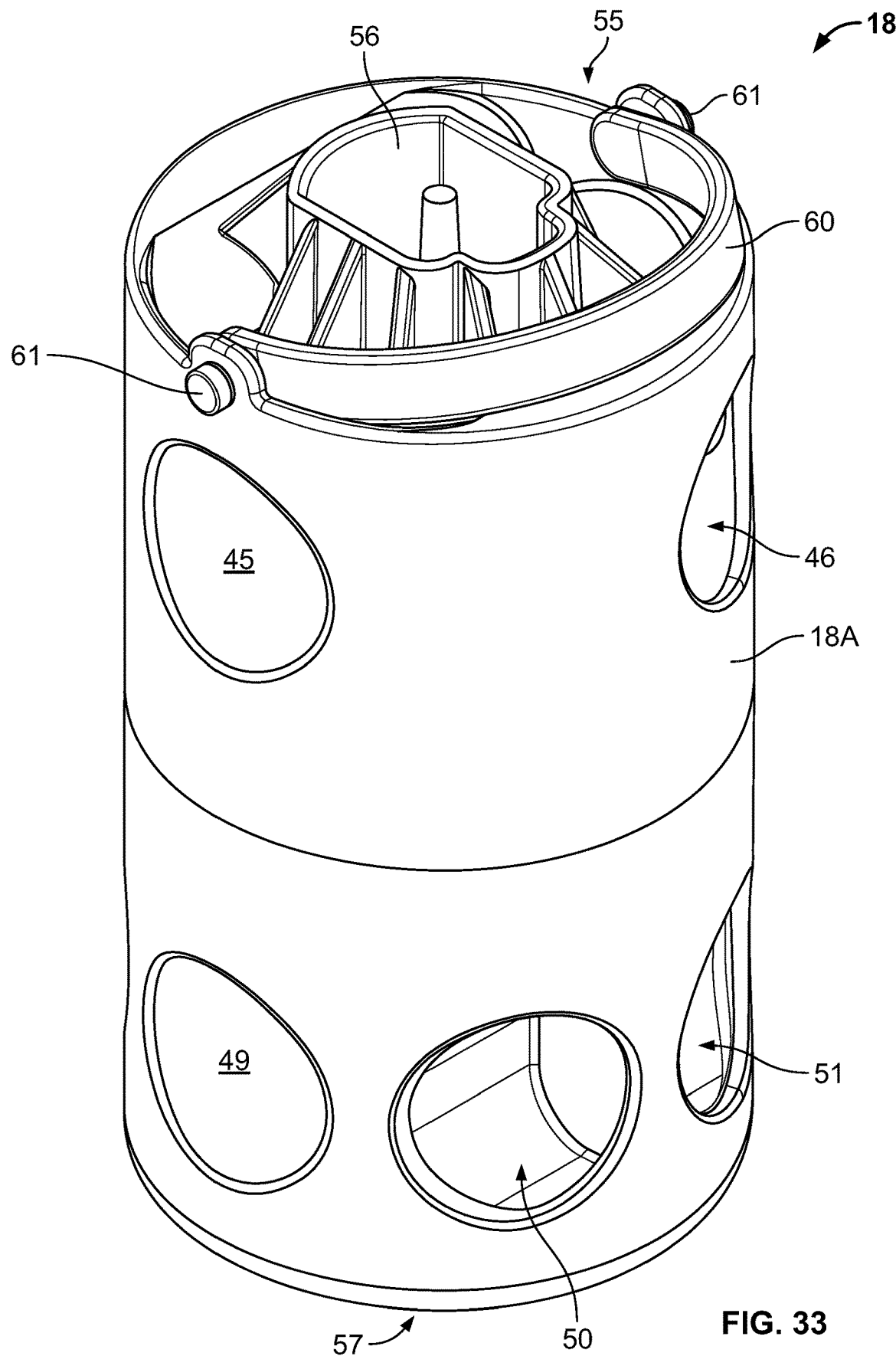
Figure 34:
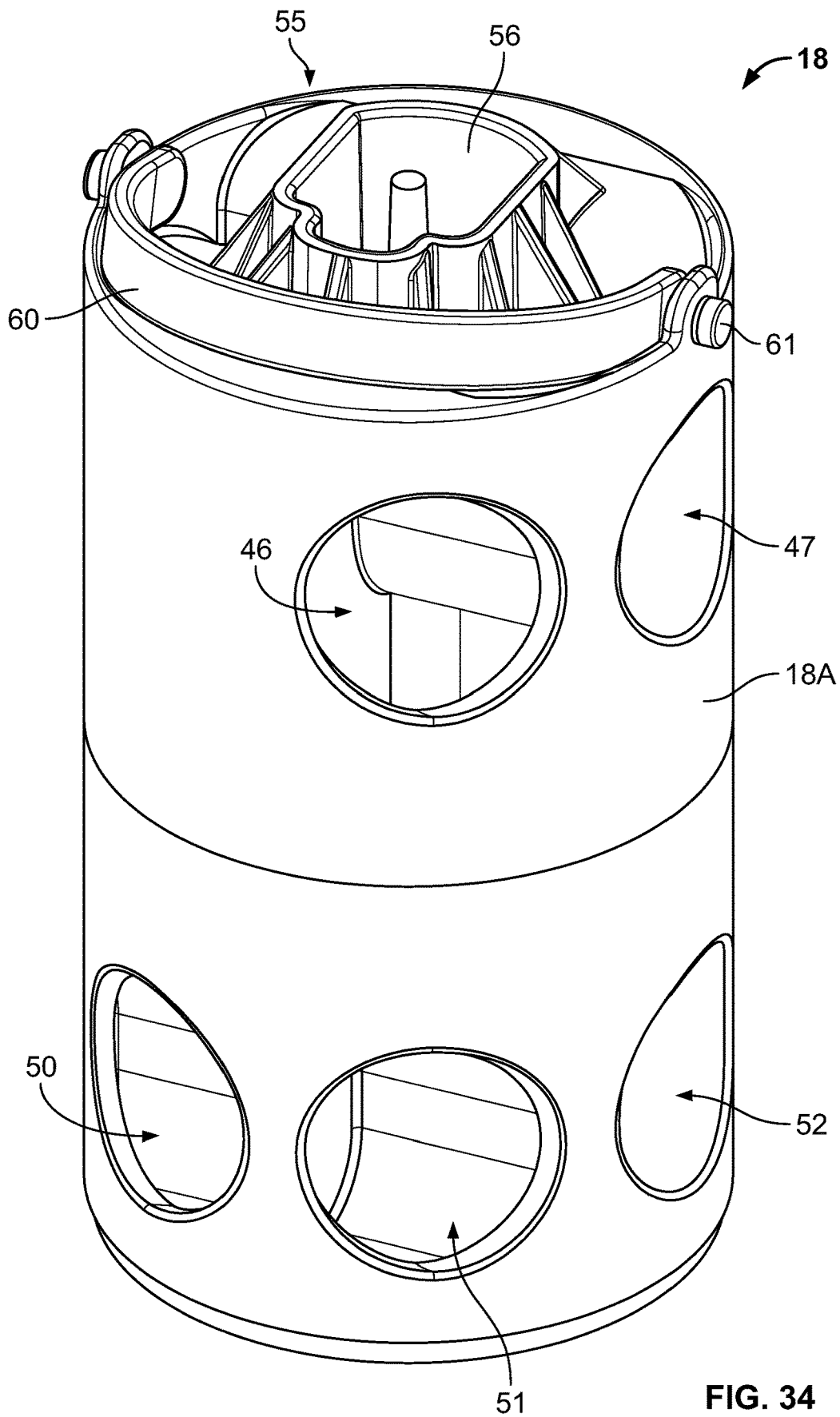
Figure 35:
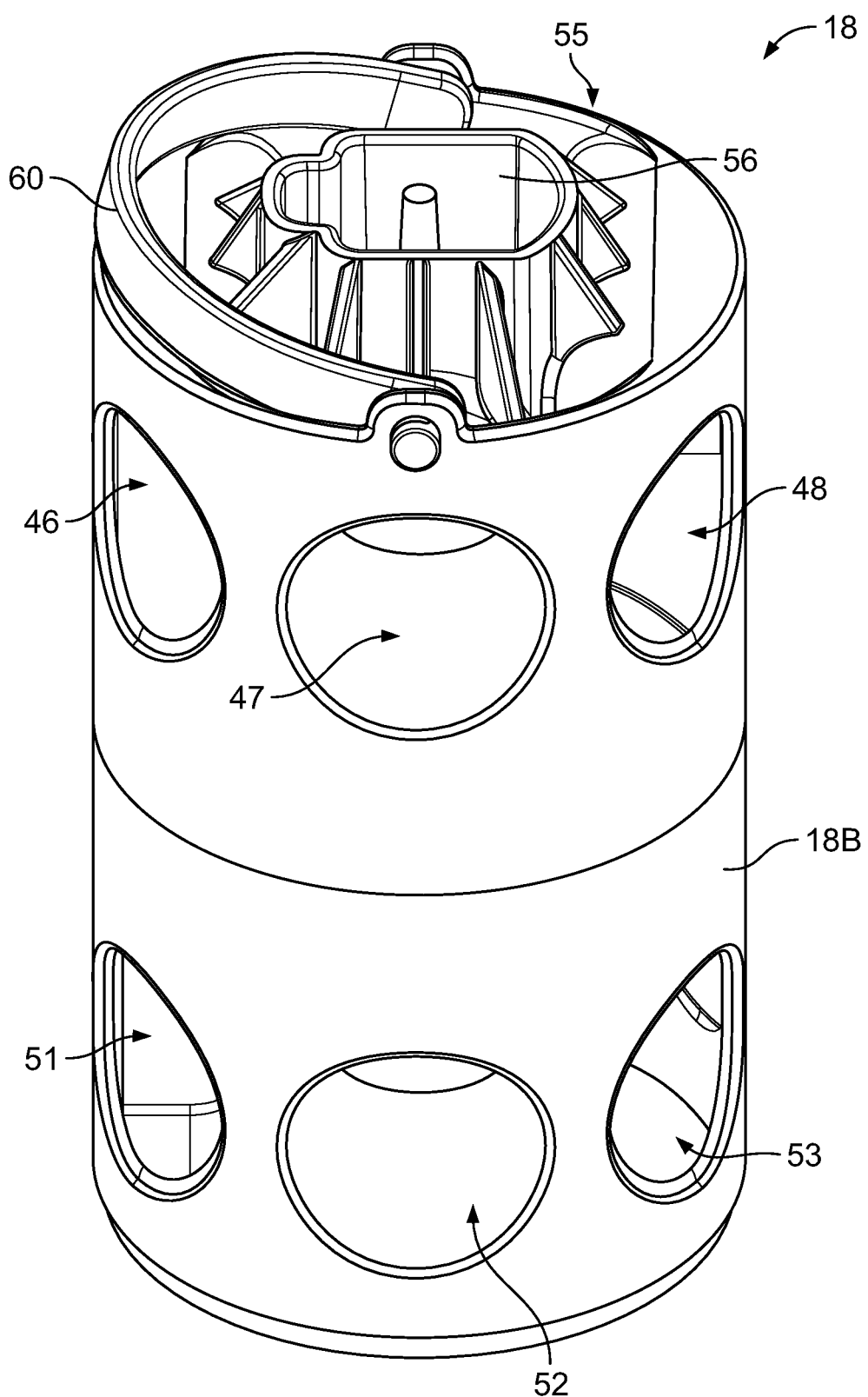
Figure 36:
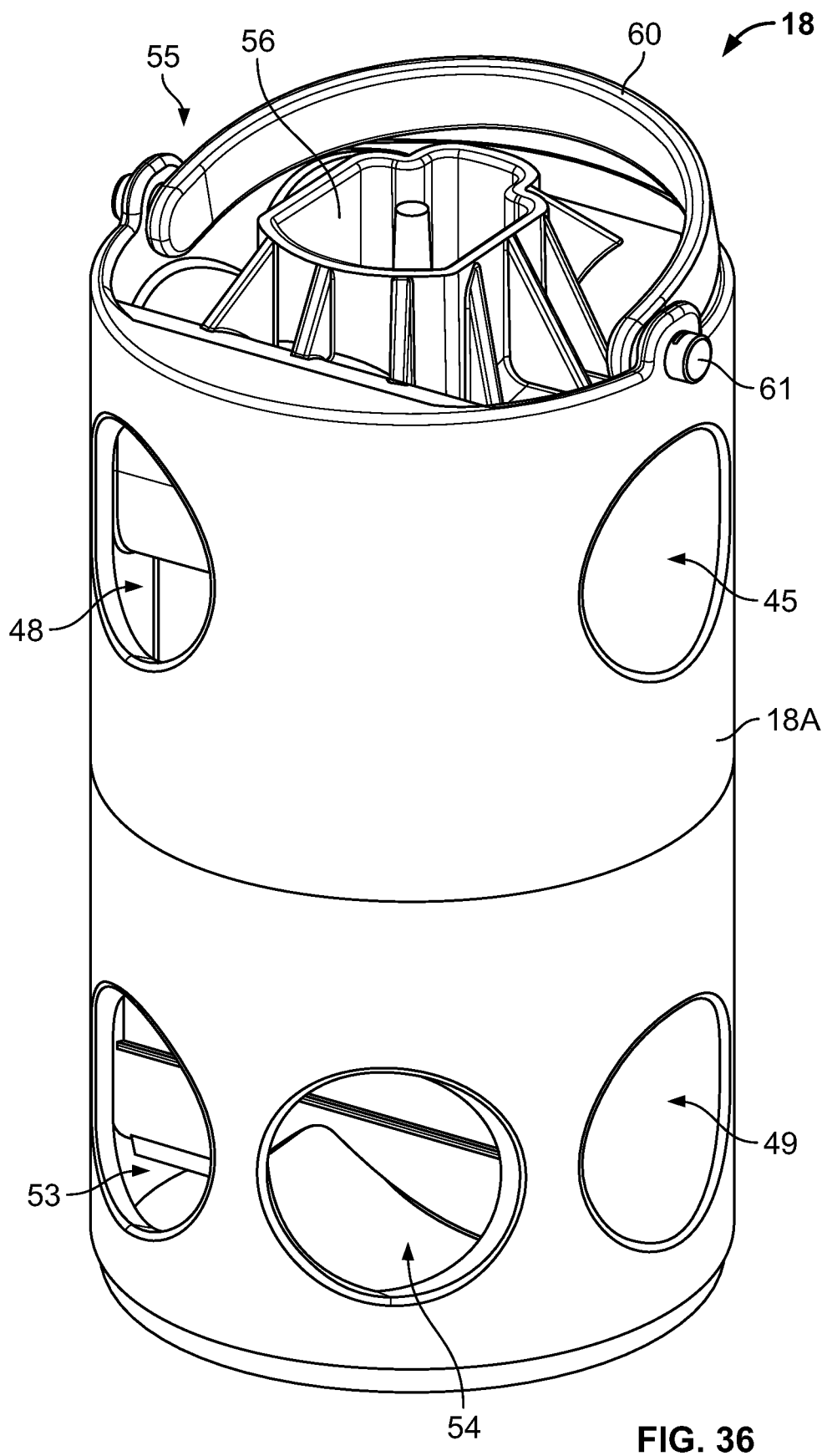
Figure 37:
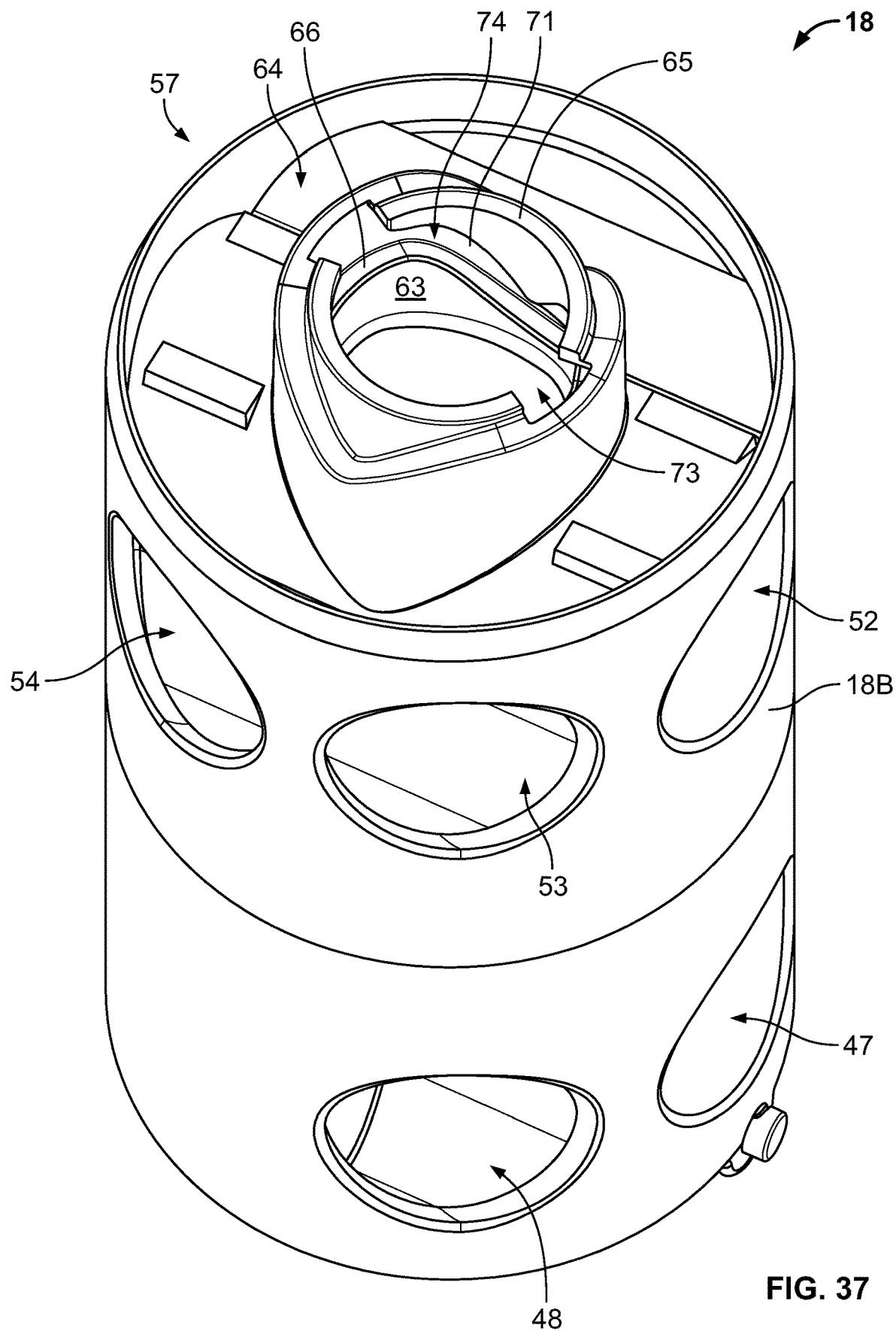
Figure 38:
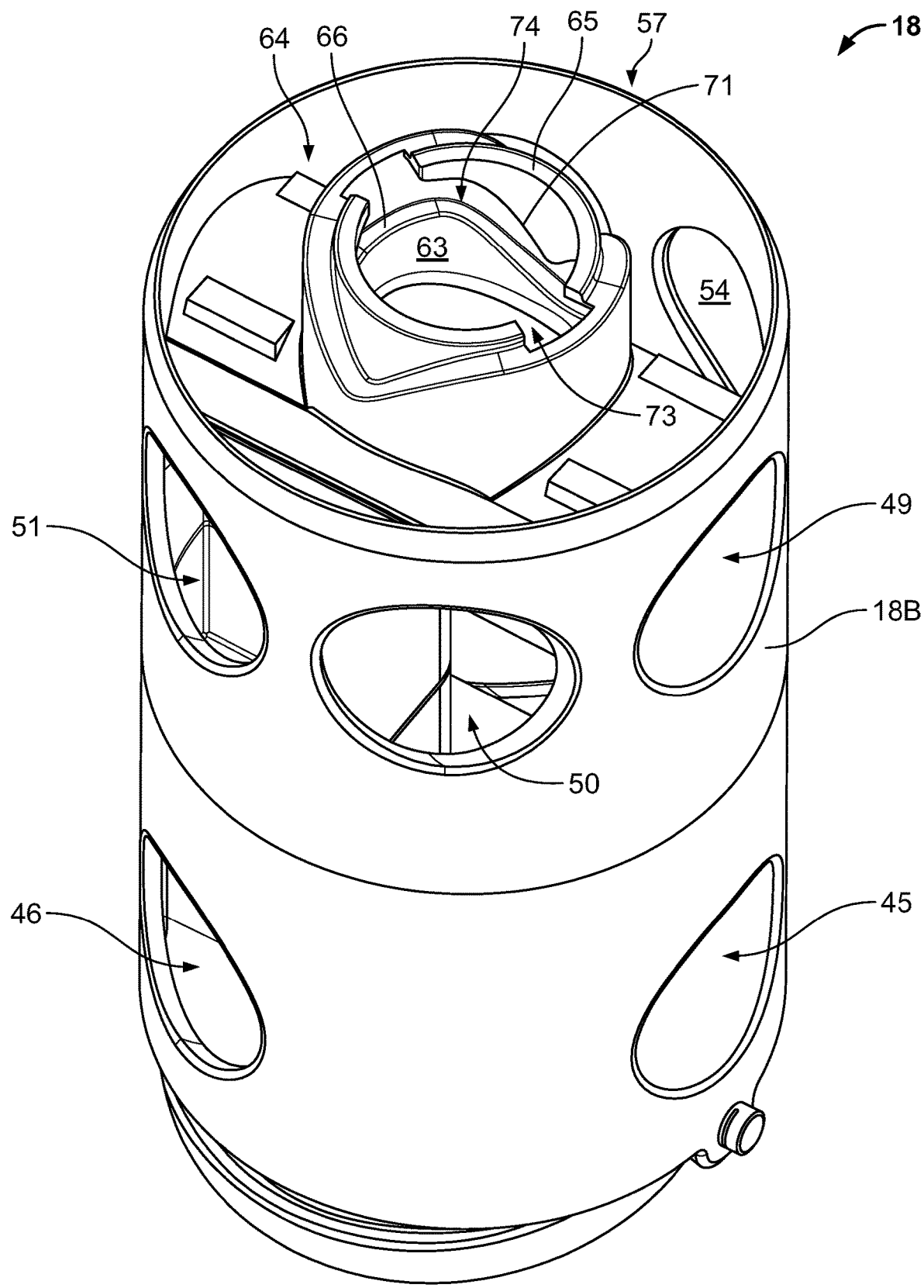
Figure 39:
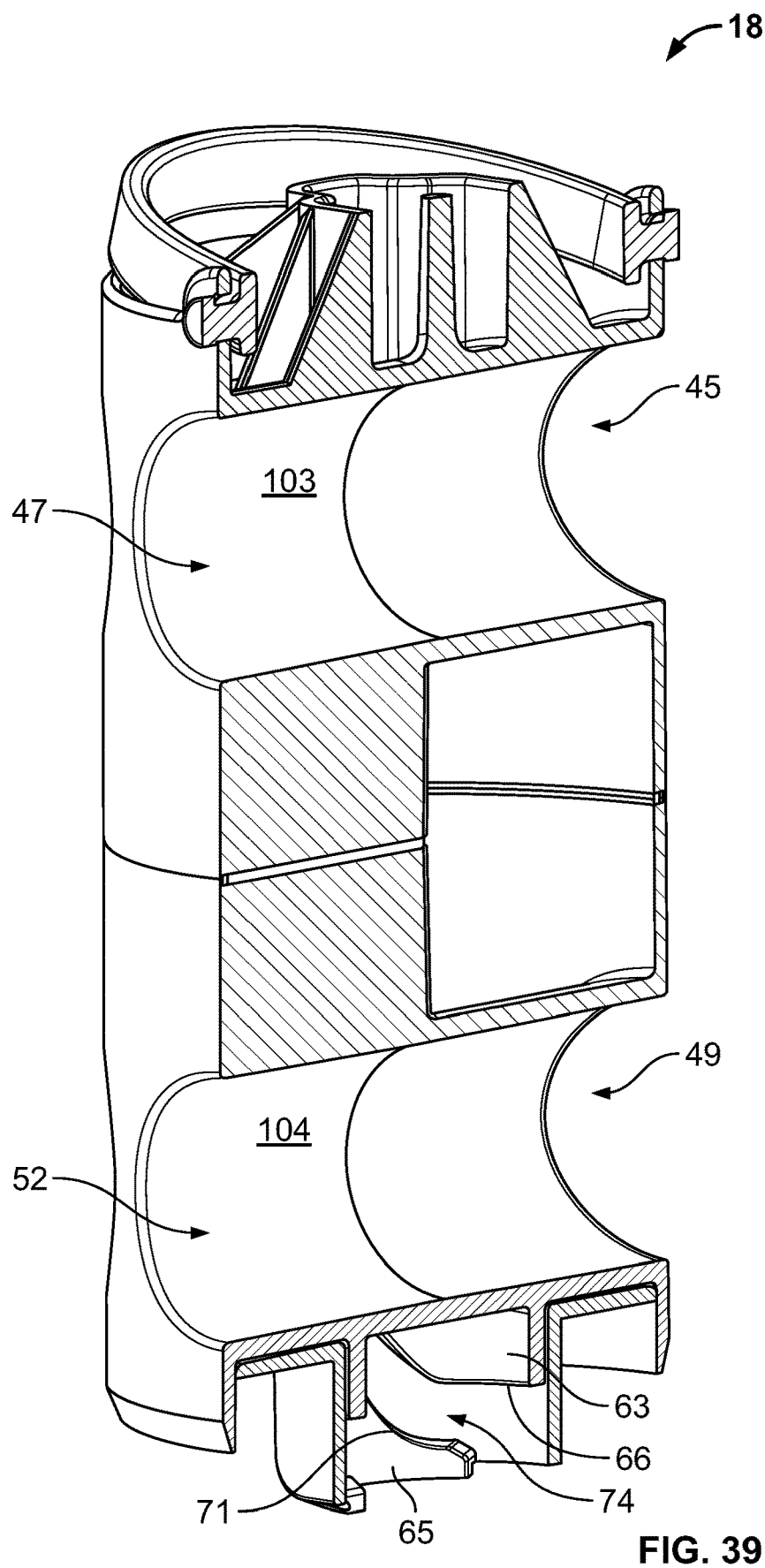
FIGS. 39-43 are cross-sectional side perspective views of the hub member.
Figure 40:
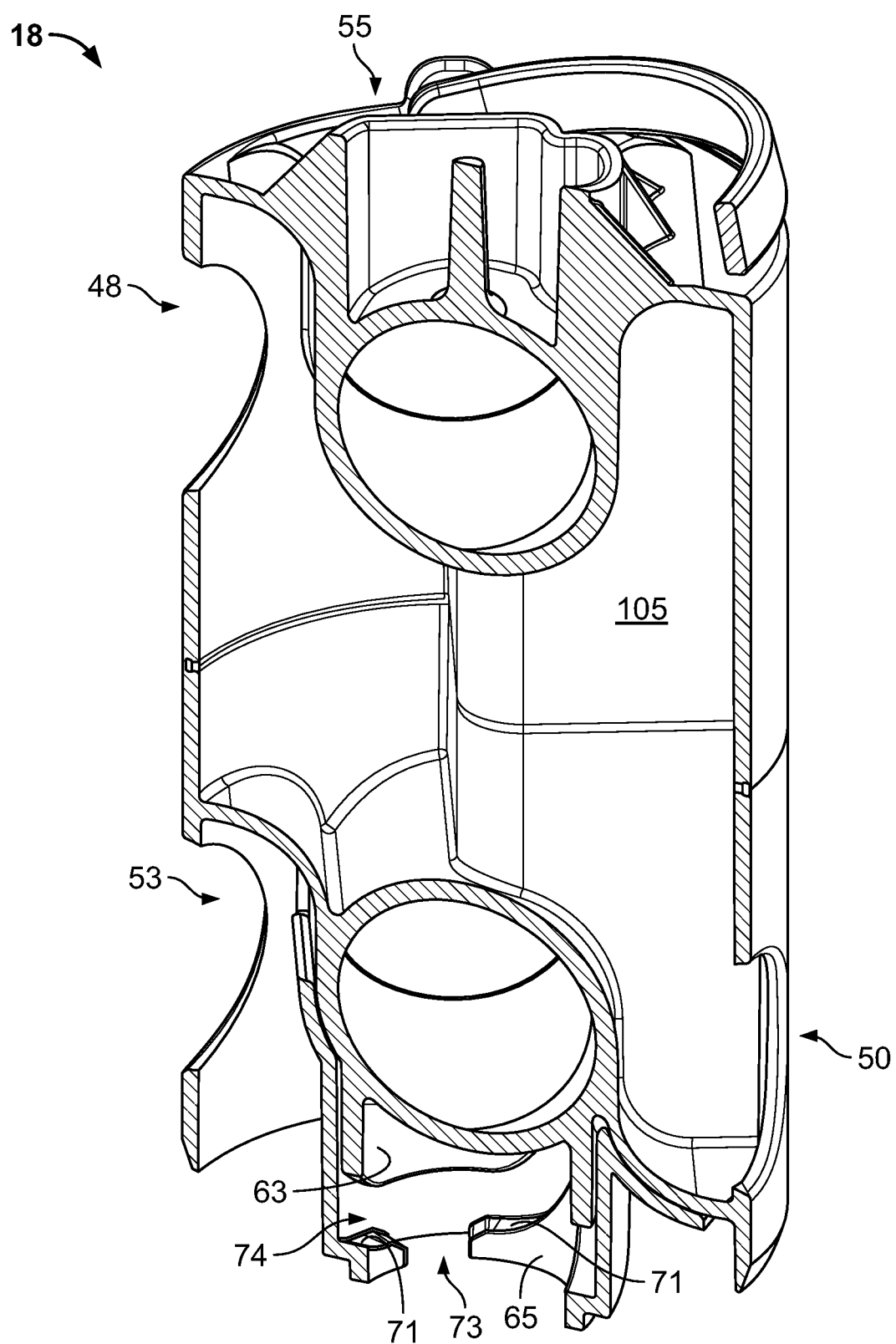
Figure 41:
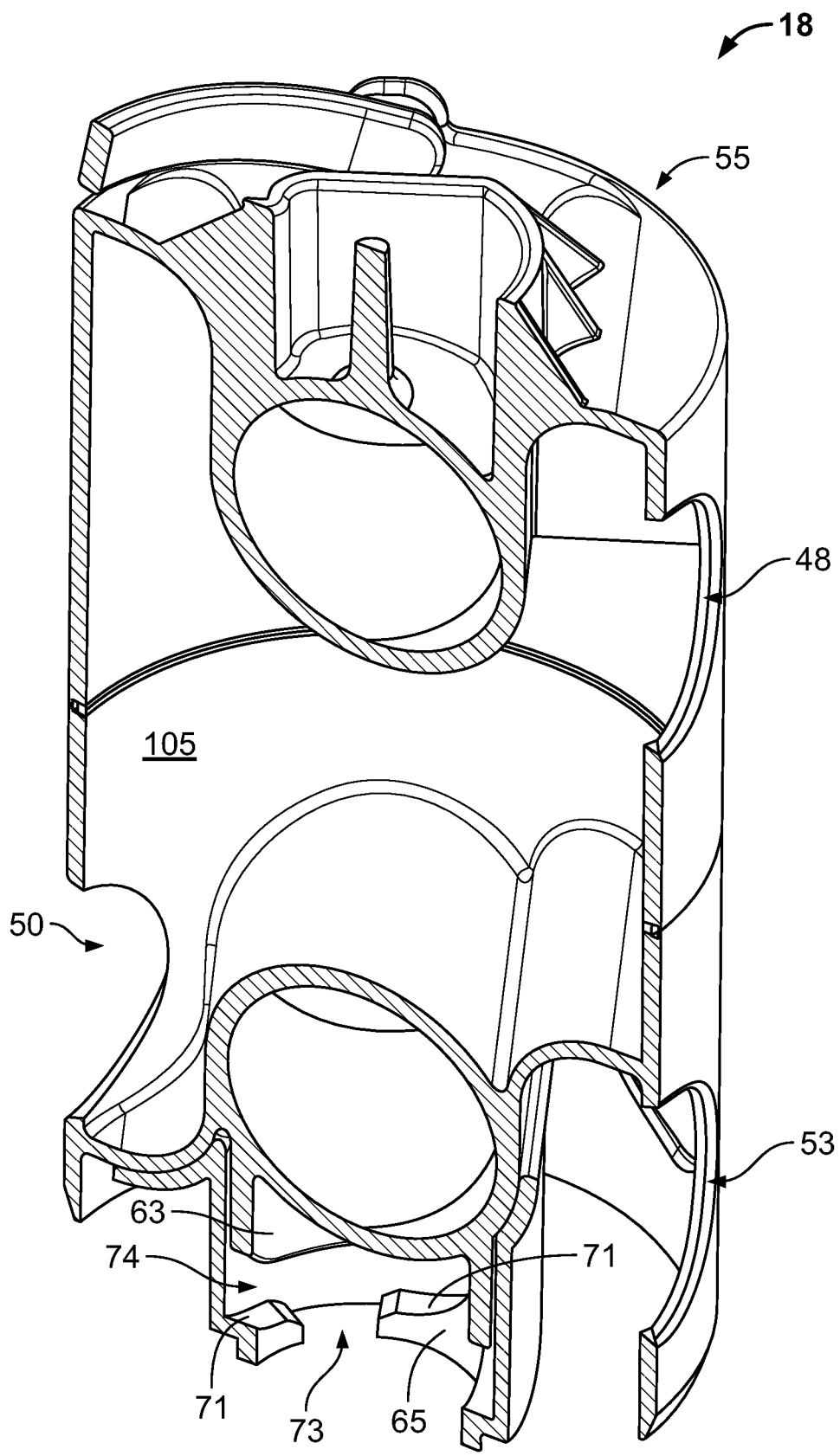
Figure 42:
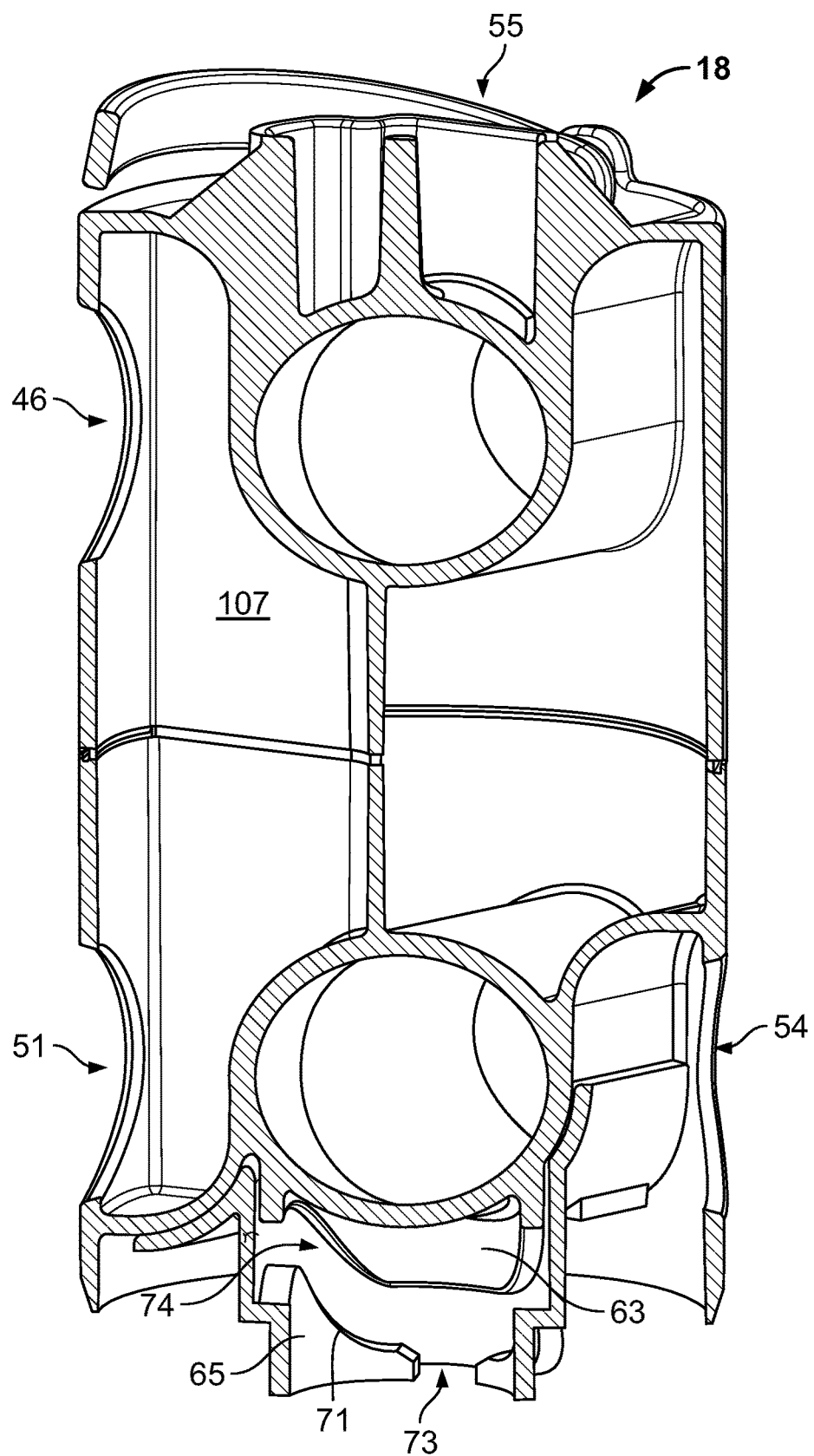
Figure 43:
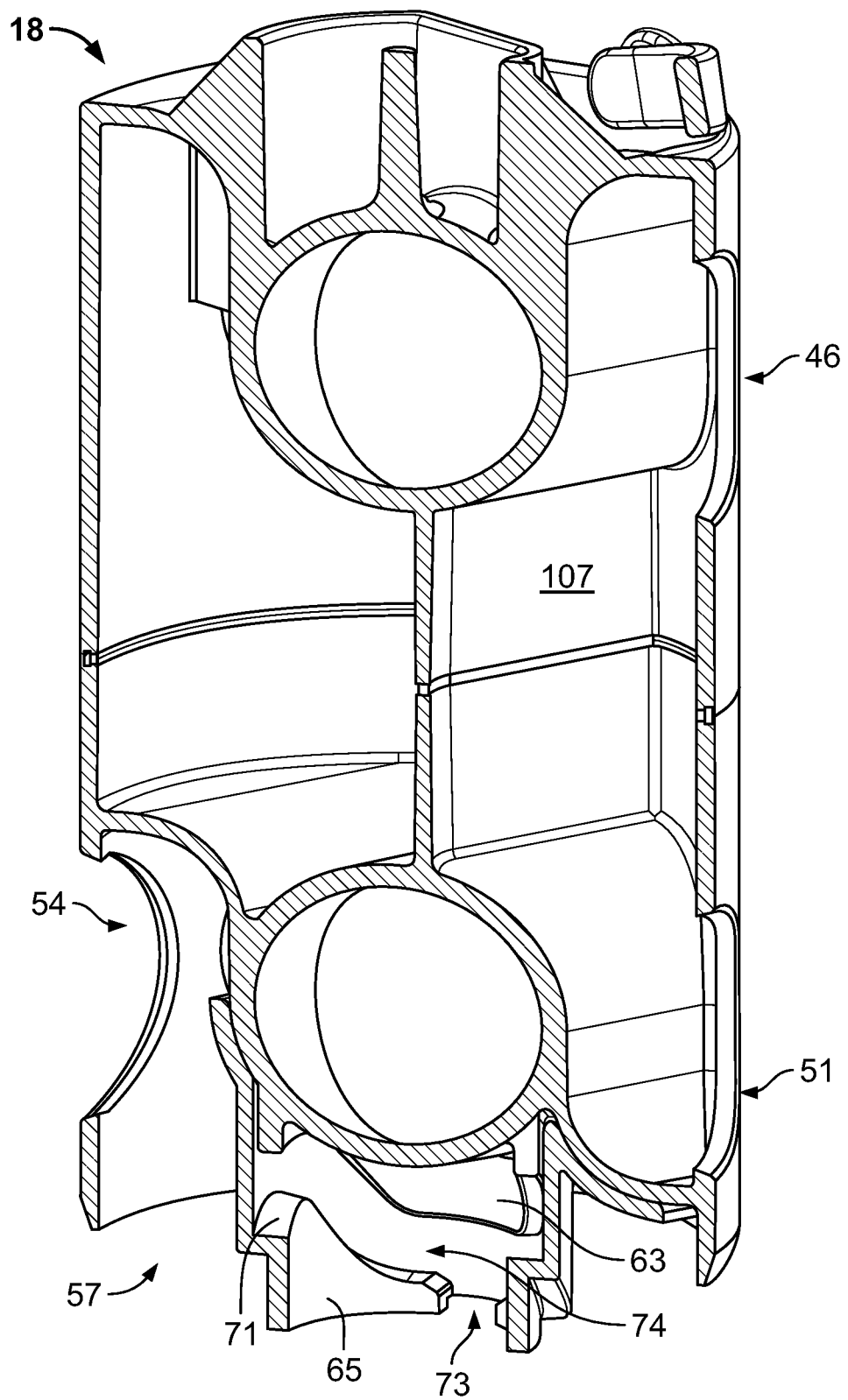

As shown in FIG. 15, pockets 24, 26 can include grooved edges 27 on each lateral side of each respective pocket 24, 26. Each grooved edge 27 is configured to releasably house and/or contain at least a portion of a seal carrier 16. The lower or bottom surface of each pocket 24, 26 (e.g., proximal to end 23) can include a depression 28 or the like that is configured to releasably house or mate with a protrusion member 29 of a seal carrier 16 (the mating of which is discussed below).

As shown in FIGS. 21-27, each seal carrier 16 includes a front side 31 and a rear side 33, and extends from a first end 35 to a second end 37, and extends from a first side 41 to a second side 43. Exemplary seal carrier 16 also includes a first aperture 30 and a second aperture 32 therethrough.

Each seal carrier can include a first rear groove 34, a second rear groove 36, a first front groove 38 and a second front groove 40. In exemplary embodiments, each groove 34, 36, 38, 40 of seal carrier 16 is configured to house and/or contain a seal member 39 (e.g., elastomeric seal member 39).

Groove 34 is positioned on rear side 33 proximal to first aperture 30, groove 38 is positioned on front side 31 proximal to first aperture 30, groove 36 is positioned on rear side 33 proximal to second aperture 32, and groove 40 is positioned on front side 31 proximal to second aperture 32.

In some embodiments, at least portions of sides 41, 43 of seal carrier 16 curve or extend from the front side 31 toward the rear side 33. Each side 41, 43 can also include one or more abutment surfaces 42 configured to be at least partially positioned within grooved edges 27 of housing 12. As previously noted, each pocket 24, 26 of housing can include a depression 28 that is configured to releasably house/mate with a protrusion member 29 of seal carrier 16.

As noted, exemplary pocket 24 of housing 12 extends around and is in communication with ports 11 and 13 of housing 12, and pocket 26 of housing 12 extends around and is in communication with ports 15 and 17 of housing 12.

After a user releasably positions a seal carrier 16 within pocket 24 (e.g., with surfaces 42 positioned within edges 27 and/or with member 29 positioned within depression 28), the first aperture 30 of seal carrier 16 is substantially aligned with the second source port 13 of housing 12, and the second aperture 32 of seal carrier 16 is substantially aligned with the first source port 11 of housing 12.

Similarly, after a user releasably positions a seal carrier 16 within pocket 26 (e.g., with surfaces 42 positioned within edges 27 and/or with member 29 positioned within depression 28), the first aperture 30 of seal carrier 16 is substantially aligned with the second filter port 17 of housing 12, and the second aperture 32 of seal carrier 16 is substantially aligned with the first filter port 15 of housing 12.

As discussed further below, after the hub member 18 of assembly 10 is releasably positioned within the receiving cavity 25 of housing 12 (after seal carriers 16 are positioned within respective pockets 24, 26), the seals 39 on the front side 31 of the seal carrier 16 in pocket 24 are configured to form a fluid seal with the interior surface 44 of housing 12 (e.g., the interior surface 44 of pocket 24), and the seals 39 on the rear side 33 of carrier 16 in pocket 24 are configured to form a fluid seal with hub member 18 when hub member 18 is moved to desired positions (e.g., filter position; backwash position; waste position; recirculation position).

Similarly, the seals 39 on the front side 31 of the seal carrier 16 in pocket 26 are configured to form a fluid seal with the interior surface 44 of housing 12 (e.g., the interior surface 44 of pocket 26), and the seals 39 on the rear side 33 of carrier 16 in pocket 26 are configured to form a fluid seal with hub member 18 when hub member 18 is moved to desired positions (e.g., filter position; backwash position; waste position; recirculation position).

In exemplary embodiments, each seal member 39 includes a thickness to mimic an O-ring or the like having a thickness of about 0.210 inches.

As shown in FIGS. 1 and 28-43, exemplary hub member 18 is substantially cylindrical and can include first hub portion 18A and second hub portion 18B. In exemplary embodiments, portions 18A and 18B are welded together to form or define hub member 18, although the present disclosure is not limited thereto. Rather, it is noted that hub member 18 can be formed or fabricated from a single structure/portion, or can be formed or fabricated from more than two structures/portions.

Exemplary first hub portion 18A of hub member 18 includes a first aperture 45, a second aperture 46, a third aperture 47 and a fourth aperture 48.

Exemplary second hub portion 18B of hub member 18 includes a fifth aperture 49, a sixth aperture 50, a seventh aperture 51, an eight aperture 52, a ninth aperture 53 and a tenth aperture 54.

Hub member 18 extends from a first end 55 to a second end 57. The first end 55 of hub member 18 can include an engagement region 56 that is configured to releasably mount to a stem member 58 of cover assembly 20. First end 55 can also include two openings 59 configured to mount to two knobs 61 of user-friendly handle 60 of hub member 18.

In exemplary embodiments, the interior of housing 12 proximal to second end 23 includes one or more engagement protrusions 62 (e.g., four protrusions 62 spaced equally around interior of housing 12). The engagement protrusions 62 are configured to abut against portions of second end 57 of hub member 18 after hub member 18 is inserted into receiving cavity 25 of housing 12.

The engagement protrusions 62 can be located proximal to one or more rib members 68 (e.g., four rib members 68). In certain embodiments, each rib member 68 at least partially extends from a respective engagement protrusion 62. It is noted that rib members 68 can extend from other portions of the interior of housing 12 proximal to second end 23.

The second end 23 of the interior of housing 12 can also include an alignment hub 69 having one or more spoke members 70 (e.g., four spoke members 70) extending from the alignment hub 70 and/or extending from the housing 12.

Figure 44:
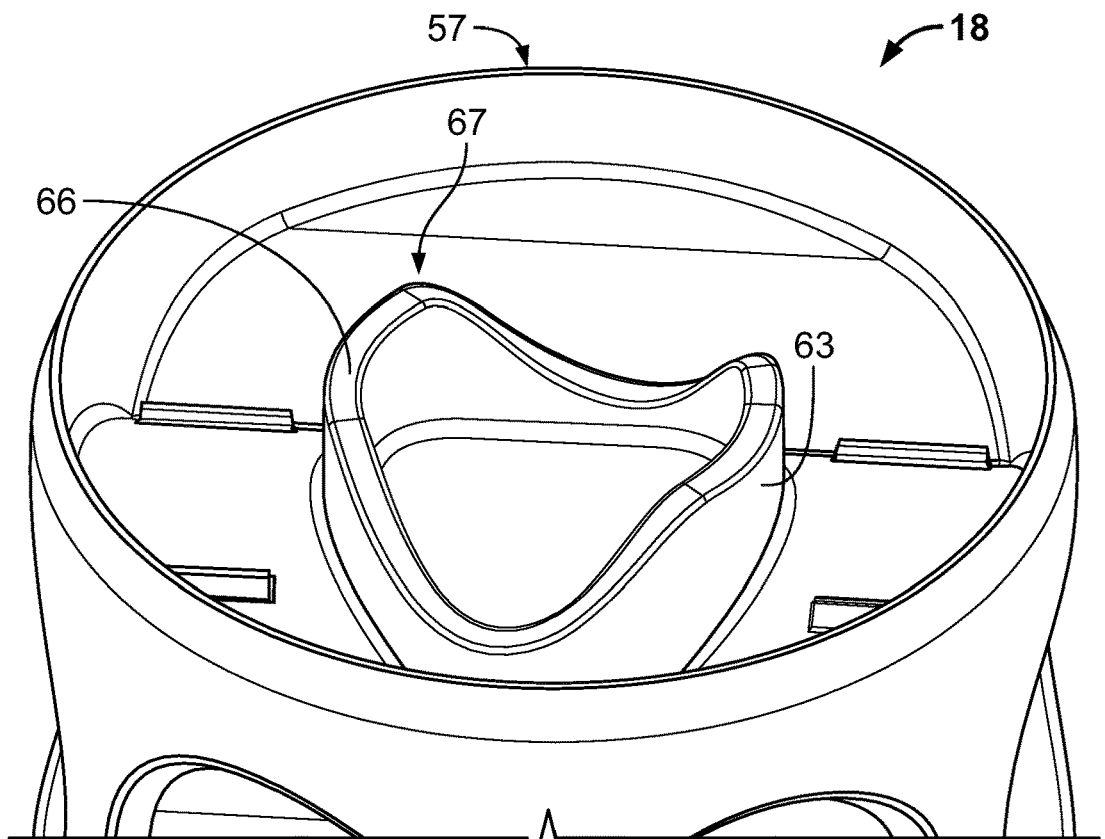
FIGS. 44-45 are partial end perspective views of the hub member, prior to assembling the second cam member.
Figure 45:
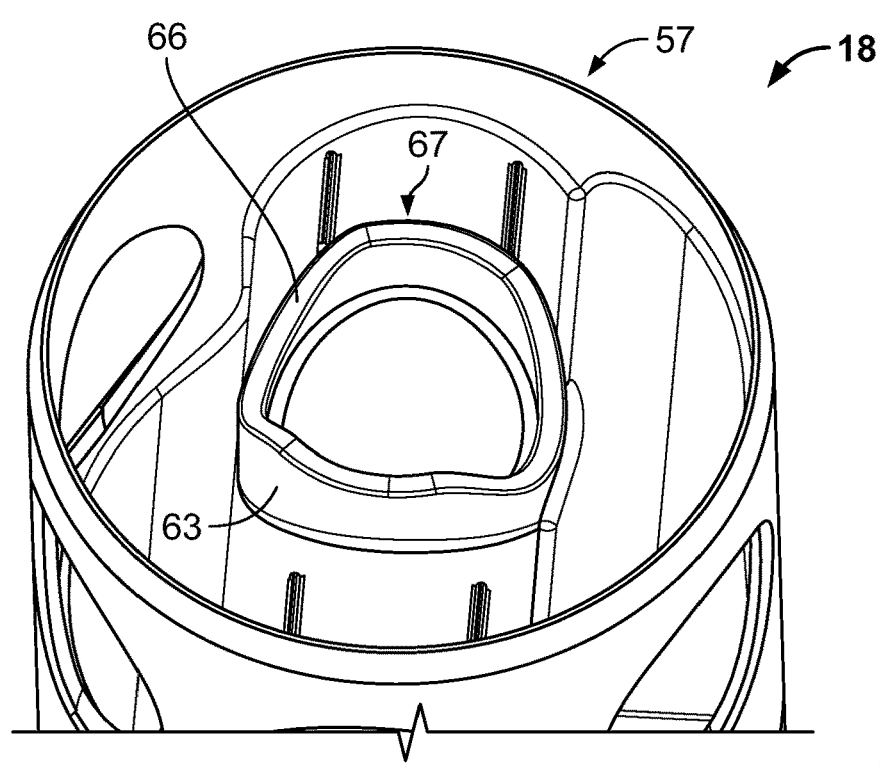
Figure 46:
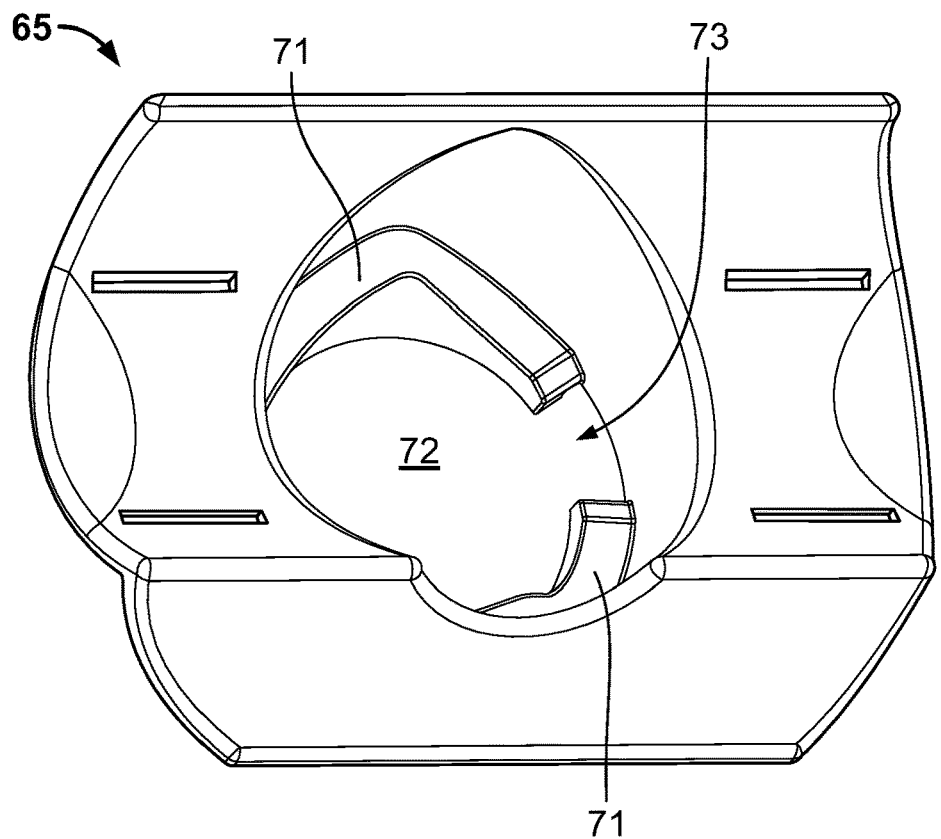
FIGS. 46-47 are perspective views of an exemplary second cam member.
Figure 47:
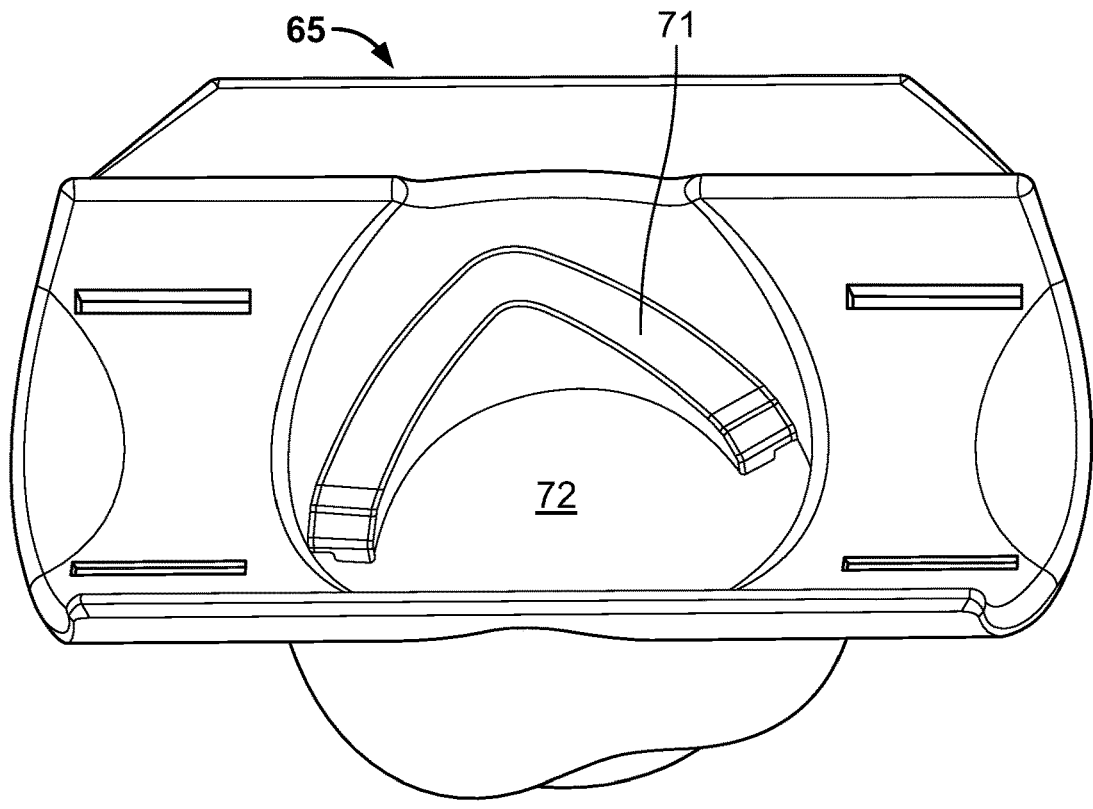
Figure 48:
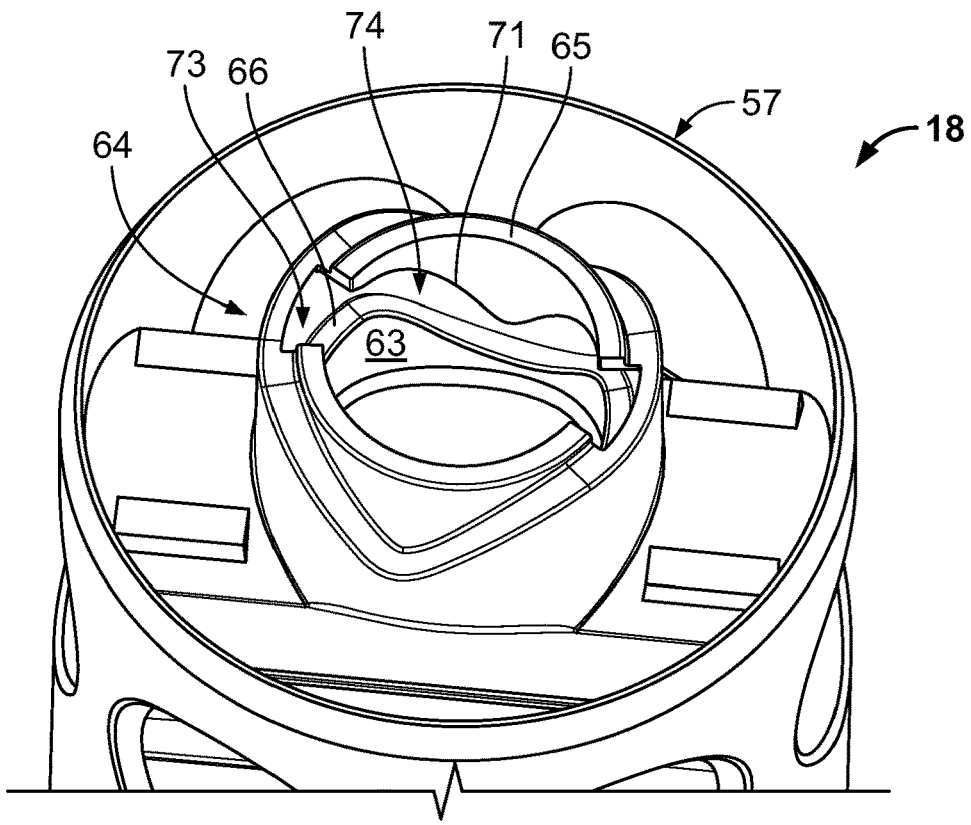
FIGS. 48-49 are partial end perspective views of the hub member after assembling the second cam member.
Figure 49:
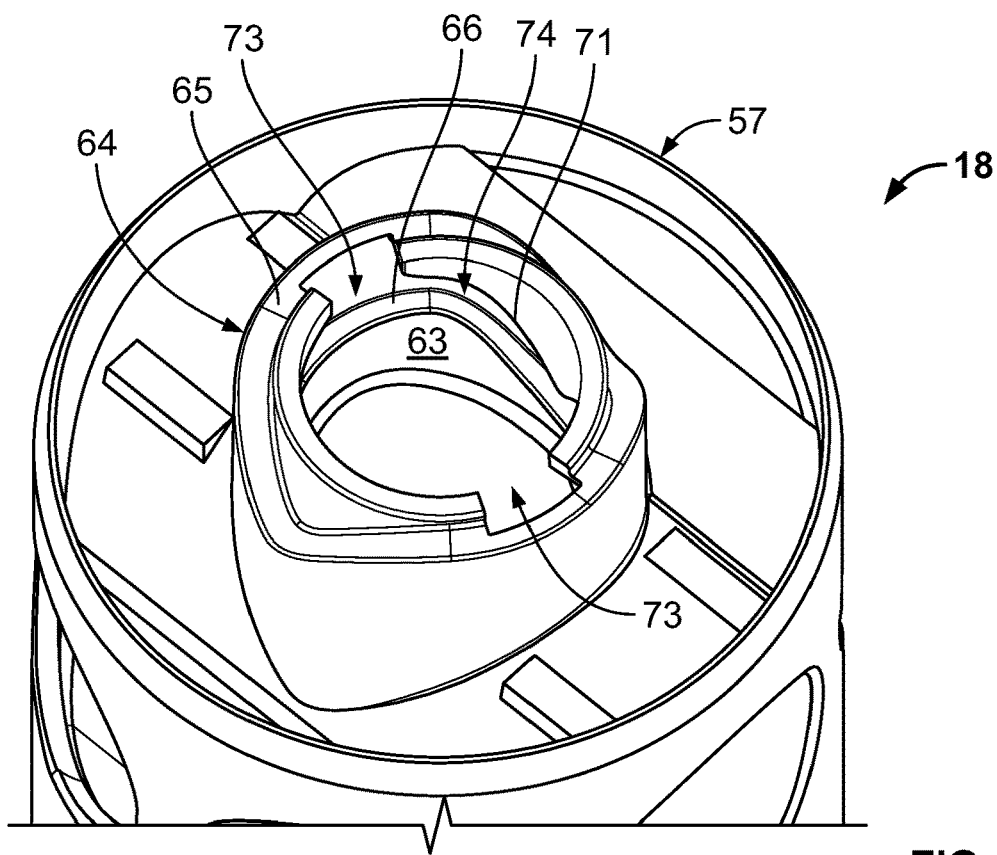
Figure 50:
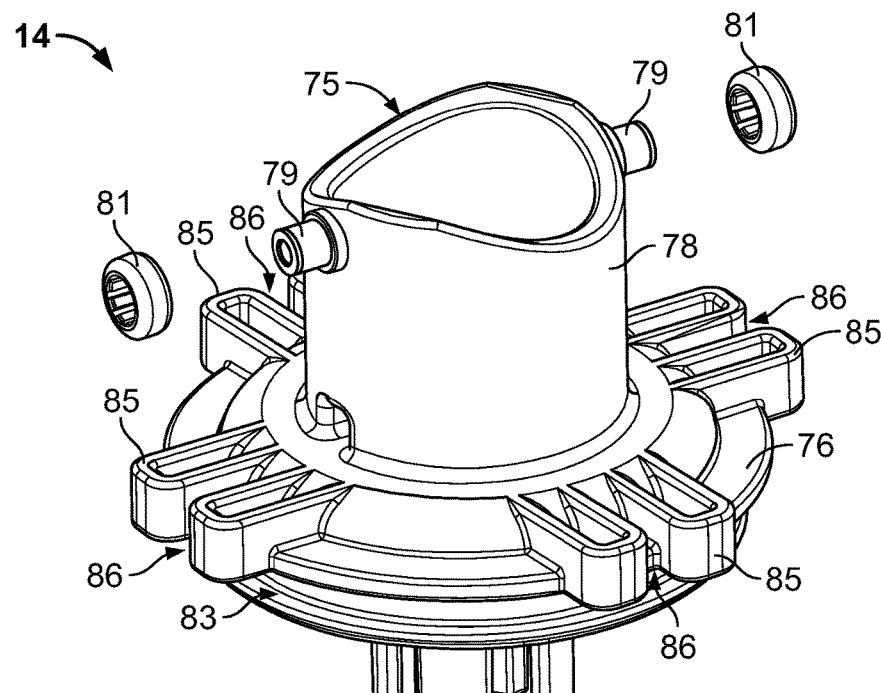
FIGS. 50-51 are side perspective views of an exemplary waste port seal carrier of the valve assembly of FIG. 1.
Figure 51:
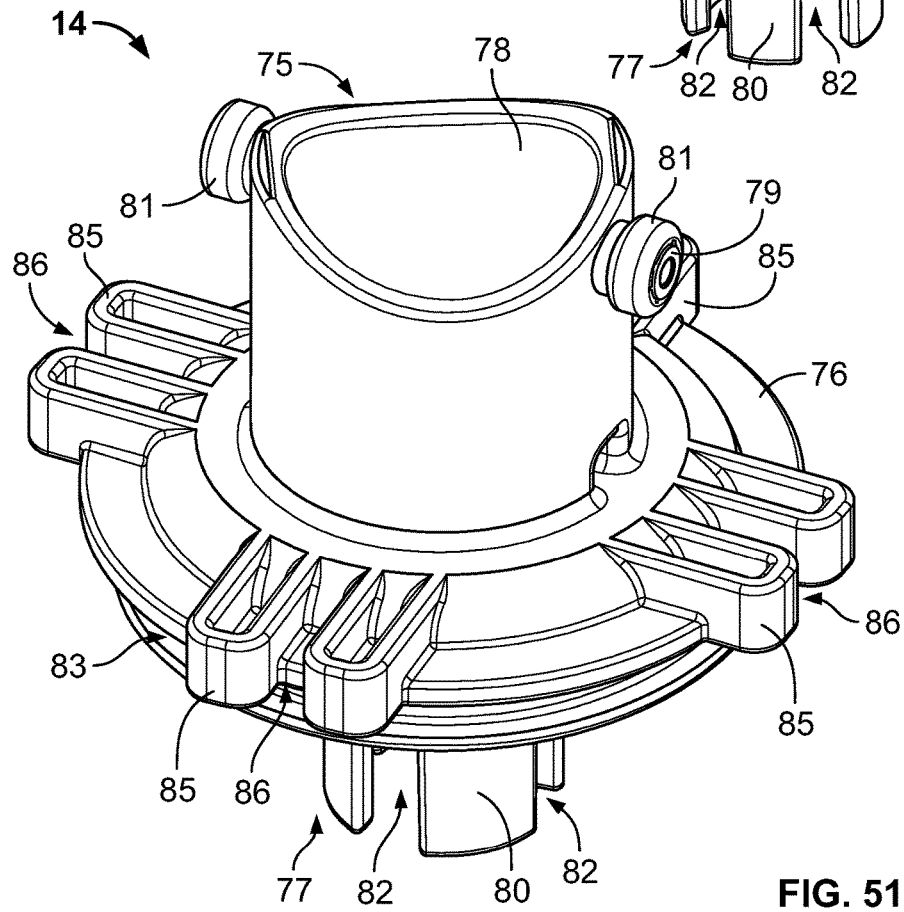
Figure 52:
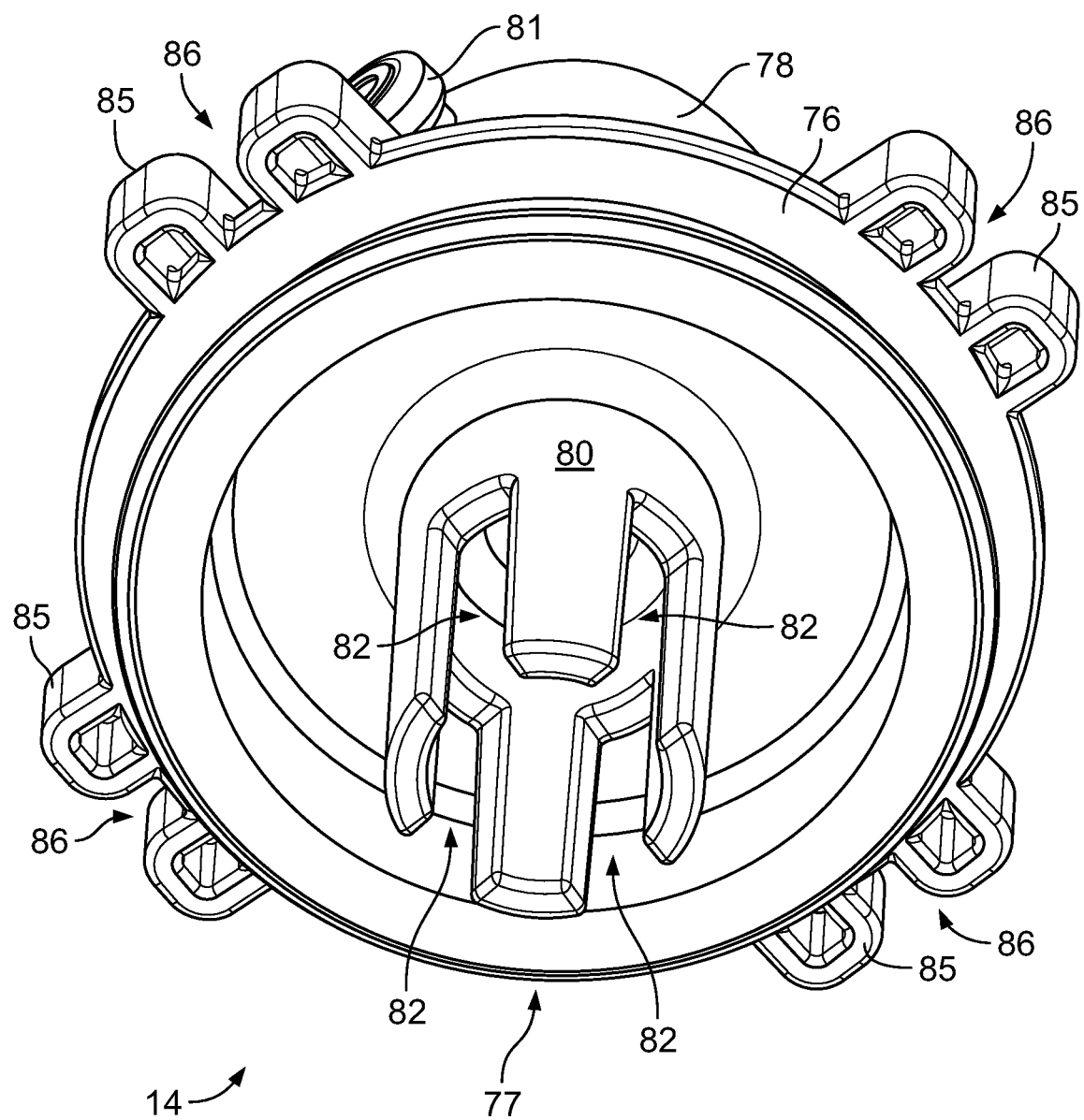
FIG. 52 is an end perspective view of the waste port seal carrier.

As shown in FIGS. 37-38 and 48-49, the second end 57 of hub member 18 can include a cam assembly 64 that extends from second end 57 of hub member 18. In exemplary embodiments, cam assembly 64 (FIGS. 48-49) includes a first cam member 63 (FIGS. 44-45) and a second cam member 65 (FIGS. 46-47).

First cam member 63 extends from the second end 57 of hub member 18 and includes a first cammed or sloped surface 66 that extends around the distal end 67 of first cam member 63.

Second cam member 65 includes a second cammed or sloped surface 71 that extends around an opening 72 of second cam member 65. In exemplary embodiments, the cammed surface 71 extends around the opening 72 in a non-continuous manner, and includes two clearance notches 73.

In certain embodiments, second cam member 65 is configured to be mounted to the second end 57 of hub member 18 to form and define cam assembly 64, with the second cammed surface 71 positioned distally and proximal to the first cammed surface 66 to form and define a channel 74 between the first cammed surface 66 and the second cammed surface 71. It is noted that clearance notches 73 are in communication with the channel 74.

In certain embodiments, member 65 is mounted to hub 18 to form or define cam assembly 64, although the present disclosure is not limited thereto. Rather, it is noted that cam assembly 64 can be formed or fabricated from a single structure/portion, or can be formed or fabricated from more than two structures/portions.

Referring now to FIGS. 50-53, exemplary waste port seal carrier 14 extends from a first end 75 to a second end 77, and includes a base member 76. An engagement region 78 extends proximally from the base member 76 toward the first end 75, and a locking member 80 extends distally from the base member 76 toward the second end 77.

In exemplary embodiments, the engagement region 78 is substantially cylindrical and includes one or more post members 79 extending therefrom (e.g., two post members 79 positioned about 180° apart from one another), each post member 79 configured to mount to or is integral with an engagement member 81 (e.g., roller member 81, boss member 81, etc.).

Figure 53:
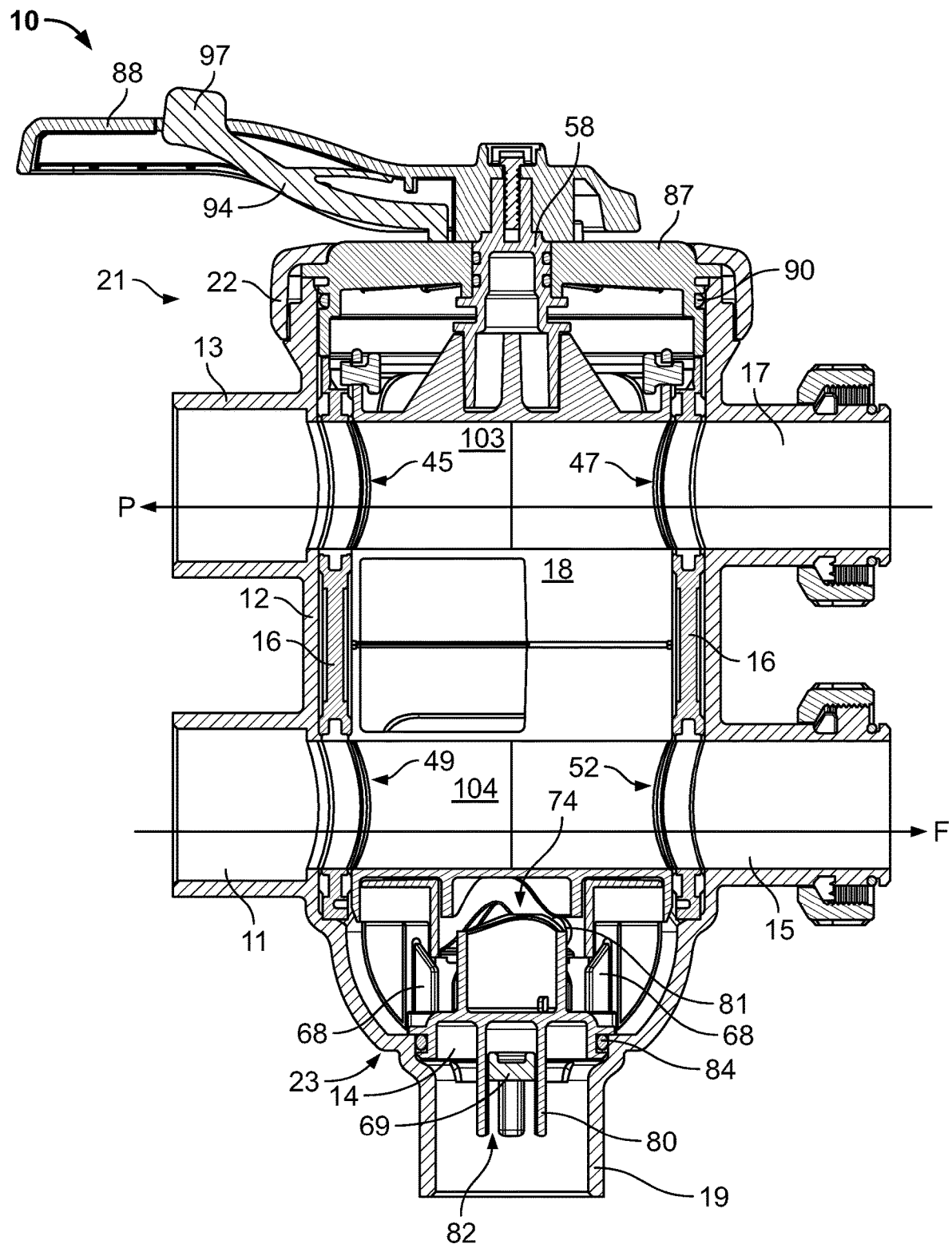
FIGS. 53-54 are cross-sectional side views of an exemplary valve assembly in the filter position.
Figure 54:
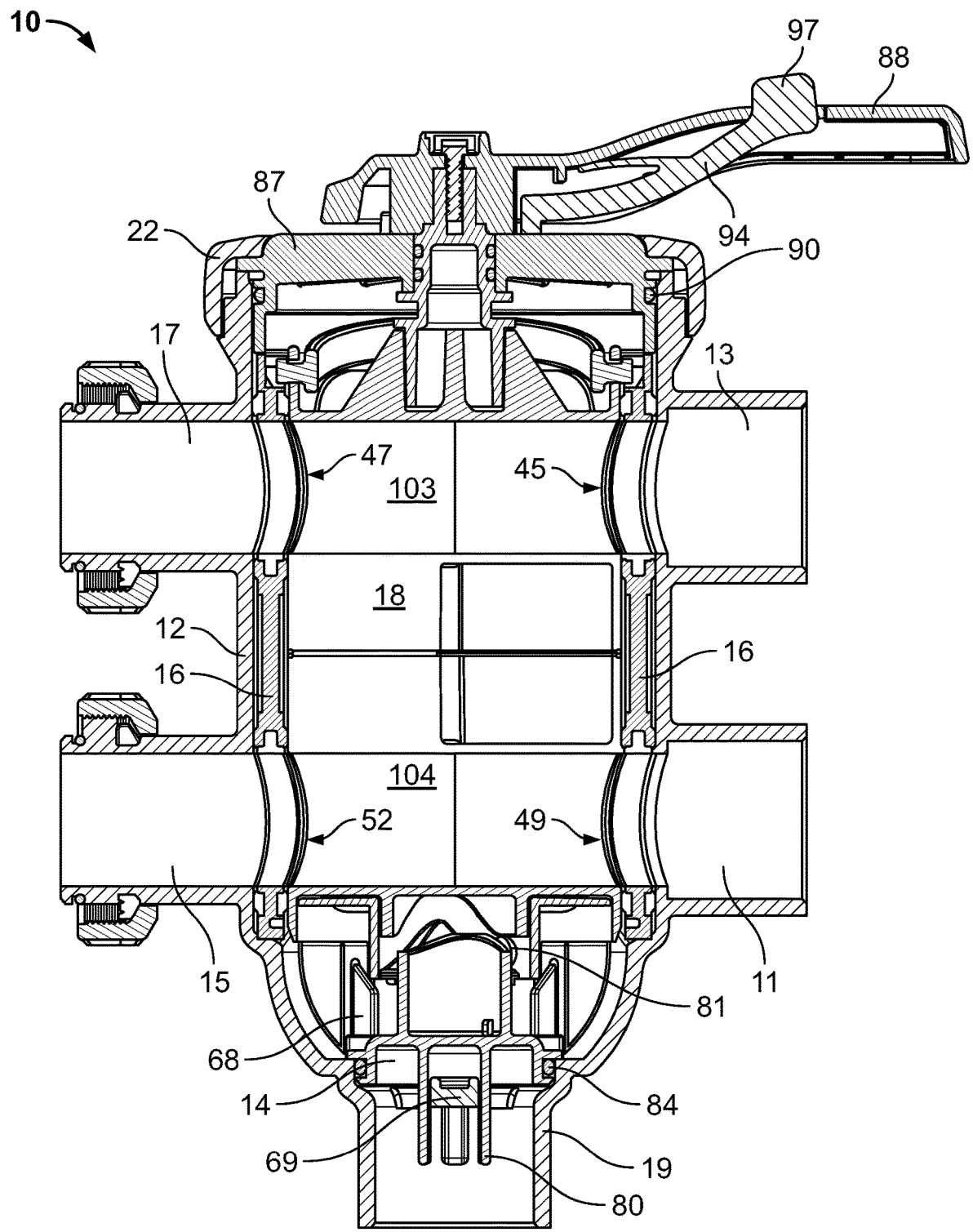

Exemplary locking member 80 includes one or more locking notches 82 (e.g., four locking notches 82). Exemplary base member 76 is substantially circular, and includes a groove 83 configured to house a gasketing or seal member 84 (FIG. 53). Base member 76 can include one or more extending members 85 (e.g., four extending members 85), each extending member 85 including a locking slit 86.

Figure 55:
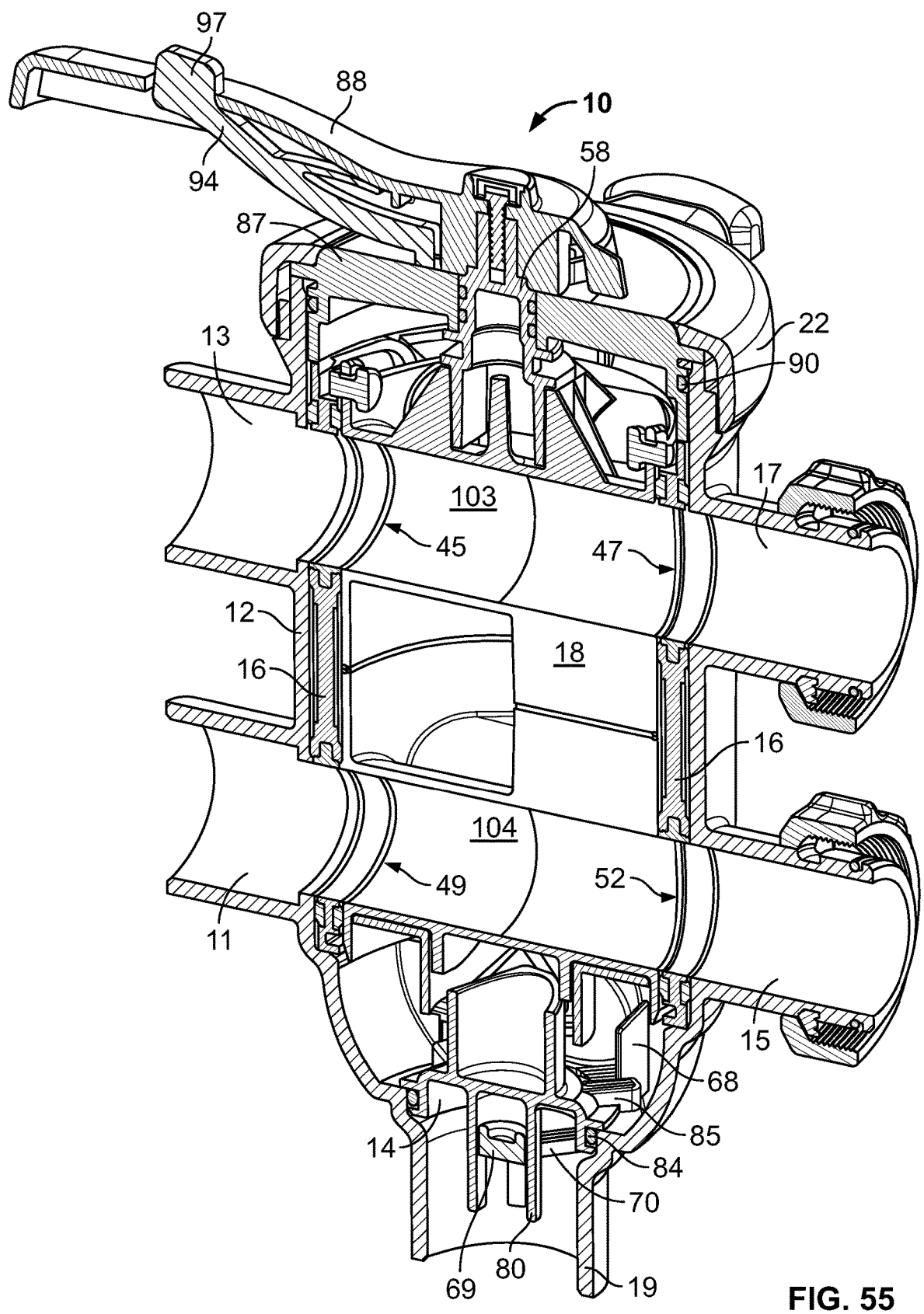
FIGS. 55-56 are cross-sectional side perspective views of the valve assembly in the filter position.
Figure 56:
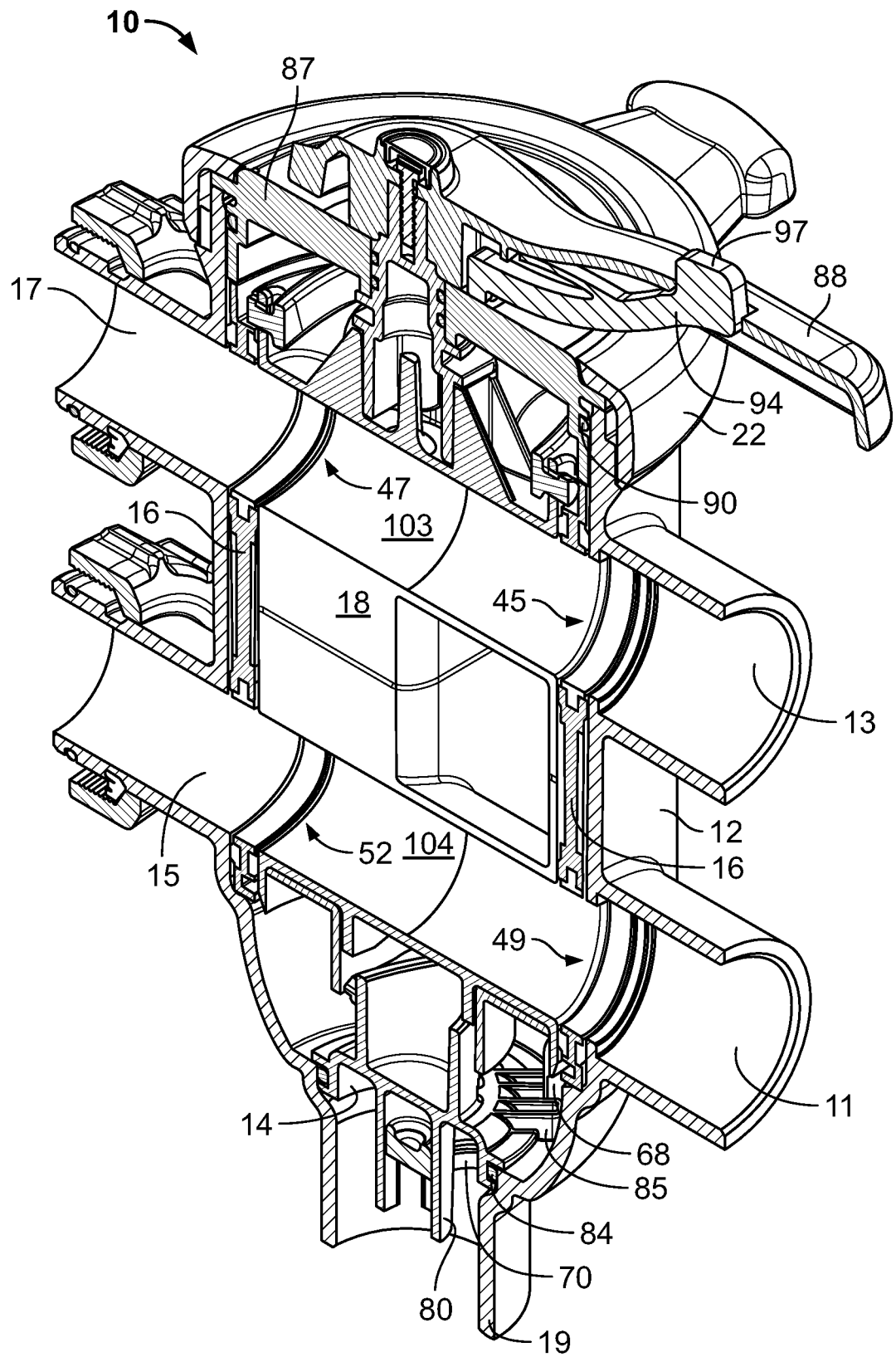
Figure 57:
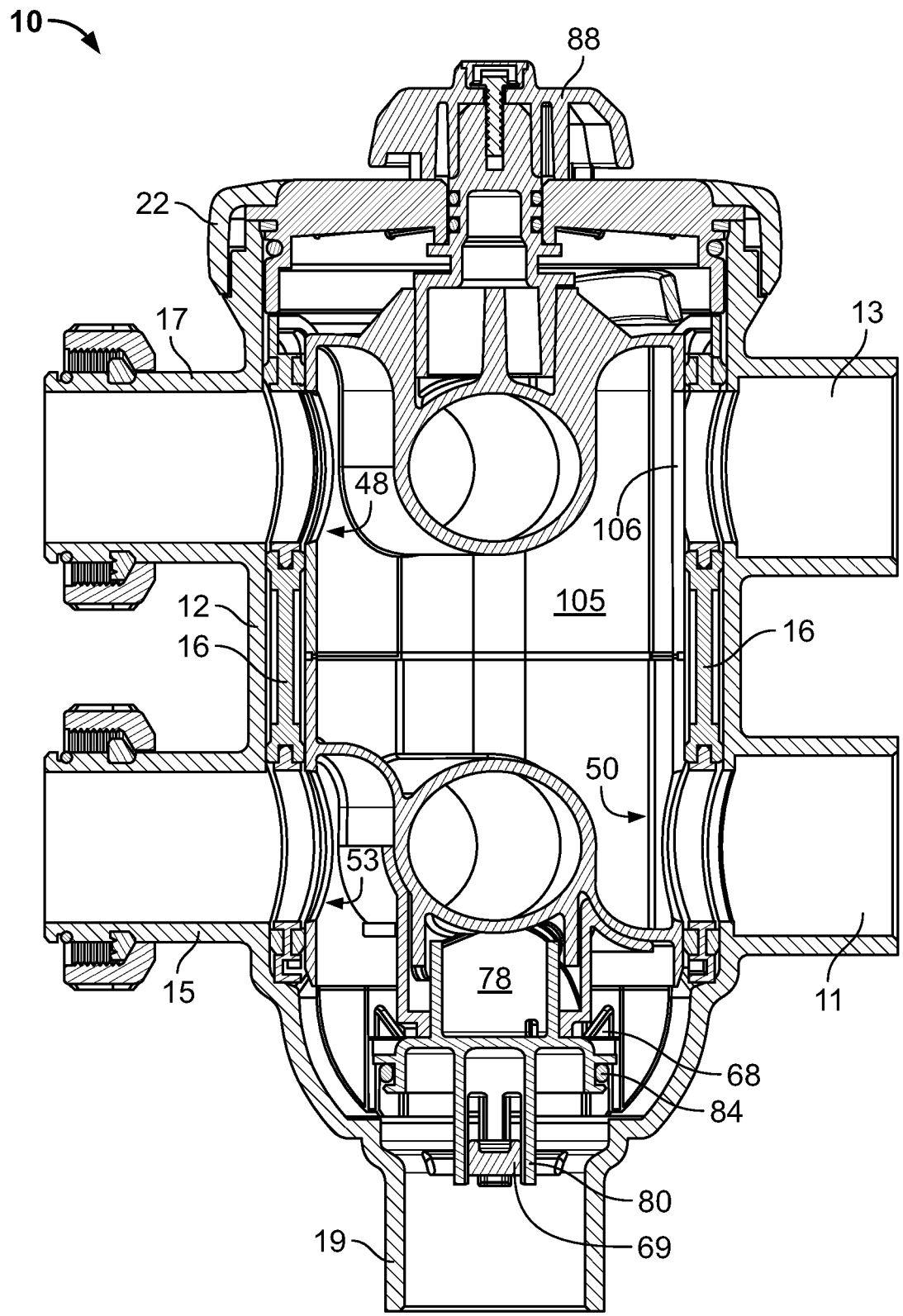
FIGS. 57-58 are cross-sectional side views of an exemplary valve assembly in the backwash position.

A user can releasably insert the waste port seal carrier 14 into the receiving cavity 25 of the housing 12 until the carrier 14 reaches the second end 23. As shown in FIG. 55, each spoke member 70 of housing 12 is configured to be positioned within a respective notch 82 of carrier 14, and alignment hub 69 is positioned within locking member 80. Each rib member 68 of housing 12 is configured to be positioned within a respective locking slit 86 of carrier 14. Seal member 84 of carrier 14 is positioned proximal to the interior of second end 23 of housing 12.

In exemplary embodiments, when each spoke member 70 is positioned within a respective notch 82 and/or when each rib member 68 is positioned within a respective locking slit 86, one of the post members 79 is positioned proximal to first filter port 15, and the other post member 79 is positioned proximal to first source port 11.

A user can releasably insert the seal carriers 16 into a respective pocket 24, 26. In exemplary embodiments, a user can releasably position a seal carrier 16 within pocket 24 (e.g., with surfaces 42 positioned within edges 27 and/or with member 29 positioned within depression 28), and the first aperture 30 of seal carrier 16 is substantially aligned with the second source port 13 of housing 12, and the second aperture 32 of seal carrier 16 is substantially aligned with the first source port 11 of housing 12.

Similarly, a user can releasably position a seal carrier 16 within pocket 26 (e.g., with surfaces 42 positioned within edges 27 and/or with member 29 positioned within depression 28), and the first aperture 30 of seal carrier 16 is substantially aligned with the second filter port 17 of housing 12, and the second aperture 32 of seal carrier 16 is substantially aligned with the first filter port 15 of housing 12.

A user can releasably insert the hub member 18 into the receiving cavity 25 of housing 12 (e.g., after carriers 14 and 16 have been positioned within housing 12). A user can move the second end 57 of hub member 18 toward the second end 23 of housing 23. A user can move or position the hub member 18 so that each clearance notch 73 of the cam assembly 64 is aligned with (e.g., positioned above) a respective engagement member 81 of carrier 14. Each engagement member 81 can then be positioned between the first cammed surface 66 and the second cammed surface 71 and within channel 74 of cam assembly 64 (FIG. 53).

After the hub member 18 is releasably positioned within the receiving cavity 25 of housing 12 (and subsequent to seal carriers 16 positioned within respective pockets 24, 26), the seals 39 on the front side 31 of the seal carrier 16 in pocket 24 are configured to form a fluid seal with the interior surface 44 of housing 12 (e.g., the interior surface 44 of pocket 24), and the seals 39 on the rear side 33 of carrier 16 in pocket 24 are configured to form a fluid seal with hub member 18 when member 18 is moved to certain positions. Similarly, the seals 39 on the front side 31 of the seal carrier 16 in pocket 26 are configured to form a fluid seal with the interior surface 44 of housing 12 (e.g., the interior surface 44 of pocket 26), and the seals 39 on the rear side 33 of carrier 16 in pocket 26 are configured to form a fluid seal with hub member 18 when member 18 is moved to certain positions. Seal member 84 of carrier 14 is configured to form a fluid seal with the interior surface 44 of housing 12 when positioned against interior surface 44 of second end 23 of housing 12.

A user can then position the stem member 58 of cover assembly 20 into engagement region 56 of hub member 18, and position cover assembly 20 over and into engagement with first end 55 of hub member 18. Cover assembly 20 is configured to cover and seal the first end 21 of housing 12.

Figure 6:
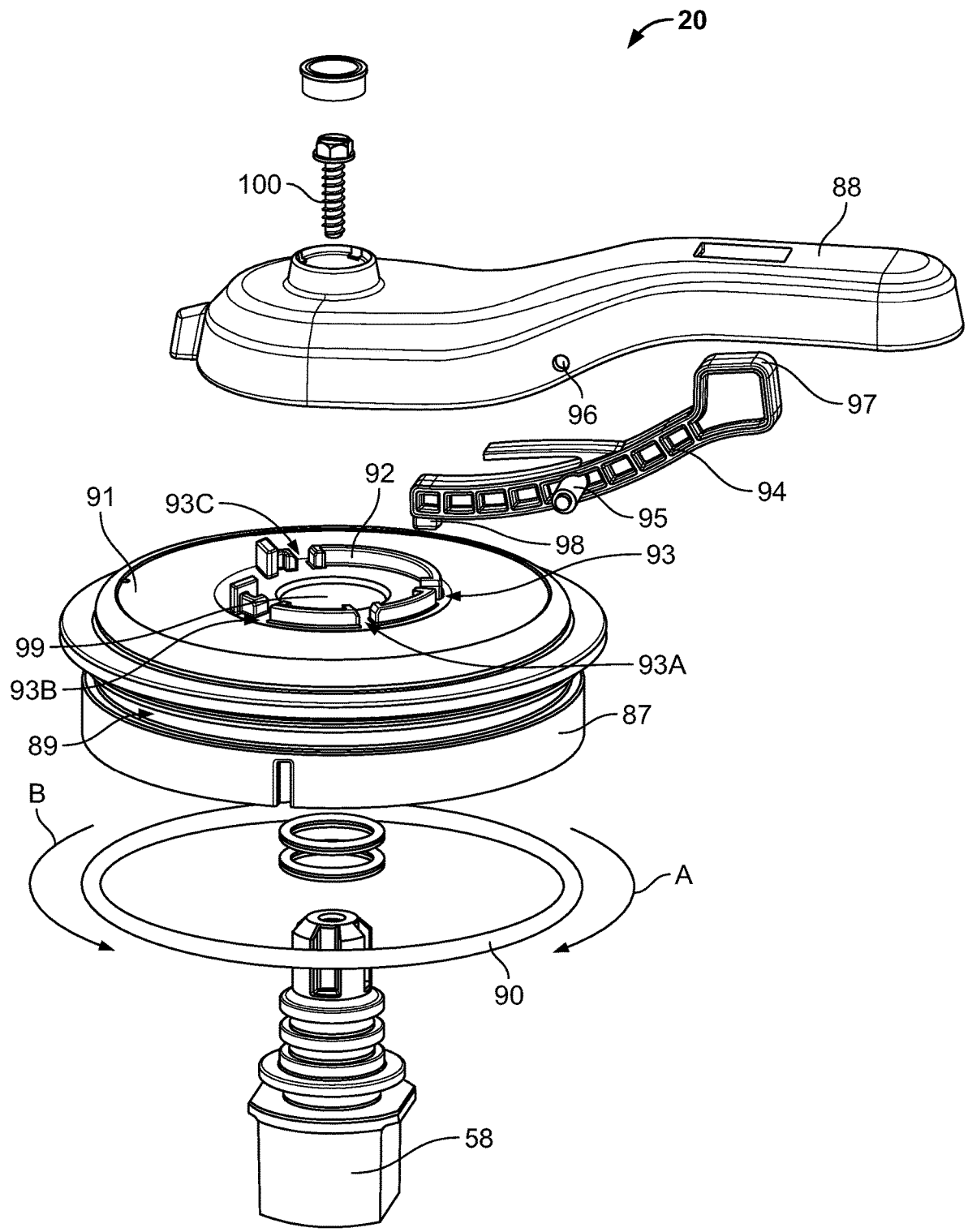
FIG. 6 is an exploded side perspective view of an exemplary cover assembly of the valve assembly of FIG. 1, prior to assembly.
Figure 7:
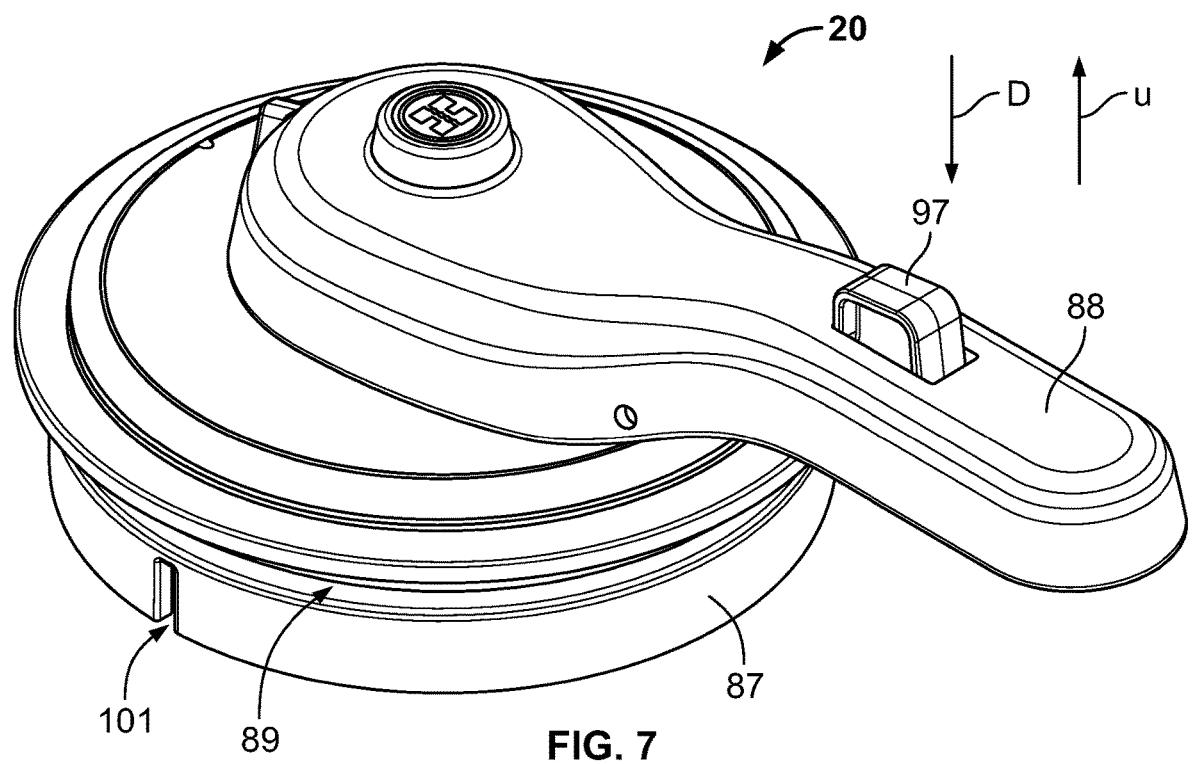
FIG. 7 is a top perspective view of the cover assembly.
Figure 8:
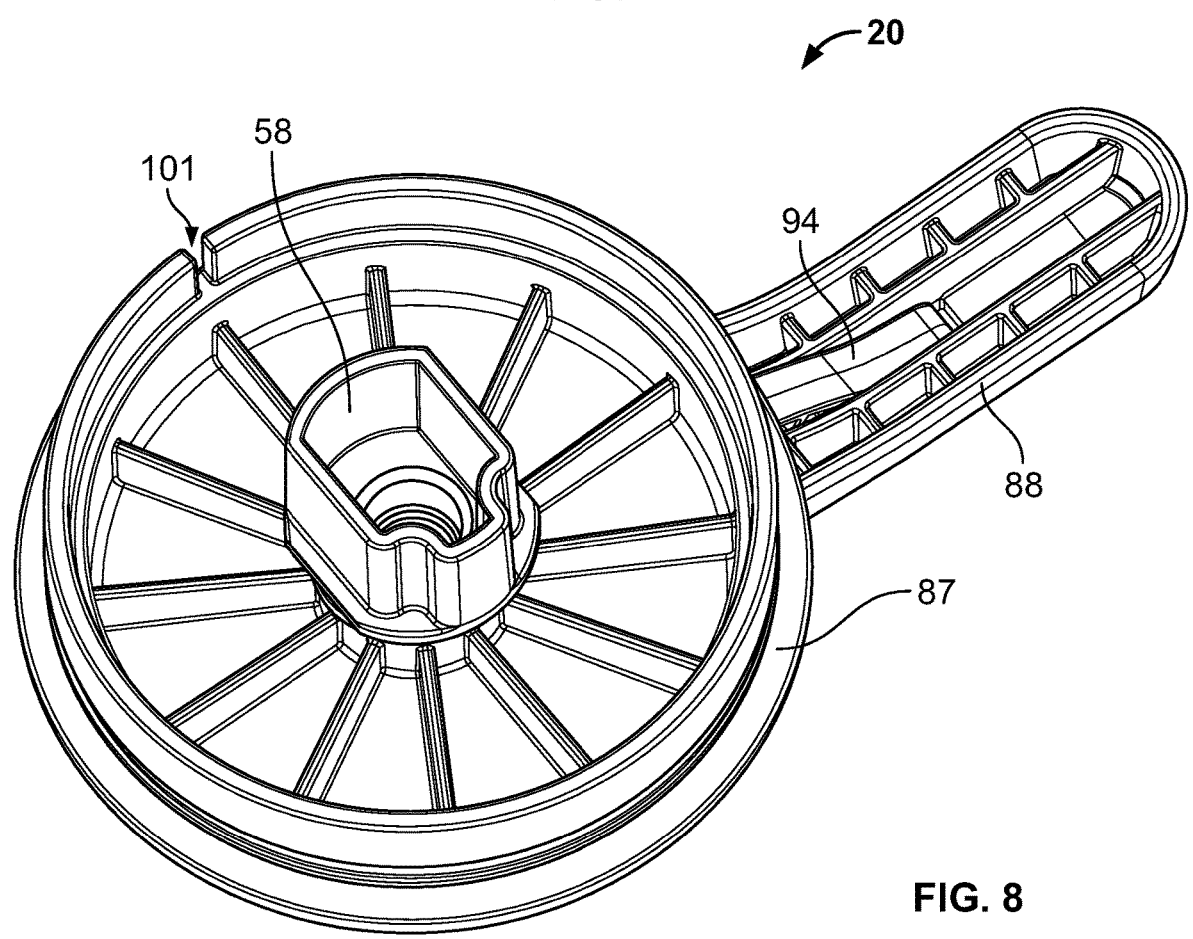
FIG. 8 is a bottom perspective view of the cover assembly.
Figure 9:
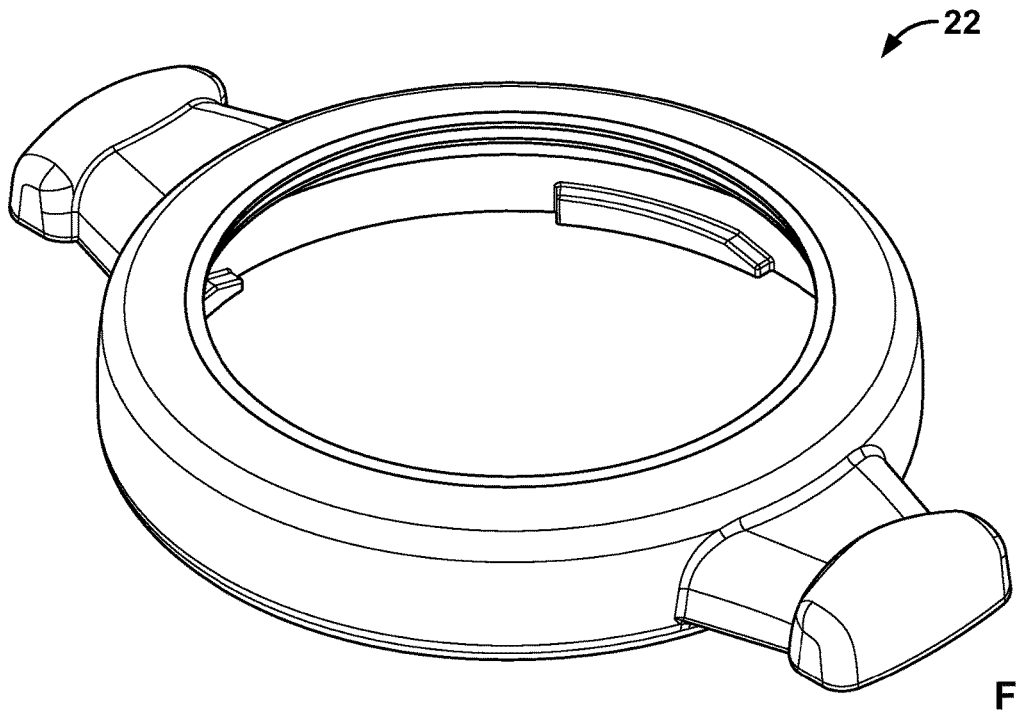
FIG. 9 is a top perspective view of an exemplary lock ring of the valve assembly of FIG. 1.
Figure 10:
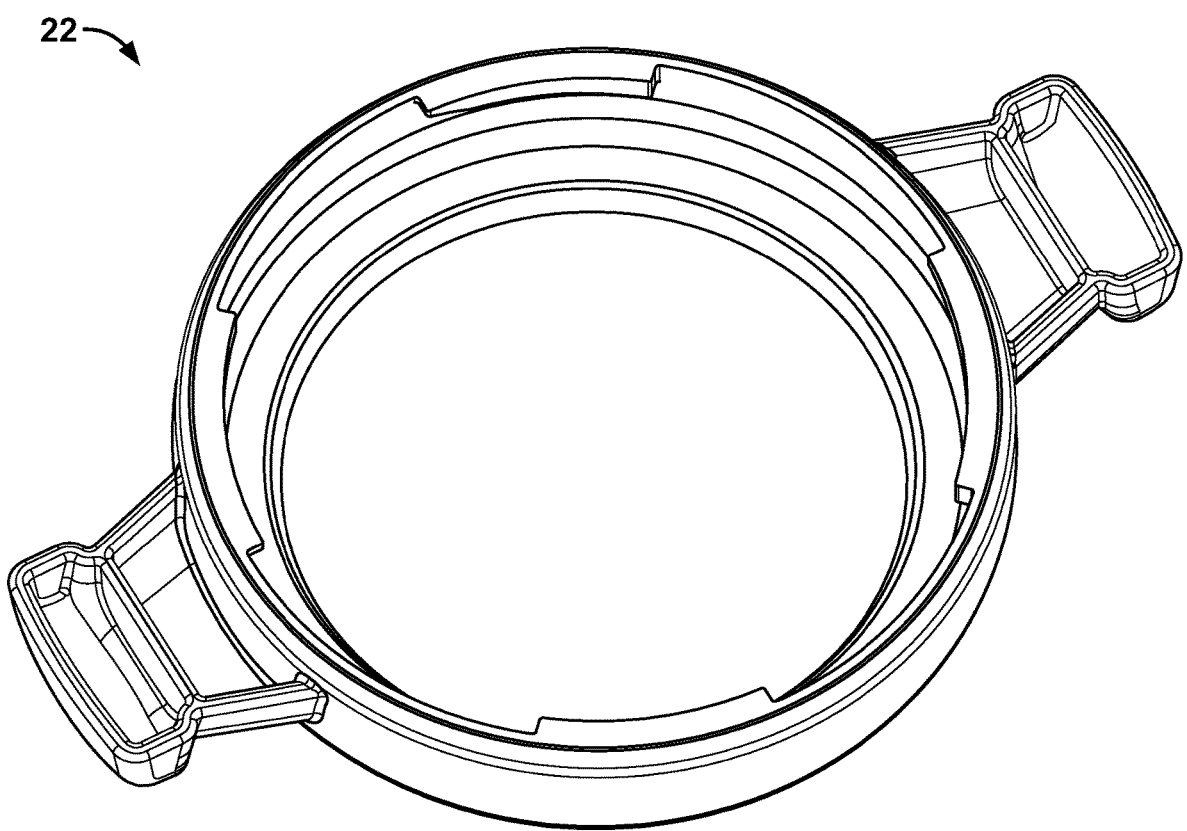
FIG. 10 is a bottom perspective view of the lock ring.
Figure 11:
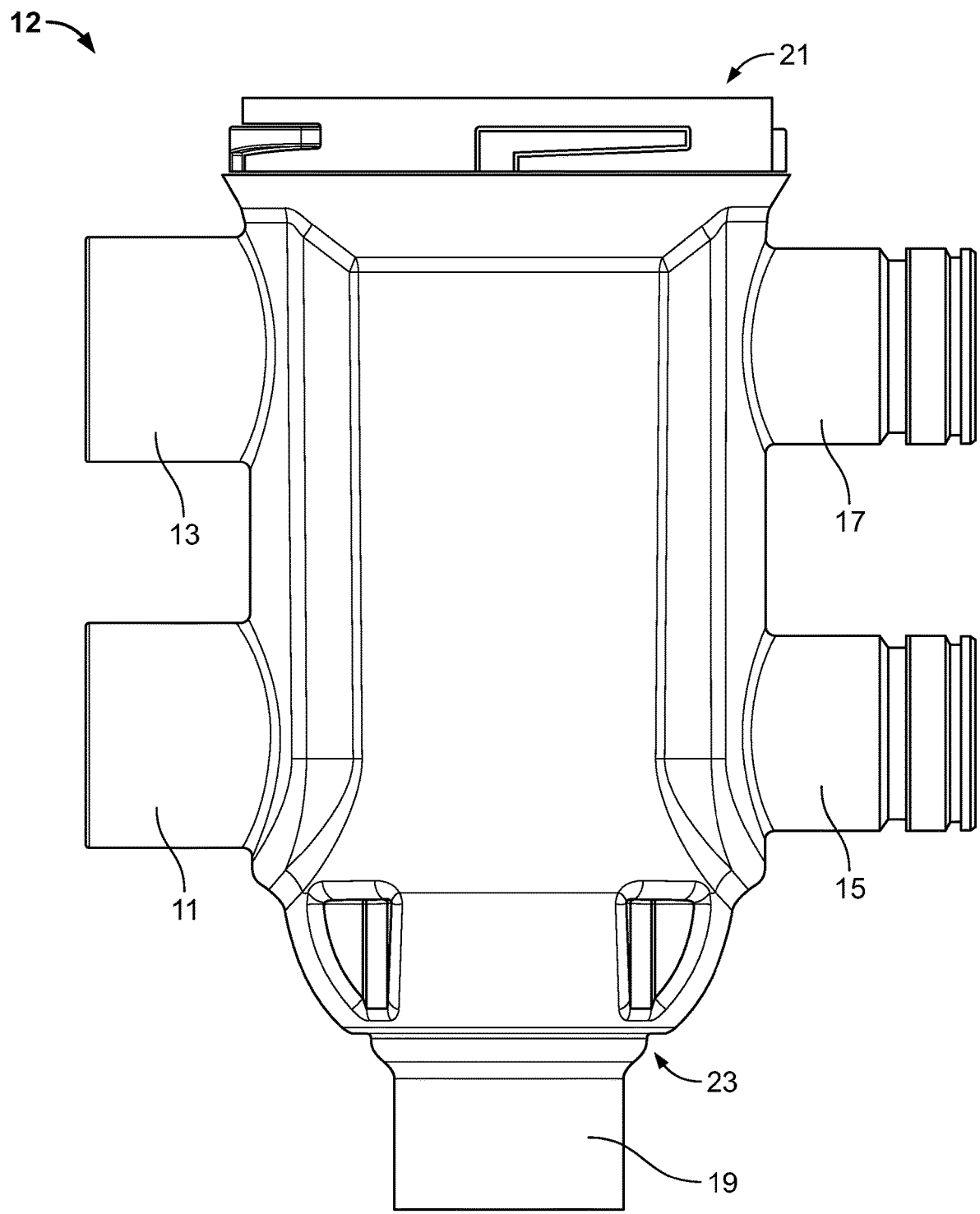
FIGS. 11-14 are side views of an exemplary housing of the valve assembly of FIG. 1.
Figure 12:
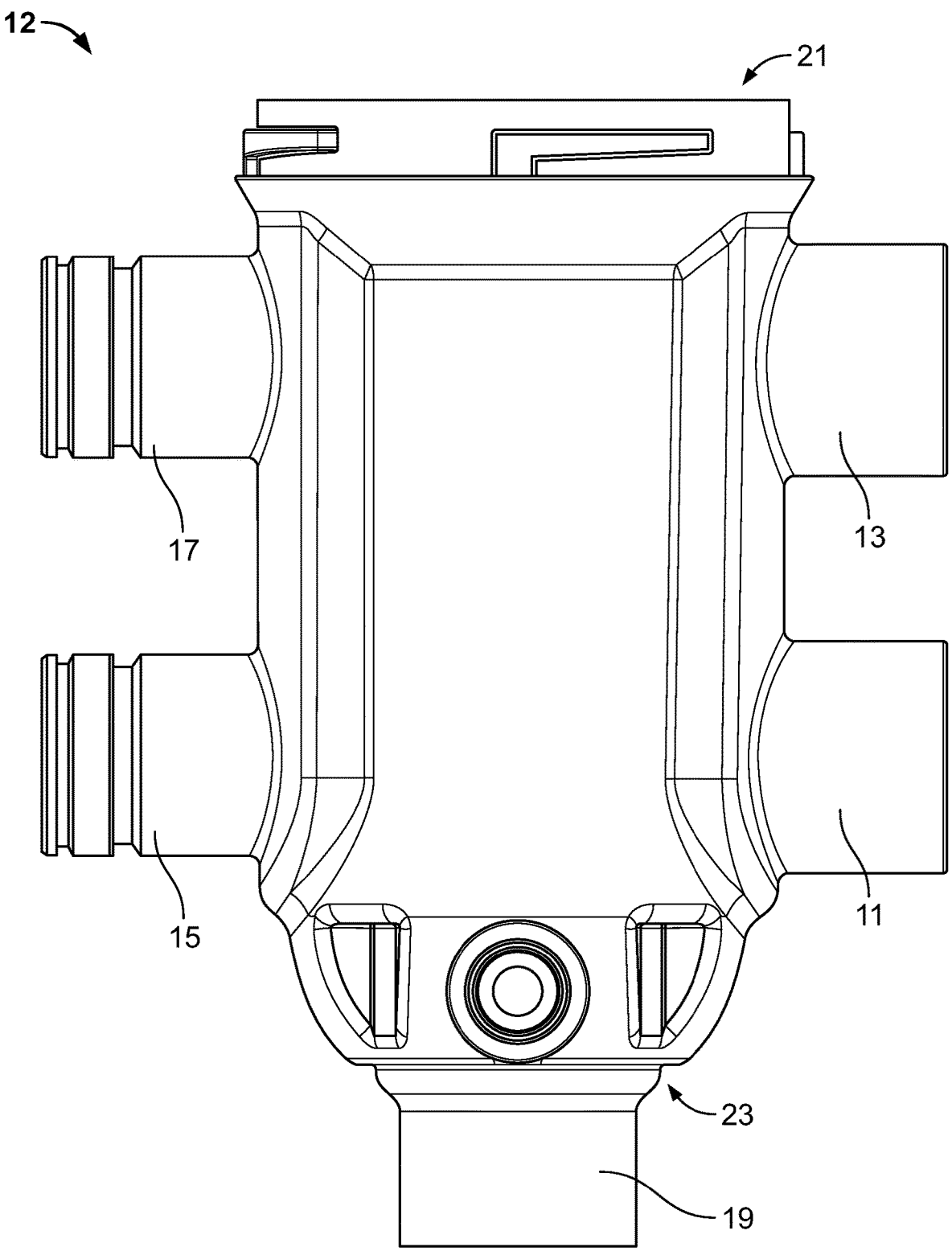
Figure 13:
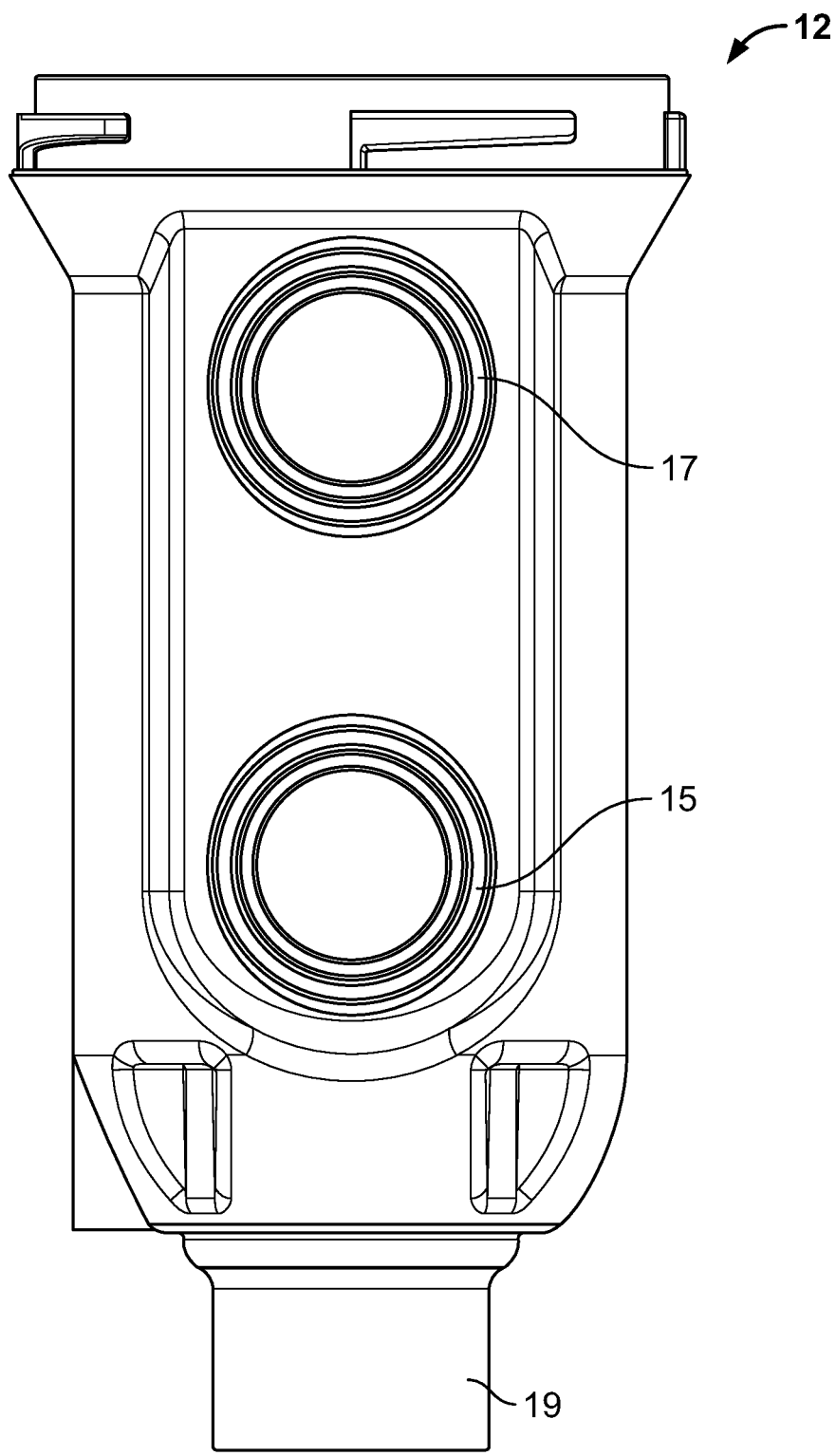
Figure 14:
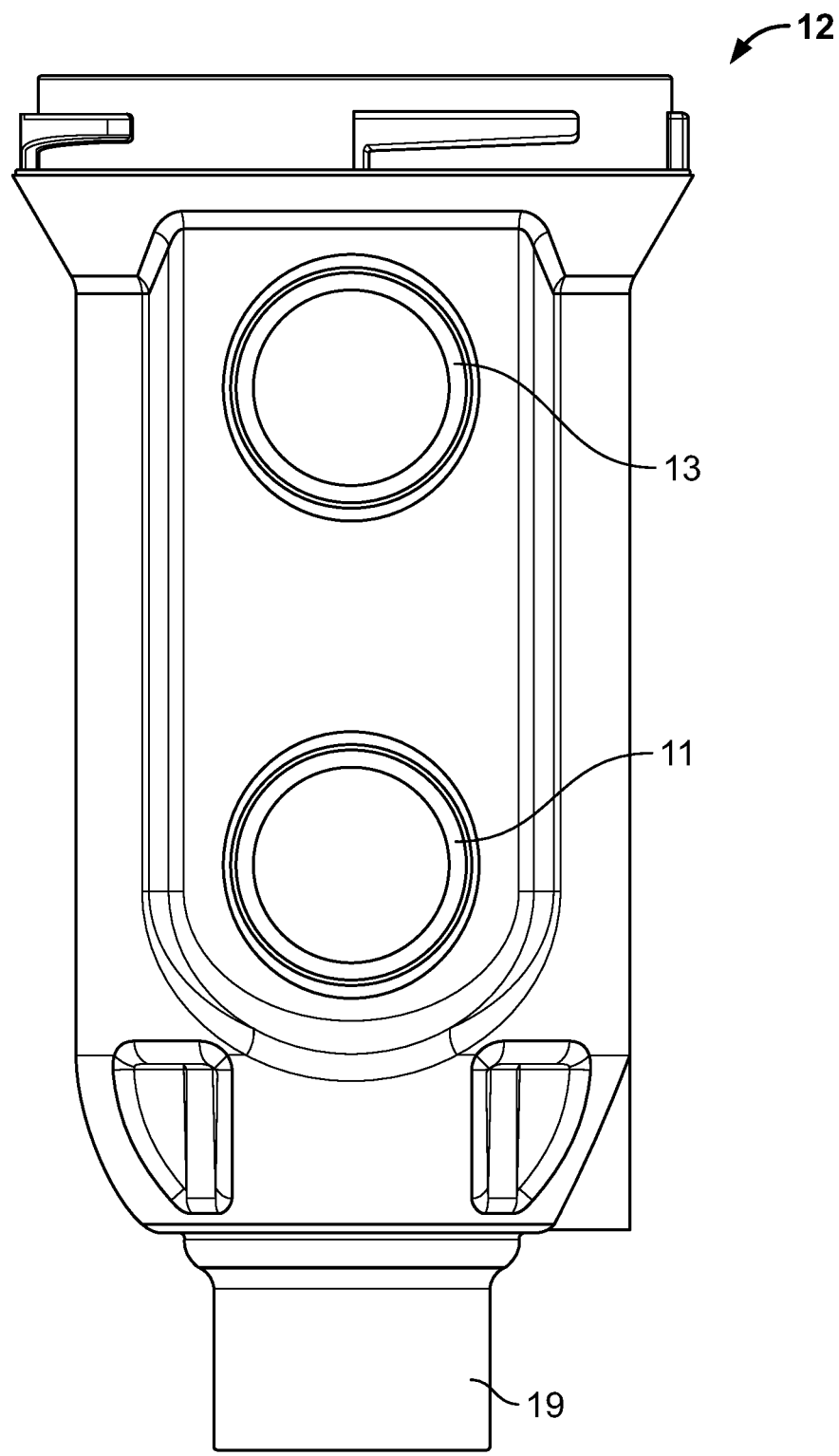

As shown in FIGS. 6-8, exemplary cover assembly 20 includes stem member 58, cover member 87 and handle 88. Cover member 87 is substantially circular and includes a groove 89 configured to house a seal member 90. Seal member 90 of cover assembly 20 is configured to form a fluid seal with the interior surface 44 of housing 12 when positioned against interior surface 44 of first end 21 of housing 12. It is noted that cover member 87 can include an alignment notch 101 configured to mate with a protrusion 102 of housing 12.

In exemplary embodiments and as shown in FIG. 6, the top surface 91 of cover member 87 includes a wall 92 (e.g., a non-continuous circular wall 92). Wall 92 can include one or more notches 93. In certain embodiments, wall 92 includes four notches 93, 93A, 93B and 93C.

In certain embodiments, notch 93A is positioned about 60° around wall 92 from notch 93 when travelling in the direction of Arrow A of FIG. 6. Notch 93B is positioned about 60° around wall 92 from notch 93A when travelling in the direction of Arrow A. It is noted that notches 93, 93A, 93B, 93C can be positioned at other suitable positions around wall 92.

Notch 93C is positioned about 120° around wall 92 from notch 93 when travelling in the direction of Arrow B of FIG. 6.

Exemplary handle 88 includes a biasing member 94 mounted thereto (e.g., via post members 95 inserted into holes 96). Biasing member 94 includes a finger tab 97 and a locking tab 98.

Cover assembly 20 can be assembled by inserting a portion of the stem member 58 into aperture 99 of cover member 87 and fastening handle 88 to stem member 58 via a fastener 100 or the like. While the cover member 87 remains stationary (e.g., after mounting the assembly 20 to housing 12), the handle 88 is configured to rotate around the cover member 87 in the directions of Arrows A or B in FIG. 6, thereby rotationally turning the stem member 58 (and rotationally turning the engaged hub member 18) in the directions of Arrows A or B.

FIG. 7 depicts the finger tab 97 of biasing member 94 in an unengaged position, and the locking tab 98 is positioned in one of the notches 93, 93A, 93B, 93C in such a position. When the locking tab 98 is positioned in one of the notches 93, 93A, 93B, 93C, the handle 88 (and stem member 58) is prevented from rotationally moving relative to cover member 87.

After a user depresses the finger tab 97 by forcing the finger tab 97 to be moved in the direction of Arrow D in FIG. 7, this thereby raises the locking tab 98 in the direction of Arrow U in FIG. 7, and releases the locking tab 98 from its engagement with the respective notch 93, 93A, 93B, 93C. While the locking tab 98 is raised out of engagement with a respective notch 93, 93A, 93B, 93C, a user can then rotate the handle 88 (and stem member 58) around cover member 87 until the locking tab is positioned above a desired notch 93, 93A, 93B, 93C and then lowered into engagement with the desired notch 93, 93A, 93B, 93C.

For example, if the locking tab 98 is positioned in notch 93, a user can depress the tab 97 and lift the tab 98 out of notch 93, and then rotate the handle 88 about 60° in the direction of Arrow A until the tab 98 is positioned above notch 93A. The tab 97 then can be released, thereby lowering the tab 98 in the direction of Arrow D and into locking engagement with notch 93A.

Continuing on with the example, a user can depress the tab 97 and lift the tab 98 out of notch 93A, and then rotate the handle 88 about 60° in the direction of Arrow A until the tab 98 is positioned above notch 93B. The tab 97 then can be released, thereby lowering the tab 98 in the direction of Arrow D and into locking engagement with notch 93B.

As another example, if the locking tab 98 is positioned in notch 93, a user can depress the tab 97 and lift the tab 98 out of notch 93, and then rotate the handle 88 about 120° in the direction of Arrow B until the tab 98 is positioned above notch 93C. The tab 97 then can be released, thereby lowering the tab 98 in the direction of Arrow D and into locking engagement with notch 93C.

In other embodiments, it is noted that cover assembly 20 may not include biasing member 94, and the handle 88 and/or cover member 87 may include detents or the like to facilitate holding the handle 88 in its various positions (e.g., filter position, backwash position, etc.).

Cover assembly 20 can be mounted to hub 18 positioned within housing 12 (e.g., with stem member 58 mounted to engagement region 56 of hub member 18), and cover assembly 20 can be mounted to first end 21 of housing 12.

As noted, cover assembly 20 is configured to cover and seal the first end 21 of housing 12, and the seal member 90 of cover assembly 20 is configured to form a fluid seal with the interior surface 44 of housing 12 when positioned against interior surface 44 of first end 21 of housing 12. In exemplary embodiments, a lock ring 22 can be positioned around cover assembly 20 and mounted to the exterior of first end 21 of housing 12.

After valve assembly 10 is assembled, a user can then rotate the handle 88 and the engaged hub member 18 to a desired position within housing 12. For example, handle 88 and hub 18 can be rotated so that the tab 98 is positioned in notch 93, which thereby positions the hub 18 within housing 12 in the filter position as depicted in FIGS. 53-56.

In the filter position of hub 18 (FIGS. 53-56), the first aperture 45 of hub 18 is substantially aligned with the second source port 13, the fifth aperture 49 is substantially aligned with the first source port 11, the third aperture 47 of hub 18 is substantially aligned with the second filter port 17, and the eight aperture 52 of hub 18 is substantially aligned with the first filter port 15. Exemplary hub 18 provides or defines a cylindrical or tubular fluid path or channel 103 from the first aperture 45 to the third aperture 47, the channel 103 from aperture 45 to 47 configured to allow fluid (e.g., water) to flow unimpeded from aperture 47 to aperture 45 (or vice versa).

Similarly, hub 18 provides or defines a cylindrical or tubular fluid path or channel 104 from the fifth aperture 49 to the eight aperture 52, the channel 104 from aperture 49 to 52 configured to allow fluid (e.g., water) to flow unimpeded from aperture 49 to aperture 52 (or vice versa).

In use and as shown via Arrows F and P of FIG. 53, valve assembly 10 in the filter position can be utilized to allow fluid to flow from the source (e.g., pump, pool, spa, fluid/ water source, etc.) to the first source port 11, through the fifth aperture 49 of hub 18, through channel 104 of hub 18 to and through the eight aperture 52, and through the first filter port 15 to the filter (e.g., to the filter inlet). The fluid can then be filtered via a filter or the like, and returned to valve assembly via second filter port 17 (e.g., filter outlet), through third aperture 47 of hub 18, through channel 103 of hub 18 to and through the first aperture 45, and through the second source port 13 back to the source (e.g., pool/spa).

It is noted that when the assembly 10 is in the filter position, the waste port seal carrier 14 engaged with the channel 74 of the cam assembly 64 of hub 18 is positioned, via the cam assembly 64, proximal to the interior 44 of second end 23 of housing 12 so that the seal member 84 forms a fluid seal with the interior surface 44 second end 23 of housing 12. This thereby seals the waste port 19 and prevents bypass fluid from draining from the source (e.g., pool/spa).

As desired (e.g., after operating the valve assembly 10 in the filter position), a user can depress tab 97 and rotate the handle 88 and engaged hub 18 so that the tab 98 is in notch 93A, thereby positioning the hub 18 within the housing 12 in the backwash position as depicted in FIGS. 57-60.

In the backwash position of hub 18 (FIGS. 57-60), the sixth aperture 50 of hub 18 is substantially aligned with the first source port 11, the ninth aperture 53 of hub 18 is substantially aligned with the first filter port 15, and the fourth aperture 48 of hub 18 is substantially aligned with the second filter port 17. Exemplary hub 18 provides or defines a fluid tight sealed chamber 105 between the sixth aperture 50 and the fourth aperture 48 of hub 18, the chamber 105 from aperture 50 to 48 configured to allow fluid (e.g., water) to flow unimpeded from aperture 50 to aperture 48 (or vice versa). In the backwash position of hub 18, it is noted that the second source port 13 of housing 12 is sealed via wall 106 of hub 18.

Aperture 53 provides a fluid pathway through hub to waste port 19. More particularly, when the assembly 10 is in the backwash position, the waste port seal carrier 14 engaged with the channel 74 of the cam assembly 64 of hub 18 is positioned, via the cam assembly 64, away from and out of engagement with the interior 44 of second end 23 of housing 12 so that the seal member 84 does not form a fluid seal with the interior surface 44 second end 23 of housing 12. This thereby unseals the waste port 19 and allows fluid to exit housing 12 via waste port 19.

Figure 58:
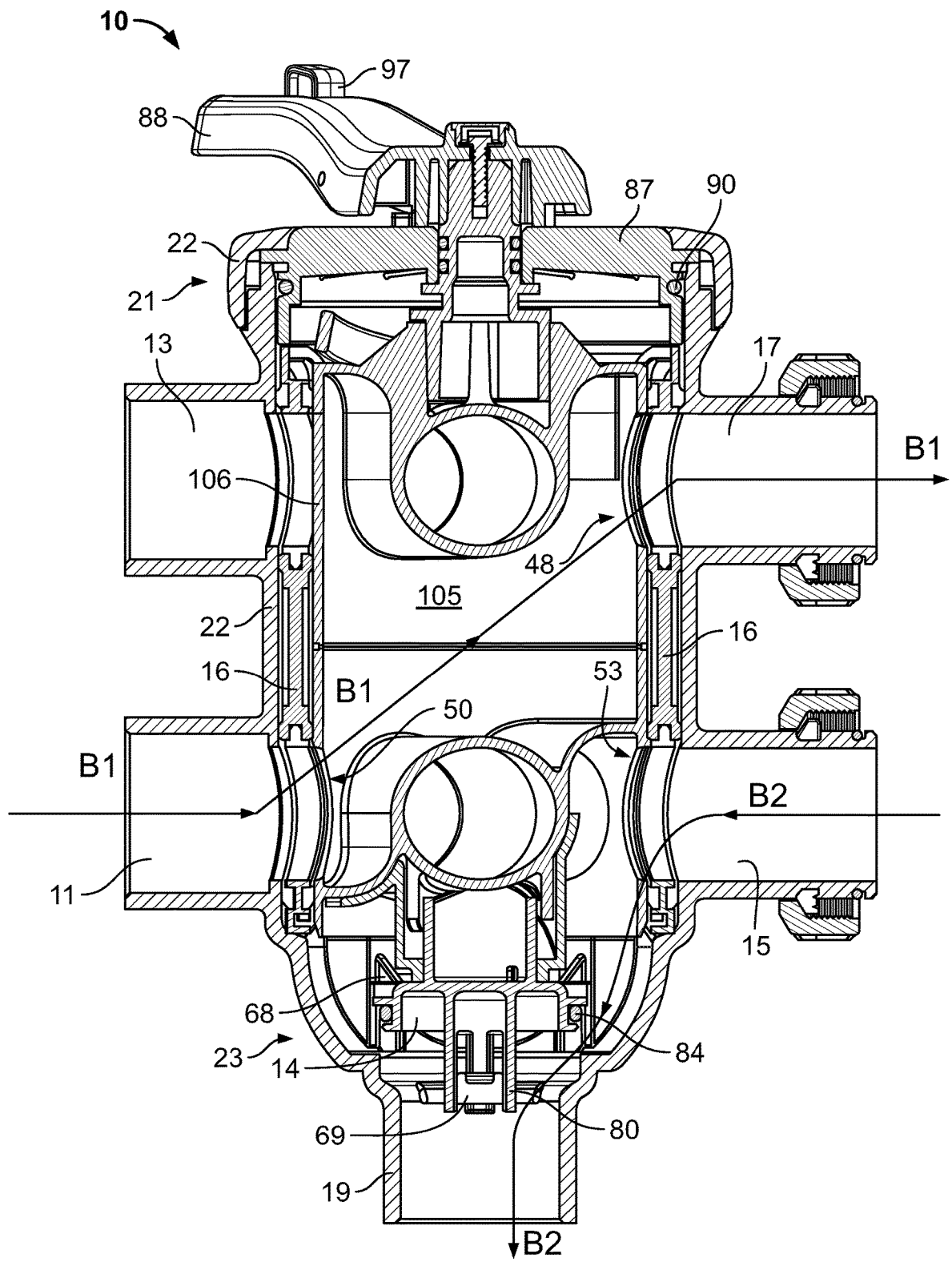
Figure 59:
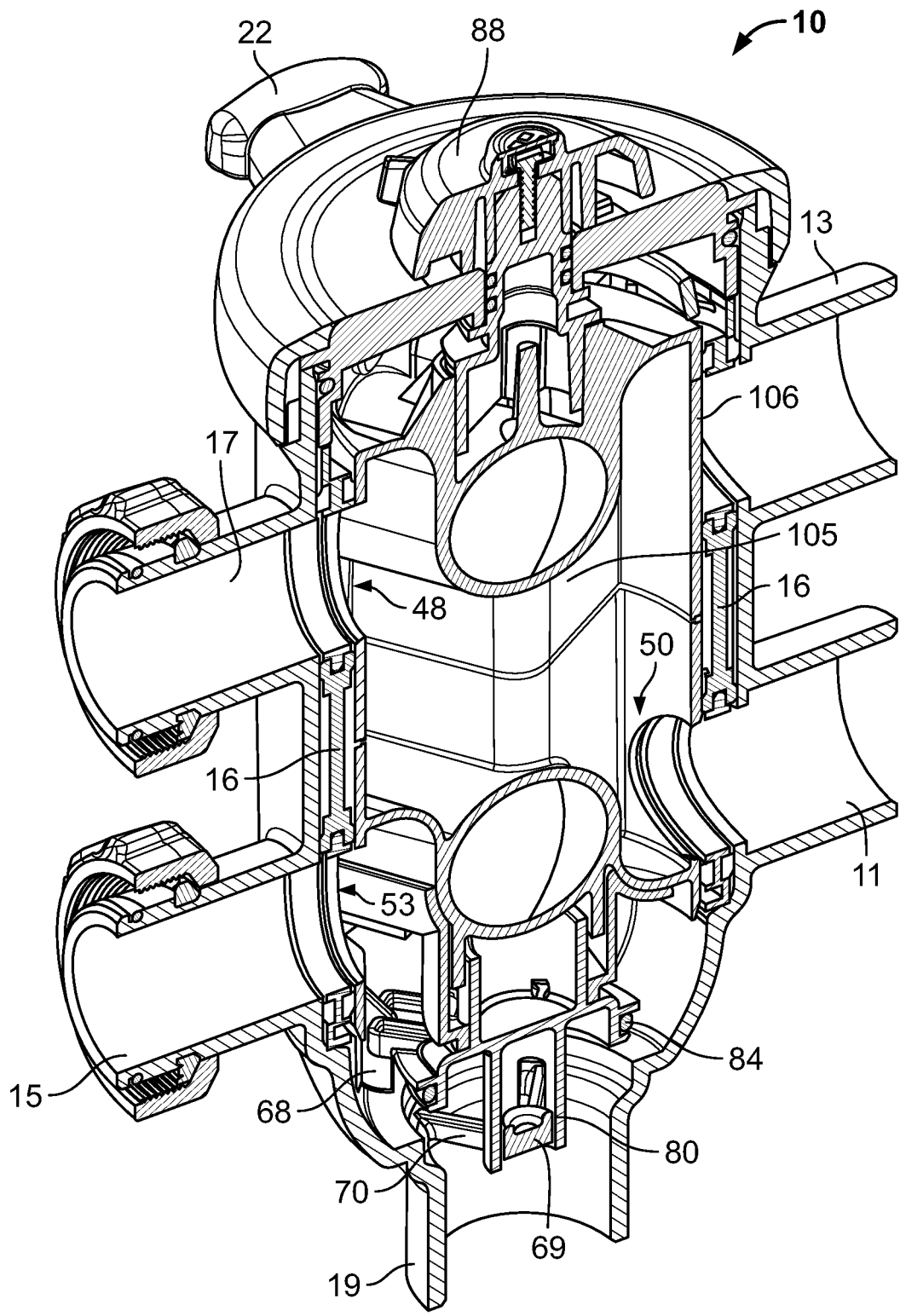
FIGS. 59-60 are cross-sectional side perspective views of the valve assembly in the backwash position.
Figure 60:
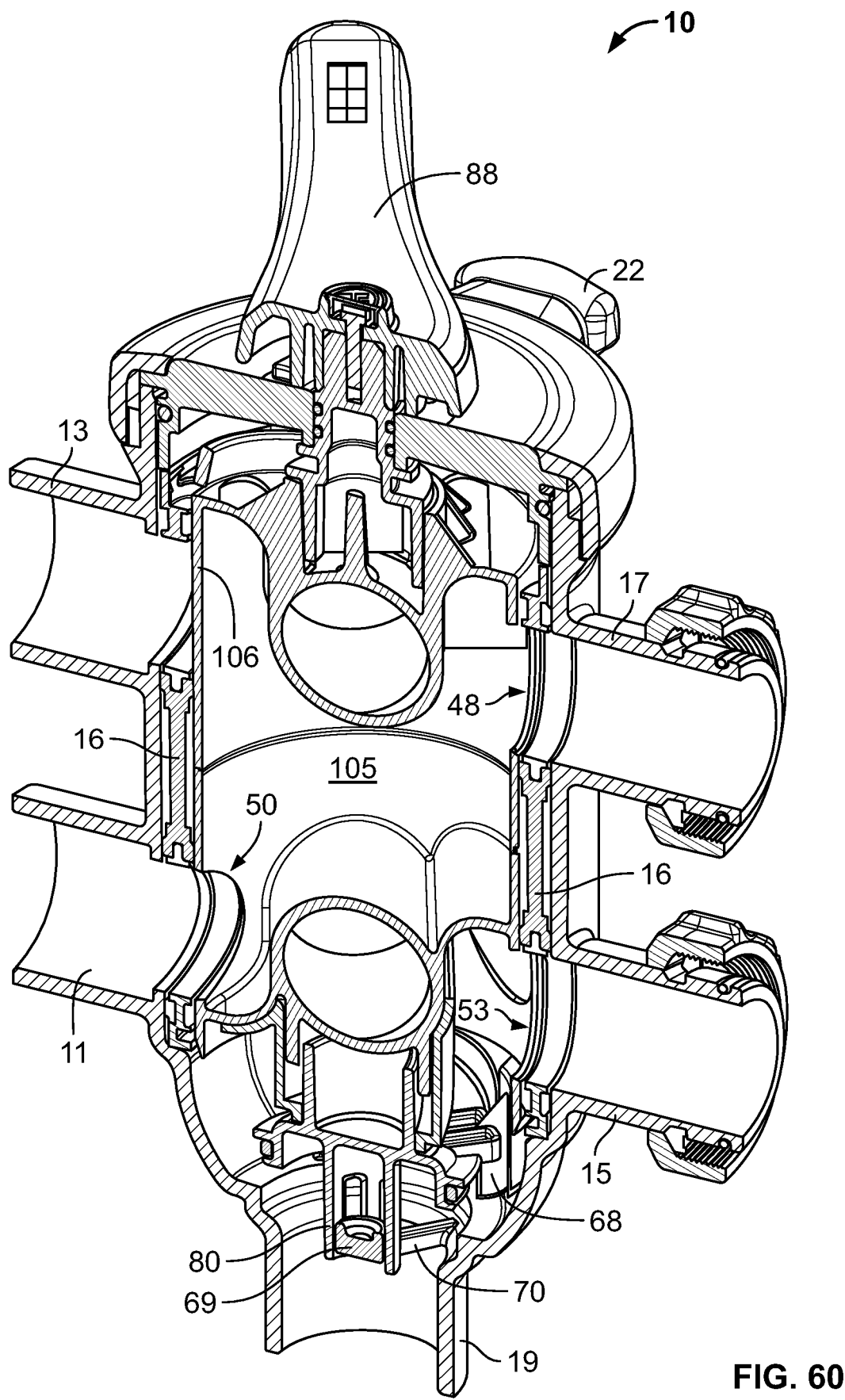
Figure 61:
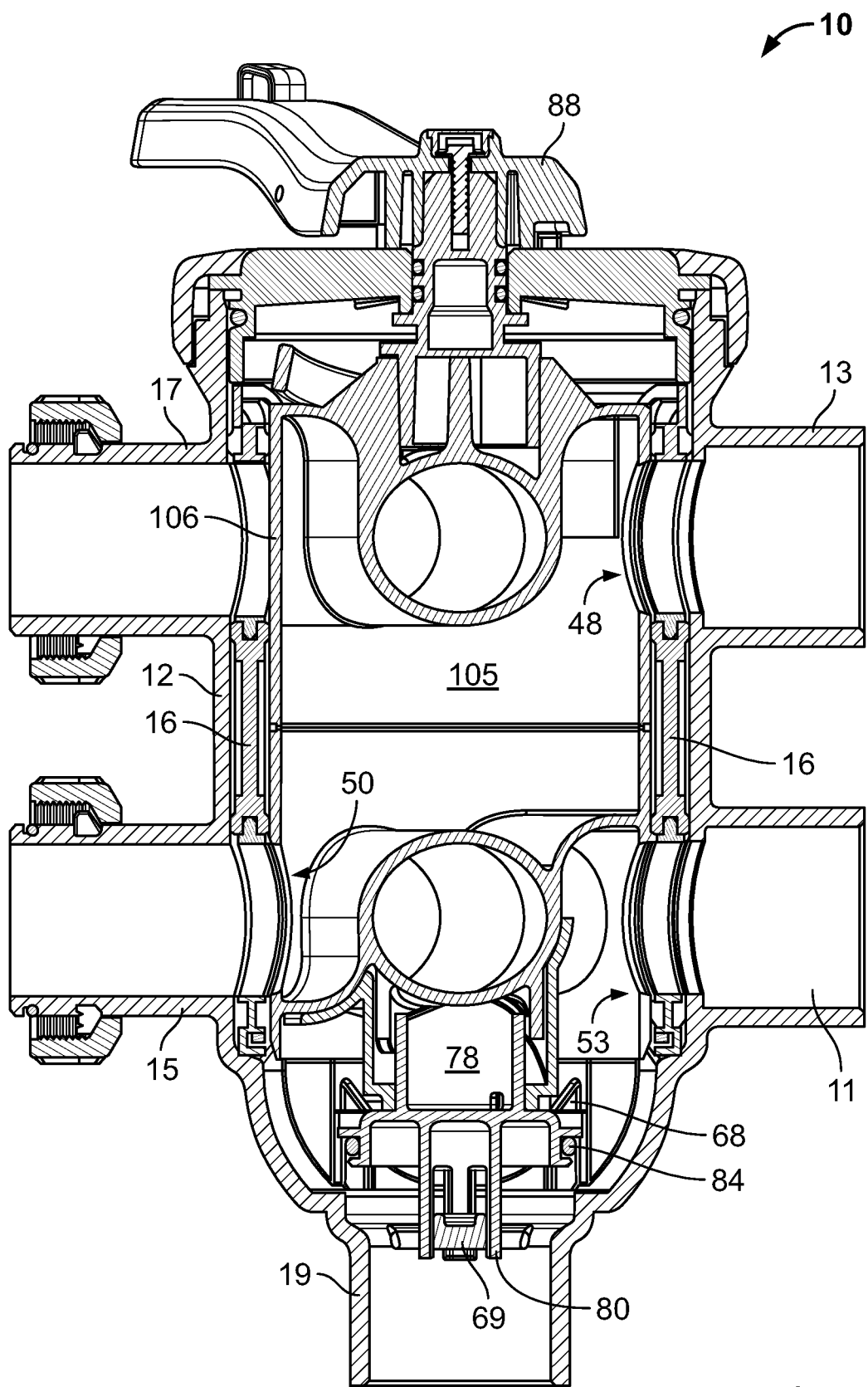
FIGS. 61-62 are cross-sectional side views of an exemplary valve assembly in the waste position.

For example, during the rotation of the hub 18 (via handle 88) from the filter position to the backwash position, the engagement members 81 positioned with channel 74 of cam assembly move and ride up the channel 74 defined by first cammed surface 66 and second cammed surface 71, with the engagement members 81 riding up and travelling along the second cammed surface 71, and with the engagement members 81 positioned underneath the first cammed surface 66. This thereby raises or moves (e.g., about 0.70 inches in 60° of rotation of hub 18) the seal carrier 14 toward to first end 21 of housing 12 and out of sealing engagement with interior 44 of housing 12 (FIG. 58). It is noted that when hub 18 is rotated, the seal carrier 14 does not rotate along with the hub 18, as each spoke member 70 positioned within a respective notch 82 and/or as each rib member 68 positioned within a respective locking slit 86 prevent the carrier 14 from rotating along with the hub 18. However and as discussed, the carrier 14 can move vertically (e.g., toward or away from end 21 of housing) during rotation of hub 18, via channel 74 of cam assembly 64 engaging the engagement members 81 of carrier 14.

In use and as shown via Arrows B1 and B2 of FIG. 58, valve assembly 10 in the backwash position can be utilized to allow fluid to flow from the source to the first source port 11, through the sixth aperture 50 of hub 18, through chamber 105 of hub 18 to and through the fourth aperture 48, and through the second filter port 17 to the filter. The fluid can then be backwashed through a filter or the like (e.g., reversed flow through the filter), and returned to valve assembly 10 via first filter port 15, through ninth aperture 53 of hub 18, and out the waste port 19 of housing 12 underneath raised carrier 14.

As desired, a user can depress tab 97 and rotate the handle 88 and engaged hub 18 so that the tab 98 is in notch 93C, thereby positioning the hub 18 within the housing 12 in the waste position as depicted in FIGS. 61-64.

In the waste position of hub 18 (FIGS. 61-64), the ninth aperture 53 of hub 18 is substantially aligned with the first source port 11, the sixth aperture 50 of hub 18 is substantially aligned with the first filter port 15, and the fourth aperture 48 of hub 18 is substantially aligned with the second source port 13. As noted above, exemplary hub 18 provides or defines a sealed chamber 105 between the sixth aperture 50 and the fourth aperture 48 of hub 18, the chamber 105 from aperture 50 to 48 configured to prevent fluid to flow from aperture 53 into chamber 105, thus preventing fluid to flow from port 11 to ports 13, 15, 17.

In the waste position of hub 18, it is noted that the second filter port 17 of housing 12 is sealed via wall 106 of hub 18.

Aperture 53 provides a fluid pathway through hub to waste port 19. More particularly, when the assembly 10 is in the waste position, the waste port seal carrier 14 engaged with the channel 74 of the cam assembly 64 of hub 18 is positioned, via the cam assembly 64, away from and out of engagement with the interior 44 of second end 23 of housing 12 so that the seal member 84 does not form a fluid seal with the interior surface 44 second end 23 of housing 12. This thereby unseals the waste port 19 and allows fluid to exit housing 12 via waste port 19.

Figure 62:
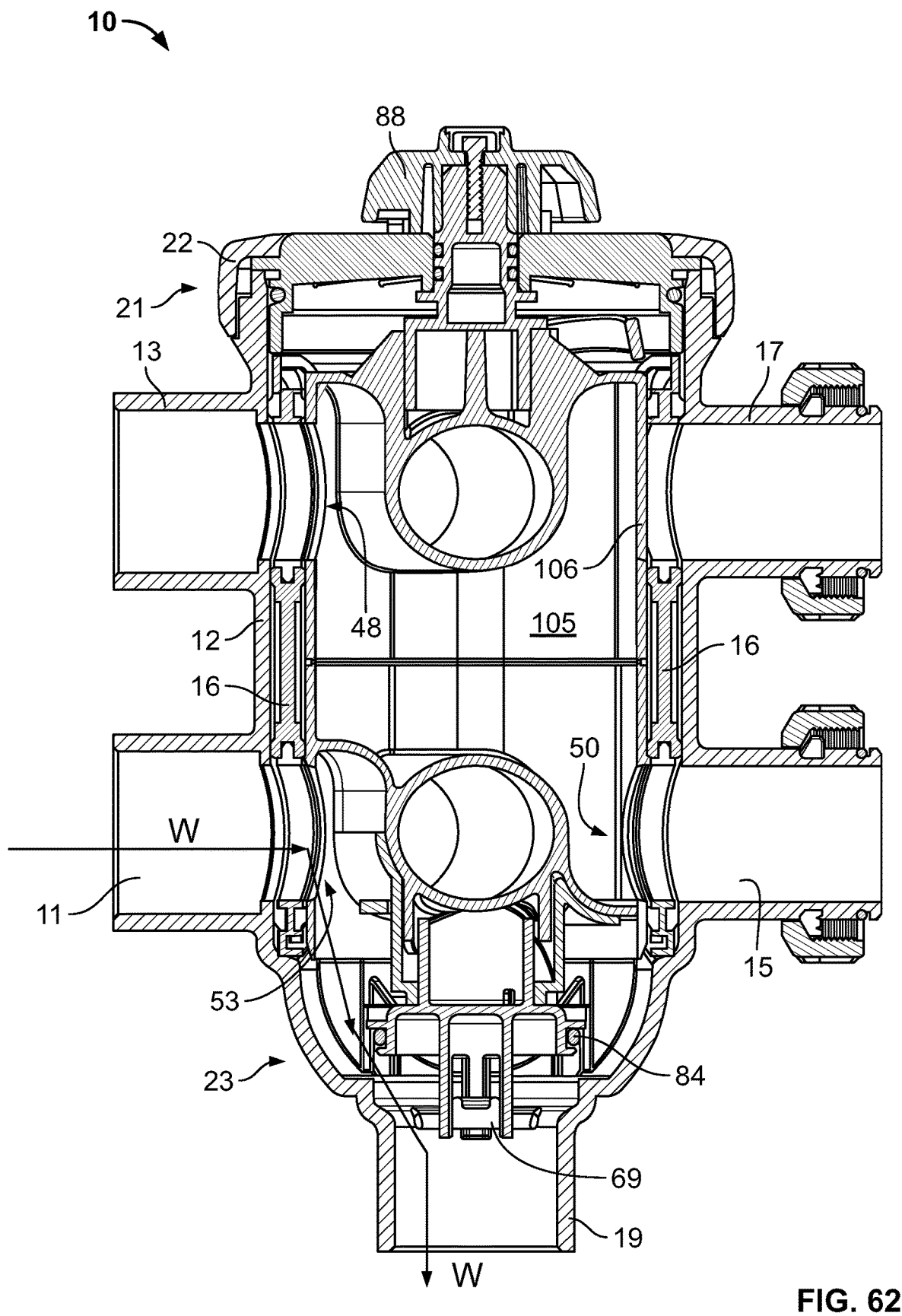
Figure 63:
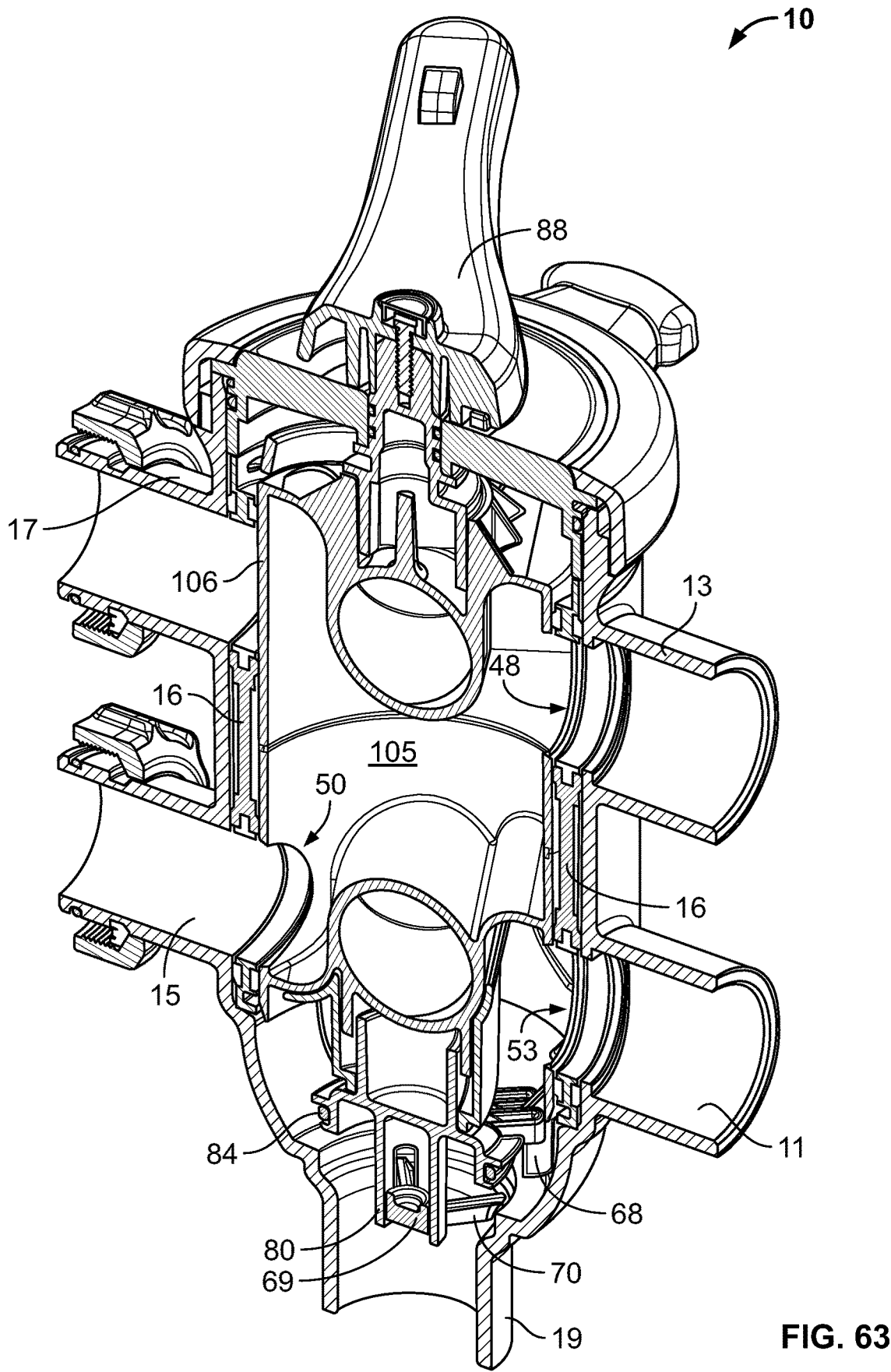
FIGS. 63-64 are cross-sectional side perspective views of the valve assembly in the waste position.
Figure 64:
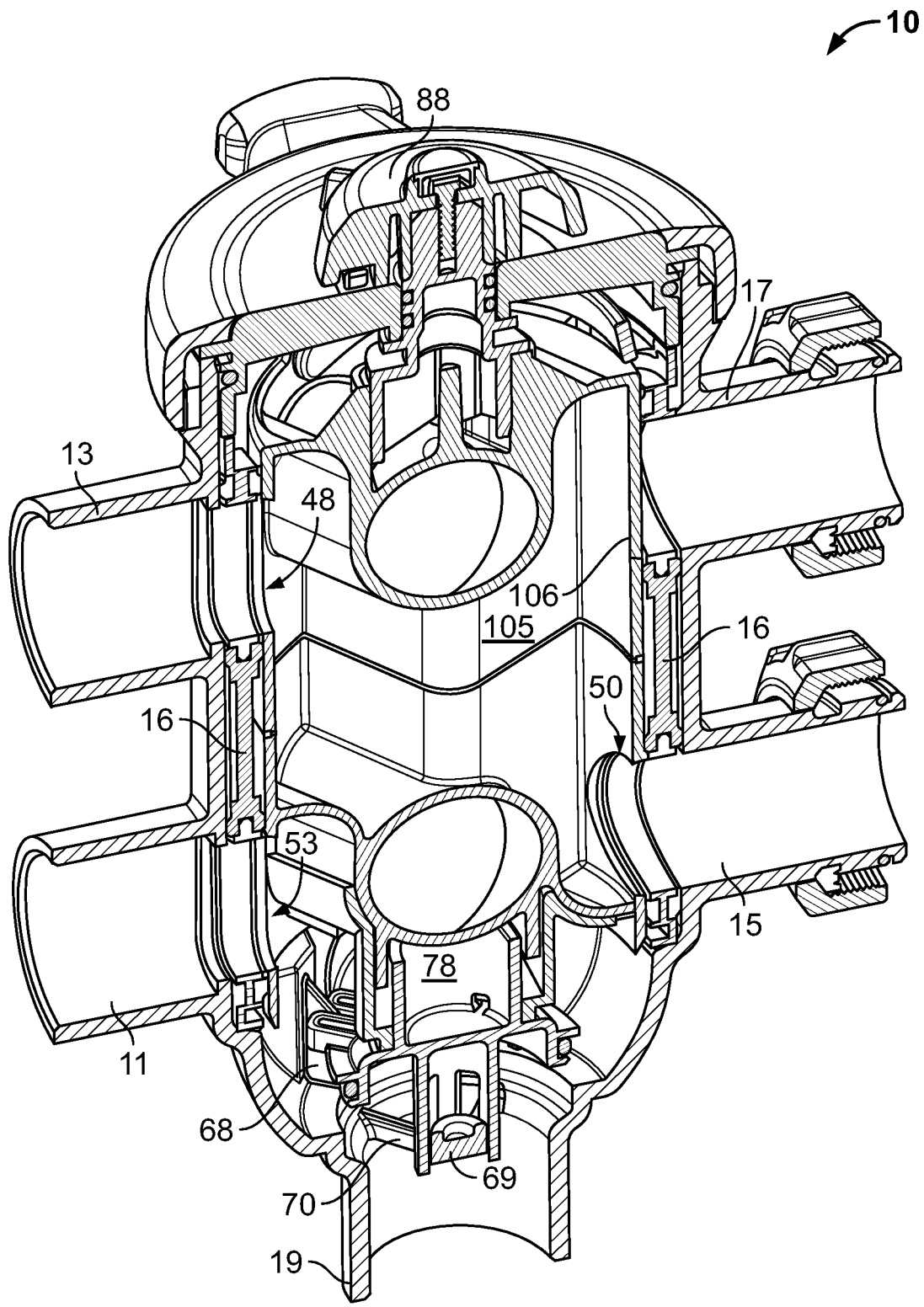

In exemplary embodiments, during the rotation of the hub 18 (via handle 88) from the filter position to the waste position, the engagement members 81 positioned with channel 74 of cam assembly move and ride up the channel 74 defined by first cammed surface 66 and second cammed surface 71, with the engagement members 81 riding up and travelling along the second cammed surface 71, and with the engagement members 81 positioned underneath the first cammed surface 66. This thereby raises or moves the seal carrier 14 toward to first end 21 of housing 12 and out of sealing engagement with interior 44 of housing 12 (FIG. 62). As noted above, when hub 18 is rotated, the seal carrier 14 does not rotate along with the hub 18, as each spoke member 70 positioned within a respective notch 82 and/or as each rib member 68 positioned within a respective locking slit 86 prevent the carrier 14 from rotating along with the hub 18. However and as discussed, the carrier 14 can move vertically (e.g., toward or away from end 21 of housing) during rotation of hub 18, via channel 74 of cam assembly 64 engaging the engagement members 81 of carrier 14.

In use and as shown via Arrows W of FIG. 62, valve assembly 10 in the waste position can be utilized to allow fluid to flow from the source to the first source port 11, through the ninth aperture 53 of hub 18, and out the waste port 19 of housing 12 underneath raised carrier 14. As noted, chamber 105 from aperture 50 to 48 configured to prevent fluid to flow from aperture 53 into chamber 105, thus preventing fluid to flow from port 11 to ports 13, 15, 17.

Operating the valve assembly 10 in the waste position allows flow directly from the source (e.g., pump) to the waste port 19, which may be desired for lowering the pool/spa level or vacuuming to waste.

As desired (e.g., after operating the valve assembly 10 in the backwash position), a user can depress tab 97 and rotate the handle 88 and engaged hub 18 so that the tab 98 is in notch 93B, thereby positioning the hub 18 within the housing 12 in the recirculation position as depicted in FIGS. 65-68.

In the recirculation position of hub 18 (FIGS. 65-68), the seventh aperture 51 of hub 18 is substantially aligned with the first source port 11, the tenth aperture 54 of hub 18 is substantially aligned with the first filter port 15, and the second aperture 46 of hub 18 is substantially aligned with the second source port 13. Exemplary hub 18 provides or defines a fluid tight sealed chamber 107 between the seventh aperture 51 and the second aperture 46 of hub 18, the chamber 107 from aperture 51 to 46 configured to allow fluid (e.g., water) to flow unimpeded from aperture 51 to aperture 46 (or vice versa). In the recirculation position of hub 18, it is noted that the second filter port 17 of housing 12 is sealed via wall 106 of hub 18.

When the assembly 10 is in the recirculation position, the waste port seal carrier 14 engaged with the channel 74 of the cam assembly 64 of hub 18 is positioned, via the cam assembly 64, into engagement with the interior 44 of second end 23 of housing 12 so that the seal member 84 forms a fluid seal with the interior surface 44 second end 23 of housing 12. This thereby seals the waste port 19 and prevents fluid from exiting housing 12 via waste port 19.

Figure 65:
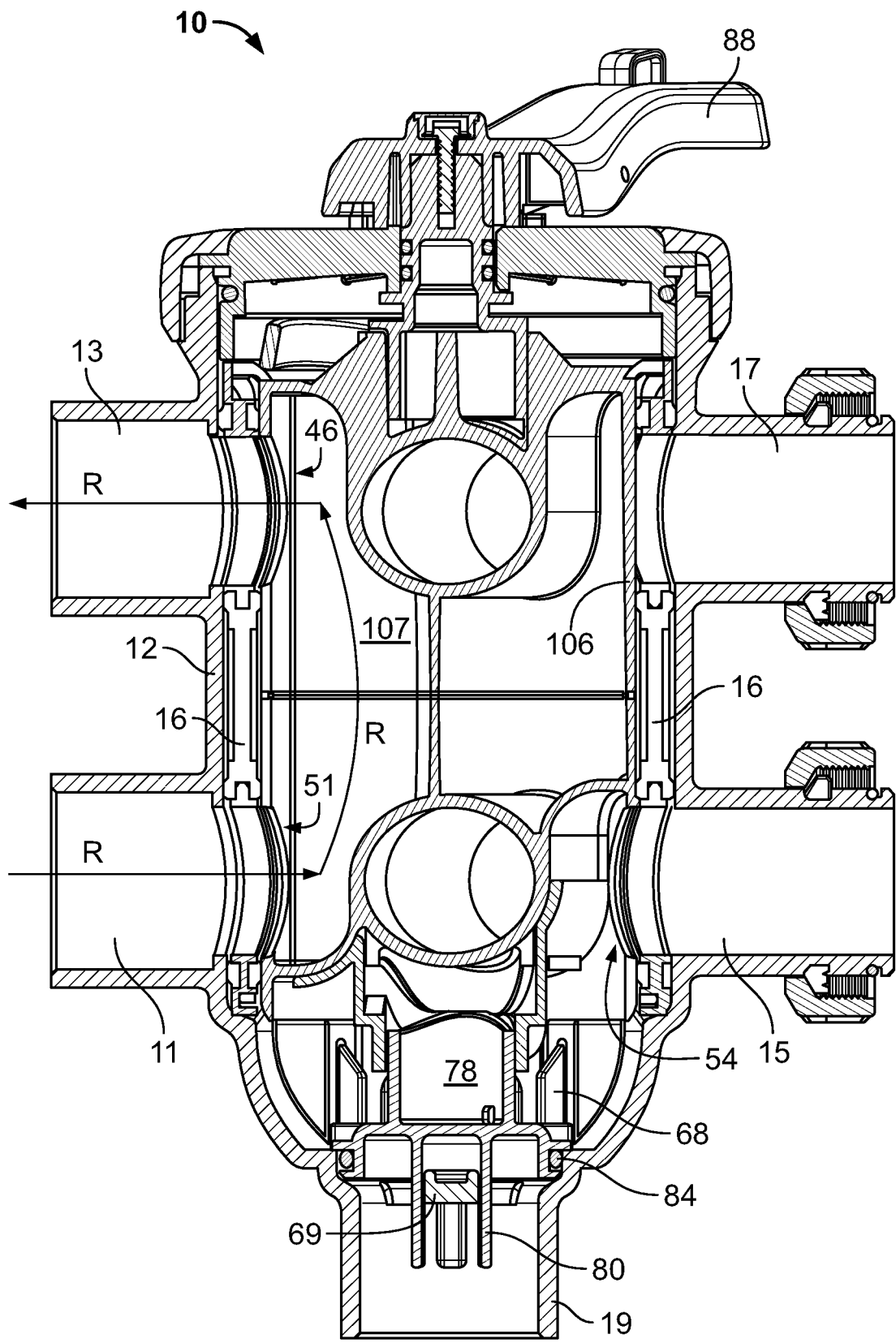
FIGS. 65-66 are cross-sectional side views of an exemplary valve assembly in the recirculation position.
Figure 66:
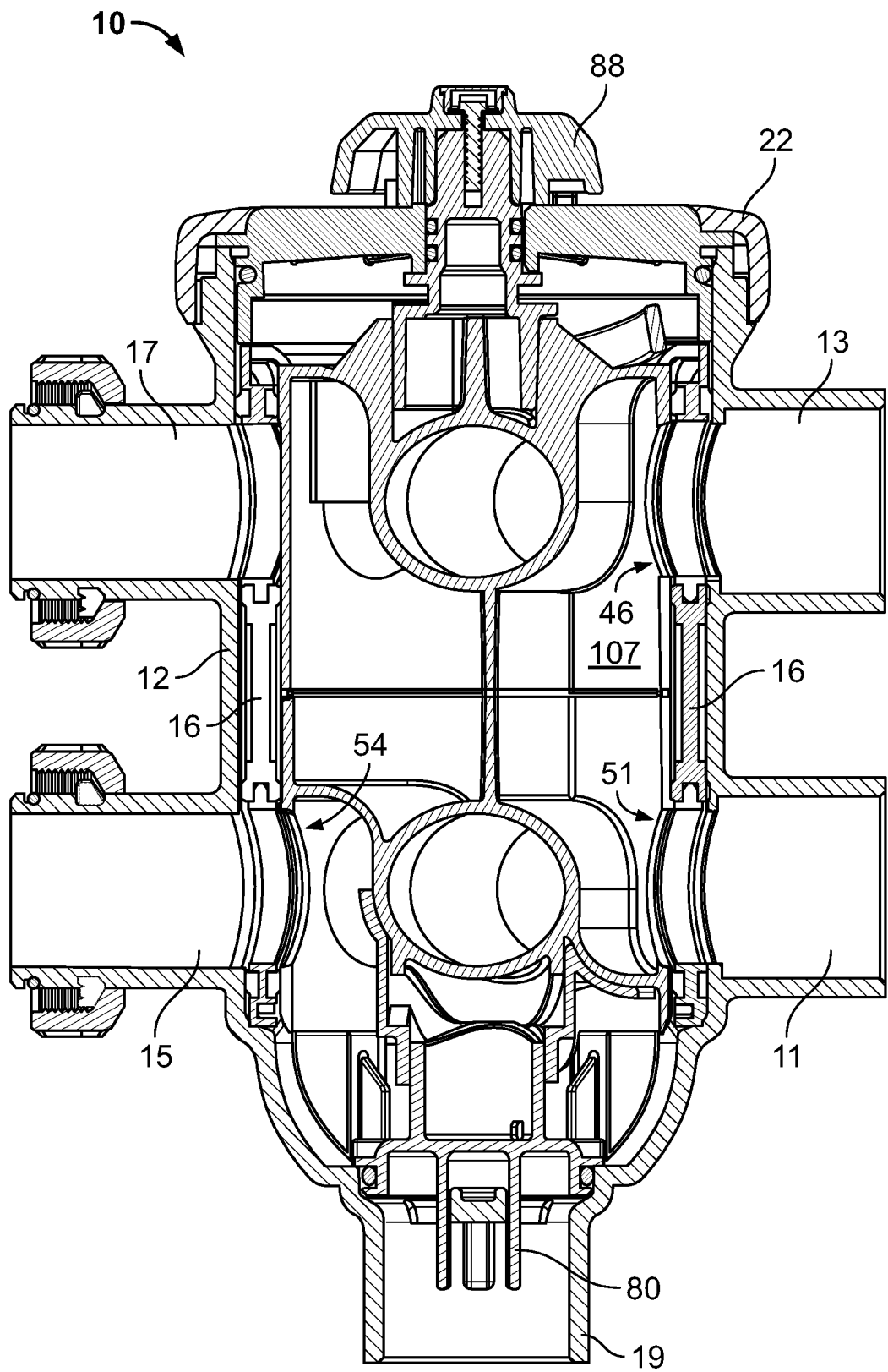
Figure 67:
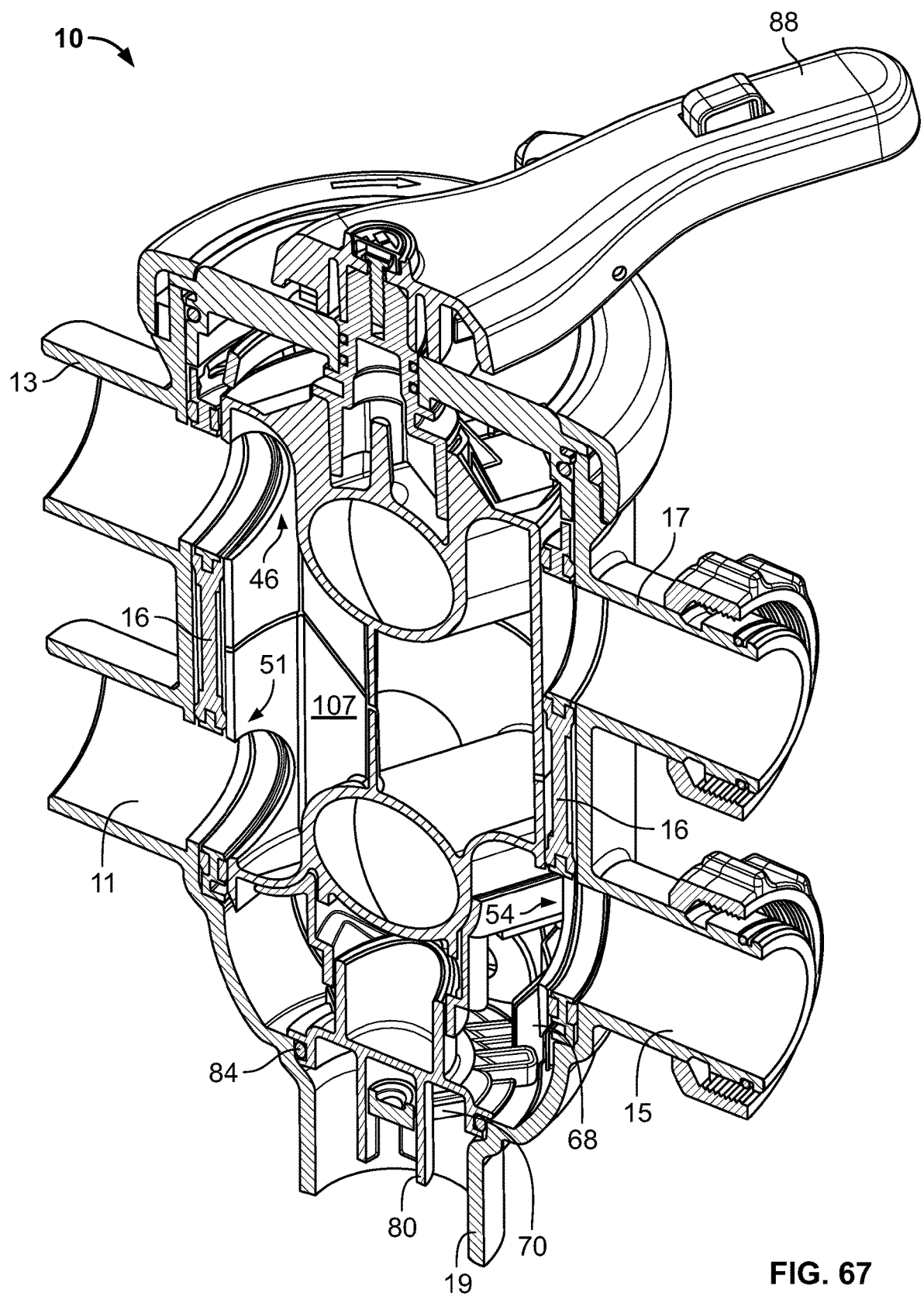
FIGS. 67-68 are cross-sectional side perspective views of the valve assembly in the recirculation position.
Figure 68:
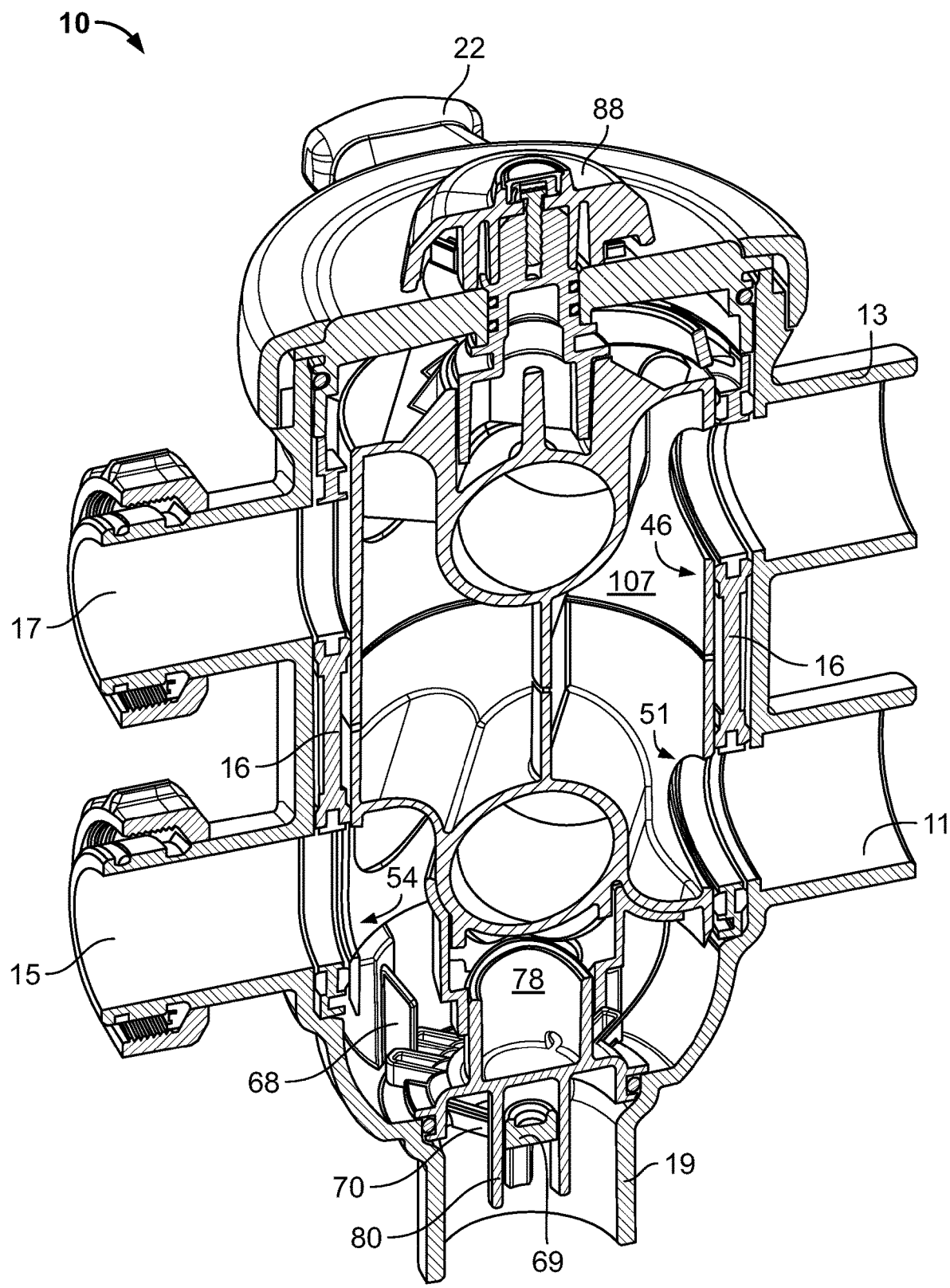

For example, during the rotation of the hub 18 (via handle 88) from the backwash position to the recirculation position, the engagement members 81 positioned with channel 74 of cam assembly move and ride down the channel 74 defined by first cammed surface 66 and second cammed surface 71, with the engagement members 81 riding down and travelling along the first cammed surface 66, and with the engagement members 81 positioned above the second cammed surface 71. This thereby lowers or moves (e.g., about 0.70 inches in 60° of rotation of hub 18) the seal carrier 14 toward to second end 23 of housing 12 and into sealing engagement with interior 44 of housing 12 (FIG. 65). It is noted that when hub 18 is rotated, the seal carrier 14 does not rotate along with the hub 18, as each spoke member 70 positioned within a respective notch 82 and/or as each rib member 68 positioned within a respective locking slit 86 prevent the carrier 14 from rotating along with the hub 18. However and as discussed, the carrier 14 can move vertically (e.g., toward or away from end 21 of housing) during rotation of hub 18, via channel 74 of cam assembly 64 engaging the engagement members 81 of carrier 14.

In use and as shown via Arrows R of FIG. 65, valve assembly 10 in the recirculation position can be utilized to allow fluid to flow from the source to the first source port 11, through the seventh aperture 51 of hub 18, through chamber 107 of hub 18 to and through the second aperture 46, and through the second source port 13 and back to the source. Chamber 107 prevents fluid flow to ports 15, 17.

The valve assembly 10 can be operated in the recirculation position to allow for pool/spa circulation without filtration, and can generate far less headloss as a filter and valve combination for added system performance.

The exemplary valve assemblies 10 of the present disclosure can provide several advantages (e.g., straight through flow in the filter position; higher feature set with four positions; easy access to internals for easy service; replaceable seal carriers 16 for easy field service; waste port piston seal to reduce waste port leakage through life of assembly 10; seal carriers 16 mitigate undercut molding issues with placing only one seal in the body; carrier 14 uses O-ring piston style seal for less drag and wear).

It is noted that after valve assembly 10 is assembled, it can be disassembled by removing lock ring 22, removing cover assembly 20, pulling hub 18 out of housing 12 (e.g., using handle 60) (carrier 14 may come out with hub 18), removing carrier 16, and removing carrier 14, if needed.

Whereas the disclosure has been described principally in connection with advantageous valve assemblies for a swimming pool or spa filter (e.g., a backwash valve associated with a pool/spa filter), such description has been utilized only for purposes of disclosure and is not intended as limiting the disclosure. To the contrary, it is to be recognized that the disclosed valve assemblies are capable of use with other fluid systems or the like (e.g., valve assembly can be utilized in fluid systems as a flow control assembly).

Although the assemblies, systems and methods of the present disclosure have been described with reference to exemplary embodiments thereof, the present disclosure is not limited to such exemplary embodiments and/or implementations. Rather, the systems, assemblies and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure.

What is claimed is:

1. A valve assembly comprising:
   a housing having a first source port configured to be placed in fluidic communication with a pump, a second source port configured to be placed in fluidic communication with pool/spa equipment, a first filter port configured to be placed in fluidic communication with a filter, and a second filter port configured to be placed in fluidic communication with the filter; and a hub member rotatably disposed in the housing, the hub member including a first aperture, a second aperture, a third aperture, and a fourth aperture, the hub member defining a first channel from the first aperture to the second aperture, a chamber from the third aperture to the fourth aperture, and a second channel, wherein the hub member is rotatable between a filter position and a recirculation position, wherein when the hub member is rotated to the filter position, fluid provided to the first source port can flow from the first source port, through the first aperture into the first channel, through the first channel, out from the first channel through the second aperture, and through the first filter port, and fluid provided to the second filter port can flow from the second filter port, through the second channel, and through the second source port, wherein the flow of fluid through the first channel is a straight through flow and the flow of fluid through the second channel is a straight through flow, and wherein when the hub member is rotated to the recirculation position, fluid provided to the first source port can flow from the first source port, through the third aperture into the chamber, through the chamber, out from the chamber through the fourth aperture, and through the second source port, and fluid provided to the first source port is prevented from flowing from the first source port to the first filter port.

2. The valve assembly of claim 1, wherein the housing includes a waste port, wherein the hub member is rotatable between the filter position, the recirculation position, and a waste position, and wherein when the hub member is rotated to the waste position, fluid provided to the first source port can flow from the first source port through the waste port, and fluid provided to the first source port is prevented from flowing from the first source port to the first filter port, the second filter port, and the second source port.

3. The valve assembly of claim 1, wherein the housing includes a waste port, wherein the hub member is rotatable between the filter position, the recirculation position, and a waste position, and wherein when the hub member is rotated to the waste position, fluid provided to the first source port can flow from the first source port through the waste port, and fluid provided to the first source port is prevented from flowing from the first source port to the first filter port.

4. The valve assembly of claim 1, comprising a rotating actuation handle configured to rotate the hub member.

5. A valve assembly comprising:

a housing having a first source port configured to be placed in fluidic communication with a pump, a second source port configured to be placed in fluidic communication with pool/spa equipment, a first filter port configured to be placed in fluidic communication with a filter, a second filter port configured to be placed in fluidic communication with the filter, and a waste port; and a hub member rotatably disposed in the housing, the hub member defining a first channel and a second channel, wherein the hub member is rotatable between a filter position and a waste position, wherein when the hub member is rotated to the filter position, fluid provided to the first source port can flow from the first source port, through the first channel, and through the first filter port, and fluid provided to the second filter port can flow from the second filter port, through the second channel, and through the second source port, wherein the flow of fluid through the first channel is a straight through flow and the flow of fluid through the second channel is a straight through flow, and wherein when the hub member is rotated to the waste position, fluid provided to the first source port can flow from the first source port through the waste port, and fluid provided to the first source port is prevented from flowing from the first source port to the first filter port.

6. The valve assembly of claim 5, wherein the hub member defines a chamber, wherein the hub member is rotatable between the filter position, the waste position, and a recirculation position, and wherein when the hub member is rotated to the recirculation position, fluid provided to the first source port can flow from the first source port, through the chamber, and through the second source port, and fluid provided to the first source port is prevented from flowing from the first source port to the first filter port, the second filter port, and the waste port.

7. The valve assembly of claim 5, comprising a rotating actuation handle configured to rotate the hub member.

8. A valve assembly comprising:

a housing having a first source port configured to be placed in fluidic communication with a pump, a second source port configured to be placed in fluidic communication with pool/spa equipment, a first filter port configured to be placed in fluidic communication with a filter, a second filter port configured to be placed in fluidic communication with the filter, and a waste port; and a hub member rotatably disposed in the housing, the hub member defining a first channel, a second channel, and a chamber, wherein the hub member is rotatable between a filter position, a recirculation position, and a waste position, wherein when the hub member is rotated to the filter position, fluid provided to the first source port can flow from the first source port, through the first channel, and through the first filter port, and fluid provided to the second filter port can flow from the second filter port, through the second channel, and through the second source port, wherein the flow of fluid through the first channel is a straight through flow and the flow of fluid through the second channel is a straight through flow, wherein when the hub member is rotated to the recirculation position, fluid provided to the first source port can flow from the first source port, through the chamber, and through the second source port, and fluid provided to the first source port is prevented from flowing from the first source port to the first filter port, and wherein when the hub member is rotated to the waste position, fluid provided to the first source port can flow from the first source port through the waste port, and fluid provided to the first source port is prevented from flowing from the first source port to the first filter port, the second filter port, and the second source port.

9. The valve assembly of claim 8, comprising a rotating actuation handle configured to rotate the hub member.

10. A valve assembly comprising:

a housing having a first source port configured to be placed in fluidic communication with a pump, a second source port configured to be placed in fluidic communication with pool/spa equipment, a first filter port configured to be placed in fluidic communication with a filter, and a waste port; and a hub member rotatably disposed in the housing, the hub member defining a first channel and a chamber, wherein the hub member is rotatable between a filter position, a recirculation position, and a waste position, wherein when the hub member is rotated to the filter position, fluid provided to the first source port can flow from the first source port, through the first channel, and through the first filter port, wherein the flow of fluid through the first channel is a straight through flow, wherein when the hub member is rotated to the recirculation position, fluid provided to the first source port can flow from the first source port, through the chamber, and through the second source port, and fluid provided to the first source port is prevented from flowing from the first source port to the first filter port, wherein when the hub member is rotated to the waste position, fluid provided to the first source port can flow from the first source port through the waste port, and fluid provided to the first source port is prevented from flowing from the first source port to the first filter port.

11. The valve assembly of claim 10, wherein the housing includes a second filter port configured to be placed in fluidic communication with the filter;

wherein the hub member defines a second channel;

wherein when the hub member is rotated to the filter position, fluid provided to the first source port can flow from the first source port, through the first channel, and through the first filter port, and fluid provided to the second filter port can flow from the second filter port, through the second channel, and through the second source port; and wherein the flow of fluid through the second channel is a straight through flow.

12. The valve assembly of claim 11, wherein when the hub member is rotated to the waste position, fluid provided to the first source port is prevented from flowing from the first source port to the first filter port, the second filter port, and the second source port.

13. The valve assembly of claim 10, comprising a rotating actuation handle configured to rotate the hub member.

* * * * *